United States Patent
Nakamura et al.

(10) Patent No.: US 8,255,447 B2
(45) Date of Patent: Aug. 28, 2012

(54) EIGENVALUE DECOMPOSITION APPARATUS AND EIGENVALUE DECOMPOSITION METHOD

(75) Inventors: Yoshimasa Nakamura, Kyoto (JP); Hiroaki Tsuboi, Kyoto (JP); Taro Konda, Kyoto (JP); Masashi Iwasaki, Kyoto (JP); Masami Takata, Kyoto (JP)

(73) Assignee: Kyoto University, Kyoto (JP)

( * ) Notice: Subject to any disclaimer, the term of this patent is extended or adjusted under 35 U.S.C. 154(b) by 876 days.

(21) Appl. No.: 12/376,444

(22) PCT Filed: Jan. 31, 2007

(86) PCT No.: PCT/JP2007/051575
§ 371 (c)(1),
(2), (4) Date: Feb. 5, 2009

(87) PCT Pub. No.: WO2008/018188
PCT Pub. Date: Feb. 14, 2008

(65) Prior Publication Data
US 2010/0185716 A1    Jul. 22, 2010

(30) Foreign Application Priority Data
Aug. 8, 2006 (JP) ................................. 2006-215660

(51) Int. Cl.
*G06F 17/16* (2006.01)
*G06F 17/12* (2006.01)

(52) U.S. Cl. ........ 708/650; 708/446; 708/490; 708/520; 708/607

(58) Field of Classification Search ........................ None
See application file for complete search history.

(56) References Cited

U.S. PATENT DOCUMENTS

| | | | |
|---|---|---|---|
| 7,483,937 B2 * | 1/2009 | Nakanishi | 708/607 |
| 7,711,762 B2 * | 5/2010 | Howard et al. | 708/490 |
| 7,895,254 B2 * | 2/2011 | Ketchum et al. | 708/520 |
| 2008/0140751 A1 * | 6/2008 | Ide et al. | 708/520 |
| 2009/0216821 A1 * | 8/2009 | Nakamura et al. | 708/446 |

OTHER PUBLICATIONS

B.B. Zhou et al., "Jacobi-like Algorithms for Eigenvalue Decomposition of a Real Normal Matrix Using Real Arthmetic," 1996.*
Jurgen Gotze et al., "An Efficient Jacobi-Like Algorithm for Parallel Eigenvalue Computation," Sep. 1993.*

(Continued)

*Primary Examiner* — Tammara Peyton
(74) *Attorney, Agent, or Firm* — Cermak Nakajima LLP; Tomoko Nakajima

(57) ABSTRACT

The present invention provides an eigenvalue decomposition apparatus that can perform processing in parallel at high speed and high accuracy. The eigenvalue decomposition apparatus comprises a matrix dividing portion 14 that repeatedly divides a symmetric tridiagonal matrix T into two symmetric tridiagonal matrices, an eigenvalue decomposition portion 15 that performs eigenvalue decomposition on the symmetric tridiagonal matrix after the division, an eigenvalue computing portion 17 that repeatedly computes eigenvalues of the symmetric tridiagonal matrix that is the division origin and matrix elements of the symmetric tridiagonal matrix that is the division origin, based on eigenvalues and matrix elements obtained by eigenvalue decomposition performed by the eigenvalue decomposition portion 15, the matrix elements being part of elements of orthogonal matrices constituted by eigenvectors, until an eigenvalue of the symmetric tridiagonal matrix T is computed, and an eigenvector computing portion 19 that computes an eigenvector of the symmetric tridiagonal matrix T based on the symmetric tridiagonal matrix T and the eigenvalue thereof using twisted factorization.

18 Claims, 35 Drawing Sheets eigenvalue decomposition apparatus 1

OTHER PUBLICATIONS

Cuppen, J. J. M., "A Divide and Conquer Method for the Symmetric Tridiagonal Eigenproblem," Numer. Math. 1981;36:177-195.

Katagiri, T., "Effect on Endiagonal-blocked Method for Parallel Eigenvector Computations," Information Processing Society of Japan Kenkyu Hokoku, vol. 2002, No. 8 (2002-HPC-91) IPSJ SIG Notes, Information Processing Society of Japan, Aug. 31, 2002, pp. 43-48.

Yamamoto, Y., et al., "A Parallel Linear Equation Solver for Nonsymmetric Tridiagonal Matrices," Transactions of Information Processing Society of Japan, vol. 43, No. SIG9 (HPS3) IPSJ, Information Processing Society of Japan, Aug. 15, 2001, pp. 19-27.

International Search Report for PCT Patent App. No. PCT/JP2007/051575 (May 15, 2007).

* cited by examiner qd-type twisted factorization

LV-type twisted factorization

US 8,255,447 B2

EIGENVALUE DECOMPOSITION APPARATUS AND EIGENVALUE DECOMPOSITION METHOD

TECHNICAL FIELD

The present invention relates to eigenvalue decomposition apparatuses and the like for performing eigenvalue decomposition.

BACKGROUND ART

Eigenvalue decomposition is used in a very wide range of fields such as chemical calculation using molecular orbital method, statistical calculation, information search, and the like. Also, methods of eigenvalue decomposition are known (see Non-Patent Document 1, for example).

[Non-Patent Document 1] J. J. M. Cuppen, "A divide and conquer method for the symmetric tridiagonal eigenproblem", Numerische Mathematik, Vol. 36, pp. 177-195, 1981

DISCLOSURE OF INVENTION

Problems to be Solved by the Invention

Recently, in accordance with an increase in data size and the like in these application fields, eigenvalue decomposition at high speed and high accuracy is required. Furthermore, there has been a demand for development of an eigenvalue decomposition apparatus and the like capable of performing parallel processing of eigenvalue decomposition.

The present invention was arrived at in view of these circumstances, and it is an object thereof to provide an eigenvalue decomposition apparatus and the like capable of performing eigenvalue decomposition with excellent parallelism at high speed and high accuracy.

Means for Solving the Problems

In order to achieve the above-described object, the present invention is directed to an eigenvalue decomposition apparatus, comprising: a diagonal matrix storage portion in which a symmetric tridiagonal matrix T is stored; a matrix dividing portion that reads the symmetric tridiagonal matrix T from the diagonal matrix storage portion, divides the symmetric tridiagonal matrix T into two symmetric tridiagonal matrices, and stores the symmetric tridiagonal matrices in the diagonal matrix storage portion, and repeats the process of dividing the symmetric tridiagonal matrix into two symmetric tridiagonal matrices and storing the symmetric tridiagonal matrices in the diagonal matrix storage portion until the size of each of the symmetric tridiagonal matrices after the division becomes not greater than a predetermined size; an eigenvalue decomposition storage portion in which eigenvalues of each of the symmetric tridiagonal matrices whose size is not greater than the predetermined size and matrix elements, which are part of elements of an orthogonal matrix constituted by eigenvectors of each of the symmetric tridiagonal matrices, are stored; an eigenvalue decomposition portion that reads each of the symmetric tridiagonal matrices whose size is not greater than the predetermined size from the diagonal matrix storage portion, performs eigenvalue decomposition on each of the symmetric tridiagonal matrices, at least computes eigenvalues of each of the symmetric tridiagonal matrices and matrix elements of an orthogonal matrix constituted by eigenvectors of each of the symmetric tridiagonal matrices, and stores the eigenvalues and the matrix elements in the eigenvalue decomposition storage portion; an eigenvalue storage portion in which an eigenvalue of the symmetric tridiagonal matrix T is stored; an eigenvalue computing portion that reads the eigenvalues and the matrix elements of each of the symmetric tridiagonal matrices from the eigenvalue decomposition storage portion, computes eigenvalues of the symmetric tridiagonal matrix that is the division origin and matrix elements of the symmetric tridiagonal matrix that is the division origin based on the eigenvalues and the matrix elements, and stores the computed eigenvalues and matrix elements in the eigenvalue decomposition storage portion, repeats the process of computing eigenvalues and matrix elements of the symmetric tridiagonal matrix that is the division origin until at least one eigenvalue of the symmetric tridiagonal matrix T is computed, and stores the at least one eigenvalue of the symmetric tridiagonal matrix T in the eigenvalue storage portion; an eigenvector storage portion in which an eigenvector of the symmetric tridiagonal matrix T is stored; and an eigenvector computing portion that reads the symmetric tridiagonal matrix T from the diagonal matrix storage portion, reads the eigenvalue of the symmetric tridiagonal matrix T from the eigenvalue storage portion, computes at least one eigenvector of the symmetric tridiagonal matrix T based on the symmetric tridiagonal matrix T and the eigenvalue thereof using twisted factorization, and stores the at least one eigenvector in the eigenvector storage portion.

With this configuration, it is possible to realize eigenvalue decomposition at high speed and high accuracy, by computing an eigenvalue first, and then computing an eigenvector based on the eigenvalue using twisted factorization. Furthermore, this eigenvalue decomposition is excellent also in parallelism. Moreover, if all eigenvalues or eigenvectors do not have to be computed, only necessary eigenvalues or eigenvectors can be computed, and thus the processing load can be reduced.

Furthermore, the eigenvalue decomposition apparatus according to the present invention may be configured so that the eigenvector computing portion computes an eigenvector using qd-type twisted factorization.

With this configuration, it is possible to realize eigenvalue decomposition at high speed and high accuracy. Furthermore, this eigenvalue decomposition is excellent also in parallelism.

Furthermore, the eigenvalue decomposition apparatus according to the present invention may be configured so that the eigenvector computing portion comprises: a positive-definite forming portion that reads the eigenvalues of the symmetric tridiagonal matrix T from the eigenvalue storage portion, and, if any of the eigenvalues is a negative value, reads the symmetric tridiagonal matrix T from the diagonal matrix storage portion, changes the symmetric tridiagonal matrix T into positive definite so that all eigenvalues of the symmetric tridiagonal matrix T are positive values, without changing the eigenvectors of the symmetric tridiagonal matrix T, stores eigenvalues after the positive-definite formation in the eigenvalue storage portion, and stores a symmetric tridiagonal matrix T after the positive-definite formation in the diagonal matrix storage portion; a Cholesky decomposition portion that reads the symmetric tridiagonal matrix T in which all eigenvalues are positive values from the diagonal matrix storage portion, reads the positive eigenvalues of the symmetric tridiagonal matrix T from the eigenvalue storage portion, and performs Cholesky decomposition on the symmetric tridiagonal matrix T into an upper bidiagonal matrix $B^{(+1)}$ and a lower bidiagonal matrix $B^{(-1)}$, by performing qd-type transformation on each element of the symmetric tridiagonal matrix T; and a vector computing portion that computes eigenvectors using each element of the upper bidiagonal matrix $B^{(+1)}$ and the lower bidiagonal matrix $B^{(-1)}$ and the positive eigenvalues of the symmetric tridiagonal matrix T, and stores the eigenvectors in the eigenvector storage portion.

With this configuration, if a negative eigenvalue is contained, it is possible to perform qd-type twisted factorization after changing the symmetric tridiagonal matrix T into positive definite. Furthermore, it is possible to perform calculation faster than LV-type twisted factorization.

Furthermore, the eigenvalue decomposition apparatus according to the present invention may be configured so that the eigenvector computing portion computes an eigenvector using LV-type twisted factorization.

With this configuration, it is possible to compute an eigenvector in a numerically stable manner.

Furthermore, the eigenvalue decomposition apparatus according to the present invention may be configured so that the eigenvector computing portion comprises: a Cholesky decomposition portion that reads the symmetric tridiagonal matrix T from the diagonal matrix storage portion, reads the eigenvalue of the symmetric tridiagonal matrix T from the eigenvalue storage portion, and performs Cholesky decomposition on the symmetric tridiagonal matrix T into an upper bidiagonal matrix $B^{(+1)}$ and a lower bidiagonal matrix $B^{(-1)}$, by performing Miura transformation, dLVv-type transformation, and inverse Miura transformation on each element of the symmetric tridiagonal matrix T; and a vector computing portion that computes an eigenvector using each element of the upper bidiagonal matrix $B^{(+1)}$ and the lower bidiagonal matrix $B^{(-1)}$ and the eigenvalue of the symmetric tridiagonal matrix T, and stores the eigenvector in the eigenvector storage portion.

With this configuration, it is possible to compute an eigenvector in a numerically stable manner, by using multiple auxiliary variables in the process of Chole sky decomposition.

Furthermore, the eigenvalue decomposition apparatus according to the present invention may be configured so that the Cholesky decomposition portion comprises multiple Cholesky decomposition units, and the multiple Cholesky decomposition units perform, in parallel, the process of Cholesky decomposition on the symmetric tridiagonal matrix T.

With this configuration, it is possible to perform the process of Cholesky decomposition in a short time.

Furthermore, the eigenvalue decomposition apparatus according to the present invention may be configured so that the vector computing portion comprises multiple vector computing units, and the multiple vector computing units perform, in parallel, the process of computing eigenvectors.

With this configuration, it is possible to perform the process of computing an eigenvector in a short time.

Furthermore, the eigenvalue decomposition apparatus according to the present invention may be configured so that the eigenvalue computing portion comprises multiple eigenvalue computing units, and the multiple eigenvalue computing units perform, in parallel, the process of computing eigenvalues and matrix elements of the symmetric tridiagonal matrix that is the division origin.

With this configuration, it is possible to perform the process of computing an eigenvalue in a short time.

Furthermore, the eigenvalue decomposition apparatus according to the present invention may be configured so that the eigenvalue decomposition portion comprises multiple eigenvalue decomposition units, and the multiple eigenvalue decomposition units perform, in parallel, the process of eigenvalue decomposition on a symmetric tridiagonal matrix.

With this configuration, it is possible to perform the process of eigenvalue decomposition in a short time.

Furthermore, the eigenvalue decomposition apparatus according to the present invention may be configured so that the eigenvalue decomposition apparatus further comprises: a matrix storage portion in which a symmetric matrix A is stored; and a diagonalization portion that reads the symmetric matrix A from the matrix storage portion, computes a symmetric tridiagonal matrix T in which the symmetric matrix A is tridiagonalized, and stores the symmetric tridiagonal matrix T in the diagonal matrix storage portion.

With this configuration, it is possible to compute an eigenvalue of a given symmetric matrix A. Furthermore, it is possible to compute an eigenvector of the symmetric matrix A using the eigenvector of the symmetric tridiagonal matrix T.

Furthermore, the eigenvalue decomposition apparatus according to the present invention may be configured so that the matrix dividing portion divides a symmetric tridiagonal matrix into two substantially half symmetric tridiagonal matrices.

With this configuration, it is possible to perform parallel processing as appropriate.

Furthermore, the eigenvalue decomposition apparatus according to the present invention may be configured so that the eigenvalue computing portion computes all eigenvalues of the symmetric tridiagonal matrix T.

Furthermore, the eigenvalue decomposition apparatus according to the present invention may be configured so that the eigenvector computing portion computes all eigenvectors of the symmetric tridiagonal matrix T.

Furthermore, the eigenvalue decomposition apparatus according to the present invention may be configured so that the symmetric matrix A is a covariance matrix computed based on the average of vectors indicating facial image data.

With this configuration, it is possible to use the eigenvalue decomposition apparatus for recognition processing of facial image data.

Effect of the Invention

With the eigenvalue decomposition apparatus and the like according to the present invention, eigenvalue decomposition can be performed at high speed and high accuracy. Furthermore, this eigenvalue decomposition is excellent also in parallelism.

BEST MODE FOR CARRYING OUT THE INVENTION

Hereinafter, an eigenvalue decomposition apparatus according to the present invention will be described by way of embodiments. It should be noted that constituent elements and steps denoted by the same reference numerals are the same or correspond to each other in the following embodiments, and thus a description thereof may not be repeated.

(Embodiment 1)

Hereinafter, an eigenvalue decomposition apparatus according to Embodiment 1 of the present invention will be described with reference to the drawings.

FIG. 1 is a block diagram showing the configuration of an eigenvalue decomposition apparatus 1 according to this embodiment. In FIG. 1, the eigenvalue decomposition apparatus 1 according to this embodiment includes a matrix storage portion 11, a diagonalization portion 12, a diagonal matrix storage portion 13, a matrix dividing portion 14, an eigenvalue decomposition portion 15, an eigenvalue decomposition storage portion 16, an eigenvalue computing portion 17, an eigenvalue storage portion 18, an eigenvector computing portion 19, and an eigenvector storage portion 20.

In the matrix storage portion 11, a given symmetric matrix A is stored. This symmetric matrix A is a real matrix in which each element is a real number. Herein, the phrase 'symmetric matrix A is stored' refers to a state in which data representing the symmetric matrix A is stored. The same is applied to storage portions described below. The matrix storage portion 11 can be realized as a given storage medium (e.g., a semiconductor memory, a magnetic disk, an optical disk, etc.). In the matrix storage portion 11, data may be temporarily stored in a RAM or the like, or may be stored for a long time. There is no limitation on the procedure in which the symmetric matrix A is stored in the matrix storage portion 11. For example, the symmetric matrix A may be stored via a storage medium in the matrix storage portion 11, the symmetric matrix A transmitted via a communication line or the like may be stored in the matrix storage portion 11, or the symmetric matrix A input via an input device such as a keyboard or a mouse may be stored in the matrix storage portion 11.

The diagonalization portion 12 reads the symmetric matrix A from the matrix storage portion 11, and computes a symmetric tridiagonal matrix T in which the read symmetric matrix A is tridiagonalized. Then, the diagonalization portion 12 stores the computed symmetric tridiagonal matrix T in the diagonal matrix storage portion 13. The diagonalization portion 12 tridiagonalizes the symmetric matrix A, for example, using a method in which Householder transformation is repeated as many times as necessary, a method using Lanczos method, or other tridiagonalization methods.

In the diagonal matrix storage portion 13, the symmetric tridiagonal matrix T is stored. The diagonal matrix storage portion 13 can be realized as a given storage medium (e.g., a semiconductor memory, a magnetic disk, an optical disk, etc.). In the diagonal matrix storage portion 13, data may be temporarily stored in a RAM or the like, or may be stored for a long time.

The matrix dividing portion 14 reads the symmetric tridiagonal matrix T from the diagonal matrix storage portion 13, divides the symmetric tridiagonal matrix T into two symmetric tridiagonal matrices, and stores the symmetric tridiagonal matrices in the diagonal matrix storage portion 13. The matrix dividing portion 14 recursively repeats the process of dividing the symmetric tridiagonal matrix into two symmetric tridiagonal matrices and storing the symmetric tridiagonal matrices in the diagonal matrix storage portion 13, until the size of each of the symmetric tridiagonal matrices after the division becomes equal to or smaller than a predetermined size.

The eigenvalue decomposition portion 15 reads each of the symmetric tridiagonal matrices whose size is equal to or smaller than the predetermined size from the diagonal matrix storage portion 13, and performs eigenvalue decomposition on each of the symmetric tridiagonal matrices so as to compute eigenvalues of each of the symmetric tridiagonal matrices and eigenvectors of each of the symmetric tridiagonal matrices. The eigenvalue decomposition portion 15 may perform eigenvalue decomposition, for example, using bisection and inverse iteration in combination, MR^3, QR, or the like. Herein, in a case where eigenvalue decomposition is performed using the MR^3, DSTEGR provided in LAPACK3.0 (http://www.netlib.org/lapack/) may be used. Furthermore, in a case where eigenvalue decomposition is performed using the QR, DSTEQR provided in LAPACK3.0 may be used. These eigenvalue decomposition methods are already known, and thus a detailed description thereof has been omitted. The eigenvalue decomposition portion 15 stores the computed eigenvalues in the eigenvalue decomposition storage portion 16. The eigenvalue decomposition portion 15 also stores matrix elements, which are part of elements of orthogonal matrices constituted by the computed eigenvectors, in the eigenvalue decomposition storage portion 16. The orthogonal matrices constituted by eigenvectors refer to orthogonal matrices in which each column is represented as the eigenvector. The matrix elements will be described later in detail.

In the eigenvalue decomposition storage portion 16, the eigenvalues computed by the eigenvalue decomposition portion 15 performing the eigenvalue decomposition, and the matrix elements described above are stored. Furthermore, in the eigenvalue decomposition storage portion 16, eigenvalues and matrix elements computed by the eigenvalue computing portion 17 are also stored. The eigenvalue decomposition storage portion 16 can be realized as a given storage medium (e.g., a semiconductor memory, a magnetic disk, an optical disk, etc.). In the eigenvalue decomposition storage portion 16, data may be temporarily stored in a RAM or the like, or may be stored for a long time.

The eigenvalue computing portion 17 reads the eigenvalues computed by the eigenvalue decomposition portion 15 and the matrix elements, from the eigenvalue decomposition storage portion 16, computes eigenvalues of the symmetric tridiagonal matrix from which two symmetric tridiagonal matrices have been obtained by the division performed by the matrix dividing portion 14 (hereinafter, referred to as a 'symmetric tridiagonal matrix that is a division origin') and matrix elements of the symmetric tridiagonal matrix that is the division origin based on the eigenvalues and the matrix elements, and stores the computed eigenvalues and matrix elements in the eigenvalue decomposition storage portion 16. The eigenvalue computing portion 17 recursively repeats the process of computing eigenvalues and matrix elements of the symmetric tridiagonal matrix that is the division origin, until the eigenvalues of the symmetric tridiagonal matrix T are computed. Then, the eigenvalue computing portion 17 stores the computed the eigenvalues of the symmetric tridiagonal matrix T in the eigenvalue storage portion 18.

In the eigenvalue storage portion 18, the eigenvalues of the symmetric tridiagonal matrix T are stored. The eigenvalue storage portion 18 can be realized as a given storage medium (e.g., a semiconductor memory, a magnetic disk, an optical disk, etc.). In the eigenvalue storage portion 18, data may be temporarily stored in a RAM or the like, or may be stored for a long time.

The eigenvector computing portion 19 reads the symmetric tridiagonal matrix T from the diagonal matrix storage portion 13, and reads the eigenvalues of the symmetric tridiagonal matrix T from the eigenvalue storage portion 18. Then, the eigenvector computing portion 19 computes eigenvectors of the symmetric tridiagonal matrix T based on the symmetric tridiagonal matrix T and the eigenvalues thereof using twisted factorization, and stores the eigenvectors in the eigenvector storage portion 20. The eigenvector computing portion 19 may compute the eigenvectors using LV-type twisted factorization, or may compute the eigenvectors using qd-type twisted factorization. A specific method of twisted factorization will be described later.

In the eigenvector storage portion 20, the eigenvectors of the symmetric to tridiagonal matrix T are stored. The eigenvector storage portion 20 can be realized as a given storage medium (e.g., a semiconductor memory, a magnetic disk, an optical disk, etc.). In the eigenvector storage portion 20, data may be temporarily stored in a RAM or the like, or may be stored for a long time.

Herein, any two or more storage portions of the matrix storage portion 11, the diagonal matrix storage portion 13, the eigenvalue decomposition storage portion 16, the eigenvalue storage portion 18, and the eigenvector storage portion 20 may be realized as the same storage medium, or may be realized as different storage media. In the former case, for example, an area in which the symmetric matrix A is stored functions as the matrix storage portion 11, and an area in which the symmetric tridiagonal matrix T and the like are stored functions as the diagonal matrix storage portion 13.

Furthermore, each storage portion of the matrix storage portion 11, the diagonal matrix storage portion 13, the eigenvalue decomposition storage portion 16, the eigenvalue storage portion 18, and the eigenvector storage portion 20 may be constituted by two or more storage media.

Next, the operation of the eigenvalue decomposition apparatus 1 according to this embodiment will be described with reference to the flowchart in FIG. 2.

(step S101) The diagonalization portion 12 reads the symmetric matrix A stored in the matrix storage portion 11, computes the symmetric tridiagonal matrix T by tridiagonalizing the matrix A, and stores the symmetric tridiagonal matrix T in the diagonal matrix storage portion 13.

(step S102) The matrix dividing portion 14, the eigenvalue decomposition portion 15, and the eigenvalue computing portion 17 compute the eigenvalues of the symmetric tridiagonal matrix T, and store the eigenvalues in the eigenvalue storage portion 18. This process will be described later in detail.

(step S103) The eigenvector computing portion 19 reads the symmetric tridiagonal matrix T from the diagonal matrix storage portion 13, reads the eigenvalues of the symmetric tridiagonal matrix T from the eigenvalue storage portion 18, computes the eigenvectors of the symmetric tridiagonal matrix T, and stores the eigenvectors in the eigenvector storage portion 20. This process will be described later in detail.

In this manner, the eigenvalue decomposition on the symmetric tridiagonal matrix T ends. The eigenvalues of the symmetric matrix A are the same as those of the symmetric tridiagonal matrix T, and thus the eigenvalues of the symmetric matrix A also have been computed. Furthermore, as described later, the eigenvectors of the symmetric matrix A also can be easily computed based on the eigenvectors of the symmetric tridiagonal matrix T by performing predetermined transformation.

Next, the processes in steps S101 and S102 of the flowchart in FIG. 2, that is, the process leading to computation of the eigenvalues of the symmetric tridiagonal matrix T will be described in more detail. First, the process in step S102 of the flowchart in FIG. 2 will be described with reference to the flowchart in FIG. 3.

(step S201) The matrix dividing portion 14 reads the symmetric tridiagonal matrix T from the diagonal matrix storage portion 13, divides the symmetric tridiagonal matrix T into two symmetric tridiagonal matrices, and stores the symmetric tridiagonal matrices in the diagonal matrix storage portion 13. The matrix dividing portion 14 repeats the process of dividing the symmetric tridiagonal matrix into two symmetric tridiagonal matrices, until the size of each of the symmetric tridiagonal matrices after the division becomes equal to or smaller than a predetermined size. This process will be described later in detail.

(step S202) The eigenvalue decomposition portion 15 performs eigenvalue decomposition on each of the symmetric tridiagonal matrices whose size is equal to or smaller than the predetermined size stored in the diagonal matrix storage portion 13. The eigenvalue decomposition portion 15 stores eigenvalues obtained by performing the eigenvalue decomposition and matrix elements, which are part of elements of orthogonal matrices constituted by eigenvectors, in the eigenvalue decomposition storage portion 16.

(step S203) The eigenvalue computing portion 17 reads the eigenvalues and the matrix elements of the symmetric tridiagonal matrices from the eigenvalue decomposition storage portion 16, computes eigenvalues of the symmetric tridiagonal matrix that is the division origin and matrix elements of the symmetric tridiagonal matrix that is the division origin, and stores the eigenvalues and the matrix elements in the eigenvalue decomposition storage portion 16. The eigenvalue computing portion 17 repeats the process of computing eigenvalues and matrix elements of the symmetric tridiagonal matrix that is the division origin, until an eigenvalue of the symmetric tridiagonal matrix T is computed, and stores the eigenvalue of the symmetric tridiagonal matrix T in the eigenvalue storage portion 18. In this manner, the process of computing eigenvalues ends.

[Diagonalization of the Symmetric Matrix A]

It is known that the symmetric matrix A can be tridiagonalized as shown below, for example, using Householder transformation or the like. Here, the symmetric tridiagonal matrix T is a square matrix in which the number of rows is equal to that of columns.

$$P^T A P = T,$$

$$T = \begin{pmatrix} t_1 & t_2 & & 0 \\ t_2 & t_3 & \ddots & \\ & \ddots & \ddots & t_{2n-2} \\ 0 & & t_{2n-2} & t_{2n-1} \end{pmatrix}$$

where A is an n×n real symmetric matrix, and P is an orthogonal matrix.

Accordingly, the diagonalization portion 12 can read the symmetric matrix A from the matrix storage portion 11, and computes the symmetric tridiagonal matrix T, as described above. The computed symmetric tridiagonal matrix T is stored in the diagonal matrix storage portion 13 (step S101).

[Division of the Symmetric Tridiagonal Matrix T]

Next, the process of dividing the symmetric tridiagonal matrix T will be described. As shown in the following equation, in a case where an n×n symmetric tridiagonal matrix T is given, this matrix can be divided into two symmetric tridiagonal matrices $T_1$ and $T_2$ and other elements ($\theta$ and $\beta$ below).

$$T = \begin{pmatrix} T_1 & 0 \\ 0 & T_2 \end{pmatrix} + \theta\beta \begin{pmatrix} e_l \\ \theta^{-1} e_f \end{pmatrix} \begin{pmatrix} e_l^T & \theta^{-1} e_f^T \end{pmatrix}$$

where T is an n×n real symmetric tridiagonal matrix (n is an integer of 2 or more), $T_1$ is an $n_1 \times n_1$ real symmetric tridiagonal matrix, $T_2$ is an $(n-n_1) \times (n-n_1)$ real symmetric tridiagonal matrix, $e_l = (0, \ldots, 0, 1)^T \in R^{n_1}$, $e_f = (1, 0, \ldots, 0)^T \in R^{n-n_1}$, $\beta$ is the element of $(n_1+1, n_1)$ of T, and $\theta$ is a non-zero constant.

Here, $n_1$ is an integer satisfying $1 < n_1 < n$. For example, a specific process of dividing an 8×8 symmetric tridiagonal matrix T into half-sized matrices is as follows.

$$T = \begin{pmatrix} t_1 & t_2 & & & & & & \\ t_2 & t_3 & t_4 & & & & & \\ & t_4 & t_5 & t_6 & & & & \\ & & t_6 & t_7 & t_8 & & & \\ \hline & & & t_8 & t_9 & t_{10} & & \\ & & & & t_{10} & t_{11} & t_{12} & \\ & & & & & t_{12} & t_{13} & t_{14} \\ & & & & & & t_{14} & t_{15} \end{pmatrix}$$

$$= \begin{pmatrix} t_1 & t_2 & & & & & & \\ t_2 & t_3 & t_4 & & & & & \\ & t_4 & t_5 & t_6 & & & & \\ & & t_6 & t_7 - \theta t_8 & & & & \\ \hline & & & & t_9 - t_8/\theta & t_{10} & & \\ & & & & t_{10} & t_{11} & t_{12} & \\ & & & & & t_{12} & t_{13} & t_{14} \\ & & & & & & t_{14} & t_{15} \end{pmatrix} +$$

$$\begin{pmatrix} & & & & & & & \\ & & & & & & & \\ & & & & & & & \\ & & & \theta t_8 & t_8 & & & \\ & & & t_8 & t_8/\theta & & & \\ & & & & & & & \\ & & & & & & & \\ & & & & & & & \end{pmatrix}$$

$$= \begin{pmatrix} T_1 & 0 \\ 0 & T_2 \end{pmatrix} + \theta \beta \begin{pmatrix} e_l \\ \theta^{-1} e_f \end{pmatrix} (e_l^T \quad \theta^{-1} e_f^T)$$

Herein, $\beta = t_8$, and $\theta$ can be freely set so as to reduce calculation errors. Furthermore, in each of the matrices, matrix elements that are not clearly specified are 0. Each clearly specified element of each of the matrices may not be 0, or may be 0. In order to perform parallel processing as appropriate, it is preferable that $n_1$ is the largest integer not greater than $n/2$ or the smallest integer not less than $n/2$ (the process of dividing a matrix into two matrices using $n_1$ is referred to as a process of 'dividing a matrix into two substantially half matrices').

$$n_1 = \lfloor n/2 \rfloor$$

In this embodiment, $n_1$ is taken as shown in this equation. It will be appreciated that $n_1$ may be any value in the range of $1 < n_1 < n$ as described above.

Accordingly, as described above, the matrix dividing portion 14 can read the symmetric tridiagonal matrix T stored in the diagonal matrix storage portion 13 and divide the symmetric tridiagonal matrix T into two symmetric tridiagonal matrices $T_1$ and $T_2$ and two values $\beta$ and $\theta$, and can repeat the dividing process. The matrix dividing portion 14 stores the two symmetric tridiagonal matrices $T_1$ and $T_2$ and two values $\beta$ and $\theta$ after the division in the diagonal matrix storage portion 13. Information indicating from which division the two values $\beta$ and $\theta$ are obtained is preferably stored in the diagonal matrix storage portion 13. FIG.

4 is a flowchart showing the process in which the matrix dividing portion 14 divides a matrix in step S201 of the flowchart in FIG. 3.

(step S301) The matrix dividing portion 14 sets a counter I to '1'.

(step S302) The matrix dividing portion 14 reads a symmetric tridiagonal matrix that has not been subjected to the Ith division from the diagonal matrix storage portion 13, and divides the symmetric tridiagonal matrix into two symmetric tridiagonal matrices and other elements. Then, the matrix dividing portion 14 stores the two symmetric tridiagonal matrices and other elements obtained by the division in the diagonal matrix storage portion 13.

(step S303) The matrix dividing portion 14 judges whether or not a symmetric tridiagonal matrix that has not been subjected to the Ith division is stored in the diagonal matrix storage portion 13. If a symmetric tridiagonal matrix that has not been subjected to the Ith division is stored in the diagonal matrix storage portion 13, the procedure returns to step S302. If not, the procedure proceeds to step S304.

(step S304) The matrix dividing portion 14 judges whether or not the size of the symmetric tridiagonal matrices after the Ith division is equal to or smaller than a predetermined size. For example, the matrix dividing portion 14 may read a target matrix size (e.g., 25×25, etc.) from a storage medium (not shown) in which the target matrix size is stored, and judge whether or not the size of the symmetric tridiagonal matrices after the Ith division stored in the diagonal matrix storage portion 13 is equal to or smaller than this size. If the size of the symmetric tridiagonal matrices after the Ith division is equal to or smaller than the predetermined size, the process of dividing the symmetric tridiagonal matrix ends. If not, the procedure proceeds to step S305.

(step S305) The matrix dividing portion 14 increments the counter I by 1. Then, the procedure returns to step S302.

Herein, in the flowchart in FIG. 4, the case was described in which the matrix dividing portion 14 divides each matrix into two substantially half matrices as described above, and thus the symmetric tridiagonal matrices after the Ith division have substantially the same size. However, in a case where the matrix dividing portion 14 does not divide each matrix into two substantially half matrices, the matrix dividing portion 14 is to repeat division so that each of matrices after the division is equal to or smaller than the predetermined size.

Furthermore, in the flowchart in FIG. 4, the case was described in which, in step S304, the matrix dividing portion 14 performs the process of comparing the size of matrices after the division stored in the diagonal matrix storage portion 13 with a predetermined size, but this is merely an example. The matrix dividing portion 14 may perform other processes in step S304. For example, in a case where the matrix dividing portion 14 divides each matrix into two substantially half matrices as described above, if the size of the symmetric tridiagonal matrix T that is the division origin can be known, then it can be known which division provides the target matrix size. Accordingly, in a case where the Nth division (N is an integer of 1 or more) provides the target matrix size, the algorithm may be used in which it is judged in step S304 whether or not I is N, and the procedure proceeds to step S305 if I is not N, or the series of processes end if I is N.

FIG. 5 is a diagram for illustrating division of a matrix. First, the matrix dividing portion 14 divides the symmetric tridiagonal matrix T into a symmetric tridiagonal matrix $T_1$ and a symmetric tridiagonal matrix $T_2$ as the first division (steps S301 and S302). Since there is only one symmetric tridiagonal matrix T, the matrix dividing portion 14 judges that there is no more matrix that has not been subjected to the first division (step S303). Furthermore, if the symmetric tridiagonal matrix $T_1$ and the like are not matrices whose size is equal to or smaller than the predetermined size (step S304), the matrix dividing portion 14 divides the symmetric tridiagonal matrix $T_1$ into a symmetric tridiagonal matrix $T_{11}$ and a symmetric tridiagonal matrix $T_{12}$ as the second division (steps S305 and S302). In this case, since there is the symmetric tridiagonal matrix $T_2$ that has not been subjected to the second division, the matrix dividing portion 14 also divides the symmetric tridiagonal matrix $T_2$ into a symmetric tridiagonal matrix $T_{21}$ and a symmetric tridiagonal matrix $T_{22}$ (steps S303 and S302). In this manner, the process of dividing the matrix is repeated until the size of each of the symmetric tridiagonal matrices after the division becomes equal to or smaller than a target size. In FIG. 5, elements ($\beta$ and $\theta$ above) other than the symmetric tridiagonal matrices are omitted. Furthermore, in FIG. 5, each of the symmetric tridiagonal matrices is a square matrix.

[Eigenvalue Decomposition on Matrices After Division]

If a matrix $T_i$ is a symmetric matrix, eigenvalue decomposition on the matrix $T_i$ is as follows.

$$T_i = Q_i D_i Q_i^T$$

In the equation, $D_i$ is a diagonal matrix having the same size as the matrix $T_i$. Each of the diagonal elements in $D_i$ is an eigenvalue of $T_i$. Furthermore, $Q_i$ is an orthogonal matrix constituted by the eigenvectors of the matrix $T_i$.

Accordingly, the eigenvalue decomposition portion 15 reads each of the symmetric tridiagonal matrices after division from the diagonal matrix storage portion 13, and performs eigenvalue decomposition as described above (step S202). For example, as described above, it is possible to use bisection and inverse iteration in combination, MR^3, QR, or the like, as an eigenvalue decomposition method. In a case where symmetric tridiagonal matrices are divided as shown in FIG. 5, the eigenvalue decomposition portion 15 performs eigenvalue decomposition on each of the symmetric tridiagonal matrices $T_{111}$, $T_{112}$, $T_{121}$, $T_{122}$, ..., $T_{222}$. Herein, the eigenvalue decomposition portion 15 stores eigenvalues obtained by performing the eigenvalue decomposition and matrix elements, which are part of elements of orthogonal matrices obtained by performing the eigenvalue decomposition, in the eigenvalue decomposition storage portion 16. Herein, which element in the orthogonal matrices is contained in a matrix element will be described later. Here, the eigenvalue decomposition portion 15 may store the eigenvalues and orthogonal matrices constituted by the eigenvectors in the eigenvalue decomposition storage portion 16, instead of storing the eigenvalues and the matrix elements in the eigenvalue decomposition storage portion 16. Also in this case, since the orthogonal matrices constituted by the eigenvectors are stored, at least the matrix elements have been stored.

Here, as described later, not the entire orthogonal matrix $Q_i$ but the first row and the last row of the orthogonal matrix $Q_i$ are necessary for computing the eigenvalues. Accordingly, in this eigenvalue decomposition, not the entire orthogonal matrix $Q_i$ but the first row and the last row of the orthogonal matrix $Q_i$ may be obtained. For this purpose, for example, a matrix Y represented by the following equation can be used instead of the identity matrix I, as an initial value in computation of the orthogonal matrix $Q_i$, in DSTEQR, which is a QR eigenvalue decomposition routine provided in LAPACK3.0.

$$Y = \begin{pmatrix} 1 & 0 & \ldots & \ldots & 0 \\ 0 & \ldots & \ldots & 0 & 1 \end{pmatrix}$$

where $Q_i$ is an n×n orthogonal matrix, and Y is a 2×n matrix.

With this processing, the calculation area for obtaining the first row and the last row of the orthogonal matrix $Q_i$ with DSTEQR can be reduced. While the operation area $O(n^2)$ is necessary in a case where the orthogonal matrix $Q_i$ itself is to be computed, the operation area $O(n)$ is sufficient in a case where the first row and the last row of the orthogonal matrix $Q_i$ is to be computed using the matrix Y. As a result, the calculation amount is reduced, and the processing speed of the eigenvalue decomposition is improved. In this manner, the eigenvalue decomposition portion 15 may perform eigenvalue decomposition of computing the orthogonal matrix $Q_i$ itself, on a symmetric tridiagonal matrix after the division, or may perform a process of computing part of elements of the orthogonal matrix (in this example, the first row and the last row). The latter process is also referred to as eigenvalue decomposition. In this manner, the eigenvalue decomposition portion 15 may perform eigenvalue decomposition on each of the symmetric tridiagonal matrices whose size is equal to or smaller than the predetermined size, compute at least eigenvalues of each of the symmetric tridiagonal matrices and matrix elements (in this example, the first row and the last row) of an orthogonal matrix constituted by eigenvectors of each of the symmetric tridiagonal matrices, and store the eigenvalues and the matrix elements in the eigenvalue decomposition storage portion 16.

[Computation of Eigenvalues]

First, the process of computing eigenvalues and the like of the symmetric tridiagonal matrix $T_0$ that is a division origin based on two symmetric tridiagonal matrices $T_1$ and $T_2$ after the division as shown in FIG. 6 will be described. It is assumed that eigenvalue decomposition has been performed on the symmetric tridiagonal matrices $T_1$ and $T_2$ as follows. Here, it is assumed that both of the symmetric tridiagonal matrices $T_1$ and $T_2$ are square matrices.

$$T_1 = Q_1 D_1 Q_1^T$$

$$T_2 = Q_2 D_2 Q_2^T$$

In this case, the symmetric tridiagonal matrix $T_0$ that is the division origin becomes as follows.

$$T_0 = Q_{12}(D_{12} + \rho z z^T)Q_{12}^T$$

$$Q_{12} \equiv \begin{pmatrix} Q_1 & 0 \\ 0 & Q_2 \end{pmatrix},$$

$$D_{12} \equiv \begin{pmatrix} D_1 & 0 \\ 0 & D_2 \end{pmatrix},$$

$$z \equiv \frac{1}{\sqrt{1 + \theta^{-2}}} \begin{pmatrix} l_1^T \\ \theta^{-1} f_2^T \end{pmatrix},$$

$$\rho \equiv \beta(\theta + \theta^{-1})$$

where $l_1$ is the last row of $Q_1$, and $f_2$ is the first row of $Q_2$.

In the formulae above, $\beta$ and $\theta$ are values described in the process of dividing symmetric tridiagonal matrices. Here, obtaining eigenvalue decomposition of the matrix $(D_{12} + \rho z z^T)$ means obtaining eigenvalue decomposition of the matrix $T_0$. The reason for this is that if eigenvalue decomposition $D_{12} + \rho z z^T = QDQ^T$ of the matrix $(D_{12} + \rho z z^T)$ is obtained, the following equation is obtained, and eigenvalue decomposition on the matrix $T_0$ is completed.

$$T_0 = Q_{12}(QDQ^T)Q_{12}^T = (Q_{12}Q)D(Q_{12}Q)^T = = Q_0 D Q_0^T$$

Next, the method for computing eigenvalues of the matrix $(D_{12} + \rho z z^T)$ will be described. If it is assumed that an eigenvalue of the matrix $(D_{12} + \rho z z^T)$ is taken as $\lambda_i$ and an eigenvector is taken as $q_i$, the following equation is obtained.

$$(D_{12} + \rho z z^T) q_i = \lambda_i q_i$$

(1) The case where the elements of z do not include 0 and the diagonal elements of $D_{12}$ do not include the same value First, the case where the elements of z do not include 0 and the diagonal elements of $D_{12}$ do not include the same value will be described. In this case, the equation above can be sequentially modified as shown below.

$$(D_{12} - \lambda_i I) q_i = -\rho(z^T q_i) z$$

$$z^T q_i = -\rho(z^T q_i) z^T (D_{12} - \lambda_i I)^{-1} z$$

$$1 + \rho\, z^T (D_{12} - \lambda_i I)^{-1} z = 0$$

Here, if it is assumed that $$D_{12} = \mathrm{diag}(d_1, d_2, \ldots, d_n)$$

$$z = (z_1, z_2, \ldots, z_n)^T$$

are satisfied, the following eigenvalue equation can be obtained. The eigenvalues $\lambda_i$ (i=1, 2, ..., n) are n solutions of the eigenvalue equation. Here, $f(\lambda)$ below is monotonically increasing, and the range of the solution for $f(\lambda)=0$ is already known. Thus, the calculation can be performed using the Newton's method.

$$f(\lambda) = 1 + \rho \sum_{j=1}^{n} \frac{z_j^2}{d_j - \lambda} = 0 \qquad \text{Equation 1}$$

Here, $D = \mathrm{diag}(\lambda_1, \lambda_2, \ldots, \lambda_n)$. Since the matrix Q is an orthogonal matrix constituted by the eigenvectors of the matrix $(D_{12} + \rho zz^T)$, $Q = (q_1, q_2, \ldots, q_n)$. Accordingly, if the eigenvector $q_i$ is obtained, the matrix Q can be obtained. The eigenvector $q_i$ is given as the following equation.

$$q_i = \frac{\left(\frac{z_1}{d_1 - \lambda_i}, \frac{z_2}{d_2 - \lambda_i}, \ldots, \frac{z_n}{d_n - \lambda_i}\right)^T}{\sqrt{\sum_{k=1}^{n} \frac{z_k^2}{(d_k - \lambda_i)^2}}} \qquad \text{Equation 2}$$

(2) The case where the elements of z include 0

In a case where the elements of z include 0, the order of the matrix can be reduced, and eigenvalues and eigenvectors can be obtained using the matrix whose order has been reduced. The operation of reducing the order of the matrix is referred to as deflation.

If $z_j = 0$, $(d_j, e_j)$ is a pair of the eigenvalue and the eigenvector as shown in the following equation. In the equation, $e_j$ is a unit vector in which the jth element is 1 and the other elements are 0.

$$((D_{12} + \rho zz^T) - d_j I) e_j = (D_{12} - d_j I) e_j + \rho z(z^T e_j)$$
$$= 0$$

Furthermore, the eigenvalue equation of the matrix $(D_{12} + \rho zz^T)$ is as the following equation.

$$|D_{12} + \rho zz^T - \lambda_i I_n| = (d_j - \lambda_i) |\hat{D}_{12} + \rho \hat{z}\hat{z}^T - \lambda_i I_{n-1}|$$

where $\hat{D}_{12} + \rho \hat{z}\hat{z}^T$ is a submatrix in which the jth row and the jth column of $D_{12} + \rho zz^T$ have been excluded, and $I_n$ is an identity matrix of order n.

Accordingly, the eigenvalues in a case where $z_j = 0$ are $d_j$ and values obtained by solving the eigenvalue equation of Equation 1 on a submatrix in which the jth row and the jth column of the matrix $(D_{12} + \rho zz^T)$ have been excluded. That is to say, the eigenvalues are $d_j$ and values obtained by solving the following eigenvalue equation. Here, the eigenvalues obtained by solving the following eigenvalue equation are represented as the eigenvalue $\lambda_i$ (i=1, 2, ..., j−1, j+1, ..., n).

$$f(\lambda) = 1 + \rho \sum_{\substack{k=1 \\ k \ne j}}^{n} \frac{z_k^2}{d_k - \lambda} = 0$$

The eigenvectors are n-dimensional vectors represented as the following equation in which 0 is interposed between the (j−1)th row and the jth row of the (n−1)-dimensional eigenvectors computed in Equation 2 on the submatrix in which the jth row and the jth column of the matrix $(D_{12} + \rho zz^T)$ have been excluded, and $e_j$ described above.

$$q_i =$$

$$\frac{\left(\frac{z_1}{d_1 - \lambda_i}, \frac{z_2}{d_2 - \lambda_i}, \ldots, \frac{z_{j-1}}{d_{j-1} - \lambda_i}, 0, \frac{z_j}{d_j - \lambda_i}, \ldots, \frac{z_n}{d_n - \lambda_i}\right)^T}{\sqrt{\sum_{\substack{k=1 \\ k \ne j}}^{n} \frac{z_k^2}{(d_k - \lambda_i)^2}}}$$

$(i \ne j)$ $$q_j = e_j$$

In this manner, in a case where the elements of z include 0, eigenvalue decomposition is performed on a matrix whose order is lower than that of the matrix $(D_{12} + \rho zz^T)$. Accordingly, the calculation can be performed at high speed, and thus the calculation time can be made shorter.

(3) The case where the diagonal elements of $D_{12}$ include the same value

Also in a case where $d_{j+1} = d_{j+2} = \ldots = d_k$, eigenvalues and eigenvectors can be computed by performing deflation as described above.

Regarding $\hat{z} = (z_{j+1}, z_{j+2}, \ldots, z_k)^T$, two orthogonal matrices below a considered.

$$\hat{Q}\hat{z} = (*, 0, 0, \ldots, 0, 0)^T$$

$$Q = \begin{pmatrix} I_j & & \\ & \hat{Q} & \\ & & I_{n-k} \end{pmatrix}$$

where $\hat{Q} \in R^{(k-j) \times (k-j)}$, and * is a certain real number.

Then, based on $d_{j+1} = d_{j+2} = \ldots = d_k$, $$\tilde{Q} D_{12} \tilde{Q}^T = D_{12}$$

$\tilde{Q} z = (z_1, z_2, \ldots, z_j, *, 0, z_{k+1}, \ldots, z_n)^T = \tilde{z}$. Accordingly, the following equation is obtained.

$$D_{12} + \rho zz^T = \tilde{Q}^T (D_{12} + \rho \tilde{z}\tilde{z}^T) \tilde{Q}$$

Here, the eigenvalues and the eigenvectors of $D_{12} + \rho \tilde{z}\tilde{z}^T$ can be obtained as in the case of deflation in which the elements of z include 0. Furthermore, $\tilde{Q}$ is uniquely determined except for the arbitrariness of the sign.

Herein, the computation method will be described. First, an orthogonal matrix satisfying the following equation will be considered.

$$\hat{Q}_{j+1,i}(z_{j+1}, \ldots, z_k)^T = (*, z_{j+2}, \ldots, z_{i-1}, 0, z_{i+1}, \ldots, z_k)^T$$

If the orthogonal matrix is taken as the following equation, the equation above is satisfied.

$$\hat{Q}_{j+1,i} = \begin{pmatrix} \frac{z_{j+1}}{\sqrt{z_{j+1}^2 + z_i^2}} & & \frac{z_i}{\sqrt{z_{j+1}^2 + z_i^2}} & \\ & I_{i-j-2} & & \\ \frac{-z_i}{\sqrt{z_{j+1}^2 + z_i^2}} & & \frac{z_{j+1}}{\sqrt{z_{j+1}^2 + z_i^2}} & \\ & & & I_{k-i} \end{pmatrix}$$

Here, the value of * in the equation above is obtained based on the following equation.

$$\hat{Q}_{j+1,i}(z_{j+1}, \ldots, z_i, \ldots, z_k)^T$$

Accordingly, $\hat{Q} = \hat{Q}_{j+1,j+2} \hat{Q}_{j+1,j+3} \cdots \hat{Q}_{j+1,k}$. As a result, $\tilde{Q}$ also can be obtained except for the arbitrariness of the sign. In this manner, also in a case where $d_{j+1} = d_{j+2} = \ldots = d_k$, the eigenvalues and the eigenvectors of the matrix $(D_{12} + \rho zz^T)$ can be obtained. That is to say, the eigenvalues are $d_{j+2}, d_{j+3}, \ldots, d_k$ and values obtained by solving the following eigenvalue equation. Here, the eigenvalues obtained by solving the following eigenvalue equation are represented as the eigenvalue $\lambda_i$ (i=1, 2, ..., j+1, k+1, ..., n).

$$f(\lambda) = 1 + \rho \sum_{\substack{m=1 \\ m \neq j+2, \ldots, k}}^{n} \frac{z_m^2}{d_m - \lambda} = 0$$

The eigenvectors become as follows.

$$q_i = \begin{cases} \tilde{Q}^T \dfrac{\left(\dfrac{\tilde{z}_1}{d_1 - \lambda_i}, \dfrac{\tilde{z}_2}{d_2 - \lambda_i}, \ldots, \dfrac{\tilde{z}_n}{d_n - \lambda_i}\right)^T}{\sqrt{\sum_{k=1}^{n} \dfrac{\tilde{z}_k^2}{(d_k - \lambda_i)^2}}} & (1 \leq i \leq j+1, k+1 \leq i \leq n) \\ \tilde{Q}^T e_i & (j+2 \leq i \leq k) \end{cases}$$

Here, in (2) the case where the elements of z include 0 or (3) the case where the diagonal elements of $D_{12}$ include the same value, slight errors may be taken into consideration in judging whether or not the elements of z include 0 or whether or not the diagonal elements of $D_{12}$ include the same value. For example, in a case where the following formulae are satisfied, it is possible to judge that the elements of z include 0, and that the diagonal elements of $D_{12}$ include the same value.

$$|z_i| < TOL_1$$

$$|d_{j+1} - d_k| < TOL_2$$

where $$TOL_1 = \max(z_1, z_2, \ldots, z_n) \times \epsilon, \; TOL_2 = \max(d_1, d_2, \ldots, d_n) \times \epsilon$$

In the formulae, $\epsilon$ may be a value obtained by multiplying the machine epsilon by a constant (a real number such as 2, 4, or 8, and preferably a value selected for reducing calculation errors), or may be other appropriate values.

In this manner, in each of (1) the case where the elements of z do not include 0 and the diagonal elements of $D_{12}$ do not include the same value, (2) the case where the elements of z include 0, and (3) the case where the diagonal elements of $D_{12}$ include the same value, eigenvalue decomposition $D_{12} + \rho zz^T = QDQ^T$ is obtained. Accordingly, since the matrix $Q_0$ can be obtained based on the matrix Q and the matrix $Q_{12}$, and the matrix D has been determined, eigenvalue decomposition can be performed on the symmetric tridiagonal matrix $T_0$ that is the division origin. The method in which a target matrix is divided into two submatrices, eigenvalue decomposition is performed on each of the submatrices after the division, and then the eigenvalue decomposition of each of the submatrices is used to perform eigenvalue decomposition on the matrix that is the division origin is referred to as Divide and Conquer (D&C).

In D&C, eigenvectors are also computed. In the process of computing the eigenvectors, matrix calculation has to be performed. Thus, D&C requires very heavy load in the process. In a case where eigenvalue decomposition is performed by D&C, for example, approximately 95% of calculation time may be used for the vector update process in which eigenvectors are computed (e.g., matrices are multiplied in order to compute the matrix $Q_0$ based on the matrix Q and the matrix $Q_{12}$ as described above).

On the other hand, in a case where only eigenvalues of the matrix $T_0$ that is the division origin are to be computed, this process can be simplified. Next, this method will be described. Based on the above-mentioned result, the following equations are obtained.

$$f = f_{12} Q \qquad \text{Equation 3}$$

$$l = l_{12} Q \qquad \text{Equation 4}$$

where f is the first row of $Q_0$ and l is the last row of $Q_0$, $f_{12}$ is the first row of $Q_{12}$ and $f_{12} = (f_1, 0, \ldots, 0)$, $l_{12}$ is the last row of $Q_{12}$ and $l_{12} = (0, \ldots, 0, l_2)$, and $f_1$ is the first row of $Q_1$ and $l_2$ is the last row of $Q_2$.

In the equations, as described above, f is the first row of an orthogonal matrix obtained by performing eigenvalue decomposition on the matrix $T_0$, and l is the last row of the orthogonal matrix obtained by performing eigenvalue decomposition on the matrix $T_0$. The f and l, that is, the first row and the last row of the orthogonal matrix are matrix elements. In a case where the columns are switched as described later in the orthogonal matrix $Q_{12}$, $f_{12}$ and $l_{12}$ are respectively the first row and the last row of the orthogonal matrix $Q_{12}$ in which the columns have been switched.

Based on the above-described result, in a case where the matrix $T_0$ that is the division origin is built based on the matrices $T_1$ and $T_2$ as shown in FIG. 6, $\lambda_i$, f,l can be computed for the matrix $T_0$. It is possible to finally compute eigenvalues of the symmetric tridiagonal matrix T in which the symmetric matrix A is tridiagonalized, by repeating this process.

Here, in (3) the case where the diagonal elements of $D_{12}$ include the same value, Equations 3 and 4 become as follows.

$$f = f_{12} Q = f_{12} \tilde{Q}^T \overline{Q}$$

$$l = l_{12} Q = l_{12} \tilde{Q}^T \overline{Q}$$

where $\overline{Q} = \tilde{Q} Q$.

Here, in a case where the above equations are to be calculated, $f_{12}\tilde{Q}^T$, $1_{12}\tilde{Q}^T$ may be calculated first, and then multiplied by $\overline{Q}$, because this calculation order reduces the calculation amount.

Accordingly, as described above, the eigenvalue computing portion 17 reads the eigenvalues and the matrix elements from the eigenvalue decomposition storage portion 16, reads β and θ related to other elements generated at the time of the matrix division, from the diagonal matrix storage portion 13, and uses them to compute eigenvalues and matrix elements of the symmetric tridiagonal matrix that is the division origin. Then, eigenvalues of the symmetric tridiagonal matrix T are finally computed by repeating this computation process. FIG. 7 is a flowchart showing the process in which the eigenvalue computing portion 17 computes eigenvalues in step S203 of the flowchart in FIG. 3.

(step S401) The eigenvalue computing portion 17 sets a counter J to '1'.

(step S402) The eigenvalue computing portion 17 judges whether or not the Jth computation of eigenvalues is the last computation of eigenvalues. Herein, the last computation of eigenvalues refers to a process of computing eigenvalues of the symmetric tridiagonal matrix T. If the Jth computation of eigenvalues is the last computation of eigenvalues, the procedure proceeds to step S406. If not, the procedure proceeds to step S403.

(step S403) The eigenvalue computing portion 17 computes eigenvalues and the like of the symmetric tridiagonal matrix that is the division origin. This process will be described later in detail.

(step S404) The eigenvalue computing portion 17 judges whether or not eigenvalues and the like of all symmetric tridiagonal matrices that are the division origins have been computed in the Jth computation of eigenvalues. If eigenvalues and the like of all symmetric tridiagonal matrices that are the division origins have been computed in the Jth computation of eigenvalues, the procedure proceeds to step S405. If not, the procedure returns to step S403.

(step S405) The eigenvalue computing portion 17 increments the counter J by 1. Then, the procedure returns to step S402.

(step S406) The eigenvalue computing portion 17 computes eigenvalues of the symmetric tridiagonal matrix T, and stores the computed eigenvalues in the eigenvalue storage portion 18. In this manner, the series of processes of computing the eigenvalues of the symmetric tridiagonal matrix T end.

FIG. 8 is a flowchart showing a detailed process in step S403 of the flowchart in FIG. 7. Before performing the process of the flowchart in FIG. 8, diagonal elements of the diagonal matrix $D_{12}$ are preferably rearranged in ascending order or descending order. In this case, columns of the orthogonal matrix $Q_{12}$ and elements of z are also rearranged as in the rearrangement of the diagonal matrix $D_{12}$. More specifically, in a case where the ith element and the jth element of the diagonal matrix $D_{12}$ are switched, the ith column and the jth column of the orthogonal matrix $Q_{12}$ are to be switched, and the ith row and the jth row of z are to be switched.

(step S501) The eigenvalue computing portion 17 computes eigenvalues of the matrix that is the division origin using Equation 1 and the like. Then, the eigenvalue computing portion 17 stores the computed eigenvalues in the eigenvalue decomposition storage portion 16.

(step S502) The eigenvalue computing portion 17 computes $q_i$ based on Equation 2 and the like, using the eigenvalues computed in step S501. Computation of $q_i$ means computation of the matrix Q whose column vector is represented as $q_i$. The eigenvalue computing portion 17 may temporarily store the computed matrix Q in a storage medium (not shown).

(step S503) The eigenvalue computing portion 17 computes the matrix elements f and l related to the matrix that is the division origin, using the matrix Q computed in step S502. The matrix elements are shown in Equations 3 and 4. The eigenvalue computing portion 17 stores the computed matrix elements of the matrix that is the division origin in the eigenvalue decomposition storage portion 16. In this manner, the process in step S403 ends.

Here, in the flowchart in FIG. 8, in a case where the elements of z do not include 0 and the diagonal elements of $D_{12}$ do not include the same value, the eigenvalues and the matrix Q constituted by the eigenvectors can be computed as in (1) above. Furthermore, in a case where the elements of z include 0 and the diagonal elements of $D_{12}$ do not include the same value, the eigenvalues and the matrix Q constituted by the eigenvectors can be computed as in (2) above. Furthermore, in a case where the diagonal elements of $D_{12}$ include the same value, the eigenvalues and the matrix Q constituted by the eigenvectors can be computed as in (3) above, regardless of whether or not the elements of z include 0. In a case where eigenvalues and the like are computed as in (3) above, f and l may be computed by causing a matrix constituting the matrix Q to directly act on $f_{12}$ and the like, instead of computing the matrix Q as described above.

Furthermore, in the flowchart in FIG. 8, the case was shown in which the matrix elements f and l are computed at a time based on the matrix Q, but the matrix elements f and l may be calculated element by element. As clearly seen from Equations 3 and 4, the ith elements of the matrix elements f and l are obtained by multiplying $f_{12}$ and $l_{12}$ by the eigenvector $q_i$. In a case where the matrix elements f and l are calculated using this method, the calculation can be performed by sequentially changing the value of i only for the eigenvector $q_i$ and storing the result. Accordingly, in calculation of the matrix elements f and l, the entire matrix Q does not have to be stored, and thus the operation area on a memory used for the calculation can be reduced.

FIG. 9 is a diagram for illustrating the process of computing eigenvalues. It is assumed that the result of eigenvalue decomposition performed by the eigenvalue decomposition portion 15 on the matrices $T_{111}, T_{112}, \ldots, T_{222}$, that is, the eigenvalues and the matrix elements of the matrices are stored in the eigenvalue decomposition storage portion 16. First, the eigenvalue computing portion 17 starts the first computation of eigenvalues and the like (steps S401 and S402). Herein, the first computation of eigenvalues and the like refers to a process of computing eigenvalues and matrix elements of the second matrices from the bottom based on the eigenvalues and the matrix elements of the matrices at the bottom in FIG. 9. The eigenvalue computing portion 17 reads the eigenvalues of the matrices $T_{111}$ and $T_{112}$ and the matrix elements of the matrices $T_{111}$ and $T_{112}$, from the eigenvalue decomposition storage portion 16. Also, the eigenvalue computing portion 17 reads two values β and θ generated at the time of decomposition of the matrix $T_{11}$ into the matrices $T_{111}$ and $T_{112}$, from the diagonal matrix storage portion 13. Then, the eigenvalue computing portion 17 computes eigenvalues of the matrix $T_{11}$ using these values, and stores the eigenvalues in the eigenvalue decomposition storage portion 16 (step S501). Next, the eigenvalue computing portion 17 computes the orthogonal matrix Q using the eigenvalues of the matrix $T_{11}$ (step S502), computes matrix elements of the matrix $T_{11}$ using the orthogonal matrix Q, and stores the matrix elements in the eigenvalue decomposition storage portion 16 (step S503).

Since the first computation of eigenvalues and the like has not ended yet (step S404), the eigenvalue computing portion 17 computes eigenvalues and matrix elements of the matrix $T_{12}$ based on the eigenvalues, the matrix elements, and the like of the matrices $T_{121}$ and $T_{122}$ as described above (steps S402 and S403). In this manner, the first computation of eigenvalues and the like ends. Then, the eigenvalue computing portion 17 performs the second computation of eigenvalues and the like, that is, computation of eigenvalues and matrix elements of the matrix $T_1$ based on the eigenvalues, the matrix elements, and the like of the matrices $T_{11}$ and $T_{12}$ (steps S404, S405, S402 and S403). Subsequently, the eigenvalue computing portion 17 computes eigenvalues and matrix elements of the matrix $T_2$ based on the eigenvalues, the matrix elements, and the like of the matrices $T_{21}$ and $T_{22}$ in a similar manner (steps S404 and S403).

If the eigenvalue computing portion 17 ends the second computation of eigenvalues and the like (step S404), since the next computation of eigenvalues and the like is the last process of obtaining the eigenvalues of the symmetric tridiagonal matrix T (steps S405 and S402), the eigenvalue computing portion 17 computes only the eigenvalues, and stores the computed eigenvalues in the eigenvalue storage portion 18 (step S406). In this manner, the computation of eigenvalues ends.

Here, in a case where eigenvalues of the matrix T are to be computed based on the eigenvalues, the matrix elements, and the like of matrices $T_1$ and $T_2$ in FIG. 9, it is sufficient to use only the matrix elements $f_1$ and $l_2$ or the matrix elements $f_2$ and $l_1$. Accordingly, in a case where the matrix elements of the matrices $T_1$ and $T_2$ are to be computed, it is not necessary to compute the matrix elements $f_1$ and $l_2$ or the matrix elements $f_2$ and $l_1$. With this processing, the calculation amount can be reduced, and the processing speed can be improved.

Next, the eigenvector computing portion 19 will be described. In this embodiment, (1) the case where the eigenvector computing portion 19 computes eigenvectors using qd-type twisted factorization and (2) the case where the eigenvector computing portion 19 computes eigenvectors using LV-type twisted factorization will be described.

(1) The Case Where Eigenvectors are Computed Using qd-type Twisted Factorization FIG. 10 is a diagram showing the configuration of the eigenvector computing portion 19 in a case where eigenvectors are computed using qd-type twisted factorization. In FIG. 10, the eigenvector computing portion 19 includes a positive-definite forming portion 21, a Cholesky decomposition portion 22, and a vector computing portion 23.

The positive-definite forming portion 21 reads the eigenvalues of the symmetric tridiagonal matrix T from the eigenvalue storage portion 18, and judges whether or not any of the eigenvalues is a negative value. If any of the eigenvalues is a negative value, the positive-definite forming portion 21 reads the symmetric tridiagonal matrix T from the diagonal matrix storage portion 13, changes the symmetric tridiagonal matrix T into positive definite so that all eigenvalues of the symmetric tridiagonal matrix T are positive values, without changing the eigenvectors of the symmetric tridiagonal matrix T, stores the eigenvalues after the positive-definite formation in the eigenvalue storage portion 18, and stores the symmetric tridiagonal matrix T after the positive-definite formation in the diagonal matrix storage portion 13. The positive-definite formation is performed because, in a case where eigenvectors are computed using qd-type twisted factorization, all eigenvalues of the symmetric tridiagonal matrix T have to be positive values. Here, the matrix obtained by changing the symmetric tridiagonal matrix T into positive definite is also referred to as a symmetric tridiagonal matrix T. Furthermore, in a case where positive-definite formation is performed, Cholesky decomposition and the process of computing eigenvectors are performed on the symmetric tridiagonal matrix T and the eigenvalues after the positive-definite formation. This process will be described later in detail. Here, it is assumed that even in a case where positive-definite formation is performed, the eigenvalues before the positive-definite formation are stored in the eigenvalue storage portion 18. The reason for this is that the eigenvalues before the positive-definite formation are eigenvalues that are to be finally obtained by the eigenvalue decomposition apparatus 1. Furthermore, in a case where positive-definite formation is performed, and only eigenvectors are to be computed using qd-type twisted factorization, the symmetric tridiagonal matrix T stored in the diagonal matrix storage portion 13 may be overwritten by symmetric tridiagonal matrix T after the positive-definite formation. On the other hand, in a case where eigenvectors are to be computed also using LV-type twisted factorization, the symmetric tridiagonal matrix T before the positive-definite formation and the symmetric tridiagonal matrix T after the positive-definite formation are stored in the diagonal matrix storage portion 13.

The Cholesky decomposition portion 22 reads the symmetric tridiagonal matrix T in which all eigenvalues are positive values from the diagonal matrix storage portion 13, and reads the positive eigenvalues of the symmetric tridiagonal matrix T from the eigenvalue storage portion 18. Then, the Cholesky decomposition portion 22 performs Cholesky decomposition on the symmetric tridiagonal matrix T into an upper bidiagonal matrix $B^{(+1)}$ and a lower bidiagonal matrix $B^{(-1)}$, by performing qd-type transformation on each element of the symmetric tridiagonal matrix T. This process will be described later in detail. Here, 'performing Cholesky decomposition on the symmetric tridiagonal matrix T into an upper bidiagonal matrix $B^{(+1)}$ and a lower bidiagonal matrix $B(^{-1})$' may include performing Cholesky decomposition a matrix obtained by subtracting the eigenvalues of the symmetric tridiagonal matrix T multiplied by the unit vector, from the symmetric tridiagonal matrix T, into an upper bidiagonal matrix $B^{(+1)}$ and a lower bidiagonal matrix $B^{(-1)}$.

The vector computing portion 23 computes eigenvectors using each element of the upper bidiagonal matrix $B^{(+1)}$ and the lower bidiagonal matrix $B^{(-1)}$ computed by the Cholesky decomposition portion 22 and the positive eigenvalues of the symmetric tridiagonal matrix T, and stores the eigenvectors in the eigenvector storage portion 20. A matrix whose columns are represented as the eigenvectors is the orthogonal matrix in eigenvalue decomposition.

Next, the process in step S103 of the flowchart in FIG. 2, that is, the process of computing the eigenvectors of the symmetric tridiagonal matrix T will be described in more detail. First, the process in step S103 of the flowchart in FIG. 2 will be described with reference to the flowchart in FIG. 11.

(step S601) The positive-definite forming portion 21 reads the eigenvalues of the symmetric tridiagonal matrix T from the eigenvalue storage portion 18, and judges whether or not any of the eigenvalues is a negative value. If there is a negative value, the procedure proceeds to step S602. If not, the procedure proceeds to step S603.

(step S602) The positive-definite forming portion 21 reads the symmetric tridiagonal matrix T from the diagonal matrix storage portion 13, changes the symmetric tridiagonal matrix T into positive definite so that all eigenvalues of the symmetric tridiagonal matrix T are positive values, without changing the eigenvectors of the symmetric tridiagonal matrix T, stores the symmetric tridiagonal matrix T after the positive-definite formation in the diagonal matrix storage portion 13, and stores the eigenvalues after the positive-definite formation in the eigenvalue storage portion 18.

(step S603) The Cholesky decomposition portion 22 reads the symmetric tridiagonal matrix T in which all eigenvalues are positive values from the diagonal matrix storage portion 13, and reads the positive eigenvalues of the symmetric tridiagonal matrix T from the eigenvalue storage portion 18. Here, in a case where positive-definite formation is performed, the symmetric tridiagonal matrix T and the eigenvalues after the positive-definite formation are read. Then, the Cholesky decomposition portion 22 performs Cholesky decomposition on the symmetric tridiagonal matrix T into an upper bidiagonal matrix $B^{(+1)}$ and a lower bidiagonal matrix $B^{(-1)}$, by performing qd-type transformation on each element of the symmetric tridiagonal matrix T.

(step S604) The vector computing portion 23 computes eigenvectors using each element of the upper bidiagonal matrix $B^{(+1)}$ and the lower bidiagonal matrix $B^{(-1)}$ computed by the Cholesky decomposition portion 22 and the positive eigenvalues of the symmetric tridiagonal matrix T.

(step S605) The vector computing portion 23 normalizes the computed eigenvectors. More specifically, the vector computing portion 23 computes the norm of the computed eigenvectors, divides the eigenvectors by the computed norm to obtain the final eigenvectors, and stores the final eigenvectors in the eigenvector storage portion 20. In this manner, the eigenvalue decomposition on the symmetric tridiagonal matrix T ends.

Subsequently, the process of computing the eigenvectors of the symmetric matrix A stored in the matrix storage portion 11 may be performed, but has been omitted in this example.

Furthermore, in order to improve the accuracy of the eigenvectors computed by the eigenvector computing portion 19, a process relating to the eigenvectors may be performed as shown in FIG. 12, or may not be performed. More specifically, an inverse iteration processing portion (not shown) reads the eigenvectors computed by the eigenvector computing portion 19 from the eigenvector storage portion 20, processes the eigenvectors using inverse iteration, and stores the resultant eigenvectors in the eigenvector storage portion 20 (step S701). The accuracy of the eigenvectors can be improved by performing processes using inverse iteration in this manner. Next, a Gram-Schmidt processing portion (not shown) judges whether or not high accuracy is necessary (step S702). This judgment may be performed by reading the setting regarding whether or not high accuracy is necessary, from a storage medium or the like in which the setting is stored in advance. If high accuracy is necessary, the Gram-Schmidt processing portion (not shown) reads the eigenvectors processed using inverse iteration from the eigenvector storage portion 20, processes the eigenvectors using Gram-Schmidt method, and stores the resultant eigenvectors in the eigenvector storage portion 20 (step S703). The orthogonality of the eigenvectors can be improved by performing processes using Gram-Schmidt method in this manner. Herein, the inverse iteration and the Gram-Schmidt method are already known, and thus a detailed description thereof has been omitted.

[Positive-Definite Formation of Symmetric Tridiagonal Matrix T]

It is assumed that eigenvalue decomposition has been performed on the matrix T as follows.

$$T = QDQ^T$$

It is assumed that the matrix T is multiplied by a and shifted by sI as follows. In the formula, I represents an identity matrix having the same size as the matrix T, and a and s are real numbers.

$$T \rightarrow \hat{T} = aT + sI$$

The eigenvalue decomposition after the shift becomes as follows.

$$\hat{T} = Q\hat{D}Q^T$$

where $\hat{D} = aD + sI$.

In this manner, in a case where the matrix T is multiplied by a and shifted by sI, each eigenvalue is multiplied by a and shifted by s, but the eigenvectors are not changed. Accordingly, eigenvectors may be computed using twisted factorization, after all eigenvalues are changed into positive values with multiplication by a real number and shift in this manner.

In a case where computed eigenvalues include a negative value, for example, (A) shift may be performed using the minimum eigenvalue or (B) shift may be performed using the maximum eigenvalue. Here, it is assumed that the eigenvalues include a negative value and a positive value. In a case where all eigenvalues are positive values, shift does not have to be performed. In a case where all eigenvalues are negative values, the matrix T can be changed into positive definite simply by changing the matrix into −T.

(A) Shift Using the Minimum Eigenvalue

If the minimum eigenvalue is taken as $\lambda_{min} < 0$, a=1 and $s = -\lambda_{min} + \lambda_{max} \times \epsilon$. Here, $\epsilon$ may be a value obtained by multiplying the machine epsilon by a constant, or may be other appropriate values. In this manner, all eigenvalues of the matrix T can be changed into positive values by shifting the matrix T.

(B) Shift Using the Maximum Eigenvalue

If the maximum eigenvalue is taken as $\lambda_{max} > 0$, a=−1 and $s = \lambda_{max} - \lambda_{min} \times \epsilon$. In this case, the matrix T is transformed as follows.

$$T \rightarrow \hat{T} = -T + \lambda_{max} - \lambda_{min} \times \epsilon I = -(T - (\lambda_{max} - \lambda_{min} \times \epsilon)I)$$

In the parentheses in the right side of this equation, all eigenvalues are changed into negative values by shift, but positive-definite formation can be performed by multiplying the entirety by a minus sign. Here, $\epsilon$ may be a value obtained by multiplying the machine epsilon by a constant (a real number such as 2, 3, or 4, and preferably a value selected for reducing calculation errors), or may be other appropriate values, as in the case of (A).

In a case where the absolute value of the minimum eigenvalue is smaller than the absolute value of the maximum eigenvalue, the shift of (A) may be performed, and in a case where the absolute value of the minimum eigenvalue is larger than the absolute value of the maximum eigenvalue, the shift of (B) may be performed. With this processing, the shift amount can be reduced, and rounding errors can be reduced.

The process of computing eigenvectors after positive-definite formation will described in detail, together with that in the case of LV-type twisted factorization below.

(2) The Case Where Eigenvectors are Computed Using LV-Type Twisted Factorization FIG. 13 is a diagram showing the configuration of the eigenvector computing portion 19 in a case where eigenvectors are computed using LV-type twisted factorization. In FIG. 13, the eigenvector computing portion 19 includes a Cholesky decomposition portion 31 and a vector computing portion 32.

The Cholesky decomposition portion 31 reads the symmetric tridiagonal matrix T from the diagonal matrix storage portion 13, and reads the eigenvalues of the symmetric tridiagonal matrix T from the eigenvalue storage portion 18. Then, the Cholesky decomposition portion 31 performs Cholesky decomposition on the symmetric tridiagonal matrix T into an upper bidiagonal matrix $B^{(+1)}$ and a lower bidiagonal matrix $B^{(-1)}$, by performing Miura transformation, dLVv-type transformation, and inverse Miura transformation on each element of the symmetric tridiagonal matrix T. This process will be described later in detail. Here, 'performing Cholesky decomposition on the symmetric tridiagonal matrix T into an upper bidiagonal matrix $B^{(+1)}$ and a lower bidiagonal matrix $B^{(-1)}$' may include performing Cholesky decomposition a matrix obtained by subtracting the eigenvalues of the symmetric tridiagonal matrix T multiplied by the unit vector, from the symmetric tridiagonal matrix T, into an upper bidiagonal matrix $B^{(+1)}$ and a lower bidiagonal matrix $B^{(-1)}$.

The vector computing portion 32 computes eigenvectors using each element of the upper bidiagonal matrix $B^{(+1)}$ and the lower bidiagonal matrix $B^{(-1)}$ computed by the Cholesky decomposition portion 31 and the eigenvalues of the symmetric tridiagonal matrix T, and stores the eigenvectors in the eigenvector storage portion 20. A matrix whose columns are represented as the eigenvectors is the orthogonal matrix in eigenvalue decomposition.

Next, the process in step S103 of the flowchart in FIG. 2, that is, the process of computing the eigenvectors of the symmetric tridiagonal matrix T will be described in more detail. First, the process in step S103 of the flowchart in FIG. 2 will be described with reference to the flowchart in FIG. 14.

(step S801) The Cholesky decomposition portion 31 reads the symmetric tridiagonal matrix T from the diagonal matrix storage portion 13, and reads the eigenvalues of the symmetric tridiagonal matrix T from the eigenvalue storage portion 18. Then, the Cholesky decomposition portion 31 performs Cholesky decomposition on the symmetric tridiagonal matrix T into an upper bidiagonal matrix $B^{(+1)}$ and a lower bidiagonal matrix $B^{(-1)}$, by performing Miura transformation, dLVv-type transformation, and inverse Miura transformation on each element of the symmetric tridiagonal matrix T.

(step S802) The vector computing portion 32 computes eigenvectors using each element of the upper bidiagonal matrix $B^{(+1)}$ and the lower bidiagonal matrix $B^{(-1)}$ and the eigenvalues of the symmetric tridiagonal matrix T.

(step S803) The vector computing portion 32 normalizes the computed eigenvectors. More specifically, the vector computing portion 32 computes the norm of the computed eigenvectors, divides the eigenvectors by the computed norm to obtain the final eigenvectors, and stores the final eigenvectors in the eigenvector storage portion 20. In this manner, the eigenvalue decomposition on the symmetric tridiagonal matrix T ends.

Subsequently, the process of computing the eigenvectors of the symmetric matrix A stored in the matrix storage portion 11 may be performed, but has been omitted in this example. Furthermore, in order to improve the accuracy of the eigenvectors computed by the eigenvector computing portion 19, a process relating to the eigenvectors may be performed as shown in FIG. 12, or may not be performed, as in the case of qd-type twisted factorization.

[Computation of Eigenvectors Based on Eigenvalues]

Regarding the process of computing eigenvectors based on eigenvalues, a method using qd-type twisted factorization and a method using LV-type twisted factorization will be described. As shown in the flowchart in FIG. 11, in a case where eigenvectors are computed using qd-type twisted factorization, if there is a negative eigenvalue, the process of changing the symmetric tridiagonal matrix T into positive definite is performed in advance (steps S601 and S602). It is assumed that, in a case where qd-type twisted factorization is used, the symmetric tridiagonal matrix T and the eigenvalues after the positive-definite formation are used in the subsequent processes.

It is assumed that the following m×m symmetric tridiagonal matrix T is stored in the diagonal matrix storage portion 13.

$$T = \begin{pmatrix} t_1 & t_2 & & 0 \\ t_2 & t_3 & \ddots & \\ & \ddots & \ddots & t_{2m-2} \\ 0 & & t_{2m-2} & t_{2m-1} \end{pmatrix}$$

Furthermore, it is assumed that the eigenvalue $\lambda_i$ ($1 \leq i \leq m$) is stored in the eigenvalue storage portion 18. In this case, obtaining the eigenvectors of the symmetric tridiagonal matrix T means obtaining an eigenvector $x_j$ in the following equation.

$$(T - \lambda_j I) x_j = \gamma_k e_k \; (j = 1, 2, \ldots, m)$$

where the matrix T is an m×m matrix, and $e_k$ is a vector in which the kth element is 1 and the other elements are 0 ($e_k$ is the kth column of the identity matrix I).

It is natural that the right side of this equation is 0. However, some errors are included in computation of the eigenvalues of the matrix T, and thus there is a residual in the right side as shown above if the eigenvector $x_j$ is a true value.

It is herein assumed that Cholesky decomposition has been performed as follows.

$$T - \lambda_j I = \begin{cases} (B^{(+1)})^T B^{(+1)} \\ (B^{(-1)})^T B^{(-1)} \end{cases}$$

$$B^{(n)} \equiv \begin{pmatrix} b_1^{(n)} & b_2^{(n)} & & \\ & b_3^{(n)} & \ddots & \\ & & \ddots & b_{2m-2}^{(n)} \\ 0 & & & b_{2m-1}^{(n)} \end{pmatrix}, (n = 0, +1),$$

$$T \equiv B^{(0)T} B^{(0)}$$

$$B^{(-1)} \equiv \begin{pmatrix} b_1^{(-1)} & & & 0 \\ b_2^{(-1)} & b_3^{(-1)} & & \\ & \ddots & \ddots & \\ & & b_{2m-2}^{(-1)} & b_{2m-1}^{(-1)} \end{pmatrix}$$

$$b_{2k-1}^{(n)} \equiv \xi_k^{(n)} \sqrt{q_k^{(n)}}, \; b_{2k}^{(n)} \equiv \eta_k^{(n)} \sqrt{e_k^{(n)}},$$

$$(\xi_k^{(n)})^2 = 1, \; (\eta_k^{(n)})^2 = 1, \; (n = 0, +1, -1),$$

$$\xi_k^{(1)} \eta_k^{(1)} = \xi_k^{(0)} \eta_k^{(0)}, \; \xi_{k+1}^{(-1)} \eta_k^{(-1)} = \xi_k^{(0)} \eta_k^{(0)}$$

Here, the correspondence between each element of the matrix T and each element of the matrix $B^{(0)}$ becomes as follows.

$$t_{2k-1} = (b_{2k-2}^{(0)})^2 + (b_{2k-1}^{(0)})^2 \; k = 1, 2, \ldots, m$$

$$t_{2k} = b_{2k-1}^{(0)} b_{2k}^{(0)} \; k = 1, 2, \ldots, m-1$$

where $b_0^{(0)} = 0$

Here, the correspondence between each element of the matrix T and each element of the matrix $B^{(0)}$ also can be expressed as follows. As clearly seen from the following equations, each element of the matrix $B^{(0)}$ can be sequentially computed using each element of the matrix T.

$$b_{2k-1}^{(0)} = \sqrt{t_{2k-1} - b_{2k-2}^{(0)}} \quad k = 1, 2, \ldots, m$$

$$b_{2k}^{(0)} = \frac{t_{2k}}{b_{2k-1}^{(0)}} \quad k = 1, 2, \ldots, m-1$$

where $b_0^{(0)} = 0$.

A result obtained by the Cholesky decomposition can be expressed as follows.

$$T = \lambda_j I = \begin{cases} LD^+L^T \\ UD^-U^T \end{cases}$$

where L, U, and D are as follows:

$$L \equiv \begin{pmatrix} 1 & & & 0 \\ L_1 & 1 & & \\ & \ddots & \ddots & \\ & & L_{m-1} & 1 \end{pmatrix}, \quad L_k \equiv \frac{b_{2k}^{(+1)}}{b_{2k-1}^{(+1)}}$$

$$U \equiv \begin{pmatrix} 1 & U_1 & & \\ & 1 & \ddots & \\ & & \ddots & U_{m-1} \\ 0 & & & 1 \end{pmatrix}, \quad U_k \equiv \frac{b_{2k}^{(-1)}}{b_{2k+1}^{(-1)}}$$

$$D^\pm \equiv \text{diag}(D_1^\pm, D_2^\pm, \ldots, D_m^\pm), \quad D_k^\pm \equiv (b_{2k-1}^{(\pm 1)})^2.$$

Then, the following formulae are obtained.

$$T - \lambda_j I = N_k D_k (N_k)^T$$

$$N_k \equiv \begin{pmatrix} 1 & & & & & & \\ L_1 & 1 & & & & & \\ & \ddots & \ddots & & & & \\ & & L_{k-1} & 1 & U_k & & \\ & & & & 1 & \ddots & \\ & & & & & \ddots & U_m \\ & & & & & & 1 \end{pmatrix},$$

$$D_k \equiv \text{diag}(D_1^+, D_2^+, \ldots, D_{k-1}^+, \gamma_k, D_{k+1}^-, \ldots, D_m^-)$$

Herein, the matrix $N_k$ is referred to as a twisted matrix. Furthermore, $D_k e_k = \gamma_k e_k$, $N_k e_k = e_k$, and thus $(T - \lambda_j I) x_j = \gamma_k e_k$ is $N_k^T x_j = e_k$. It is possible to compute eigenvectors by solving this simple equation. More specifically, it is possible to compute eigenvectors with a small amount of operation such as:

$$x_j(\rho) = \begin{cases} 1, & \rho = k \\ -L_\rho x_j(\rho + 1), & \rho = k-1, k-2, \ldots, 1, \\ -U_{\rho-1} x_j(\rho - 1), & \rho = k+1, k+2, \ldots, m. \end{cases}$$

where $x_j(\rho)$ is the $\rho$th element of $x_j$. Herein, even if $D_{\rho 0}^+ = 0$ or $D_{\rho 0}^- = 0$ with respect to a given $\rho 0$, it is possible to compute eigenvectors using $b_{2\rho-1}^{(0)}$, which is the $(\rho, \rho)$ element of the matrix $B^{(0)}$, and $b_{2\rho}^{(0)}$, which is the $(\rho, \rho+1)$ element of the matrix B, or using the elements of the matrix T, as follows (the process of computing eigenvectors in this manner is referred to as an exceptional process).

$$x_j(\rho 0) = \begin{cases} -\frac{b_{2\rho 0+1}^{(0)} b_{2\rho 0+2}^{(0)}}{b_{2\rho 0-1}^{(0)} b_{2\rho 0}^{(0)}} x_j(\rho 0 + 2), & \rho 0 < k, \\ -\frac{b_{2\rho 0-5}^{(0)} b_{2\rho 0-4}^{(0)}}{b_{2\rho 0-3}^{(0)} b_{2\rho 0-2}^{(0)}} x_j(\rho 0 - 2), & \rho 0 > k \end{cases}$$

$$= \begin{cases} -\frac{t_{2\rho 0+2}}{t_{2\rho 0}} x_j(\rho 0 + 2), & \rho 0 < k, \\ -\frac{t_{2\rho 0-4}}{t_{2\rho 0-2}} x_j(\rho 0 - 2), & \rho 0 > k \end{cases}$$

Herein, the parameter $\gamma_k$ and the value k of the residual are determined so that the absolute value of the following equation becomes smallest.

$$\gamma_k = q_k^{(+1)} + q_k^{(-1)} - (e_{k-1}^{(0)} + q_k^{(0)} - \lambda_j) \qquad \text{Equation}$$

Accordingly, if the above-described Cholesky decomposition is obtained, and the twisted matrix $N_k$ is obtained, then eigenvectors can be obtained. Next, Cholesky decomposition will be described.

As shown in FIG. 15, Cholesky decomposition of $T - \lambda_j I$ is the same as computation of $\{q_k^{(\pm 1)}, e_k^{(\pm 1)}\}$ corresponding to $B^{(\pm 1)}$ based on $\{q_k^{(0)}, e_k^{(0)}\}$ corresponding to $B^{(0)}$.

(qd-Type Twisted Factorization)

First, qd-type transformation used in qd-type twisted factorization will be described (see FIG. 15).

qd-type transformation: $\{q_k^{(0)}, e_k^{(0)}\} \mapsto \{q_k^{(\pm 1)}, e_k^{(\pm 1)}\}$ This transformation is further divided into stationary qd with shift (stqds) transformation: $\{q_k^{(0)}, e_k^{(0)}\} \mapsto \{q_k^{(+1)}, e_k^{(+1)}\}$ $$q_k^{(+1)} + e_{k-1}^{(+1)} = q_k^{(0)} + e_{k-1}^{(0)} - \lambda_j, \quad k=1, 2, \ldots, m,$$

$$q_k^{(+1)} e_k^{(+1)} = q_k^{(0)} e_k^{(0)}, \quad k=1, 2, \ldots, m-1,$$

$$e_0^{(0)} \equiv 0, \; e_0^{(+1)} \equiv 0,$$

and reverse-Time progressive qd with shift (rpqds) transformation:

$$\{q_k^{(0)}, e_k^{(0)}\} \mapsto \{q_k^{(-1)}, e_k^{(-1)}\}$$

$$q_k^{(-1)} + e_k^{(-1)} = q_k^{(0)} + e_{k-1}^{(0)} - \lambda_j, \quad k=1, 2, \ldots, m,$$

$$q_{k+1}^{(-1)} e_k^{(-1)} = q_k^{(0)} e_k^{(0)}, \quad k=1, 2, \ldots, m-1,$$

$e_0^{(0)} \equiv 0$, $e_m^{(-1)} \equiv 0$. If the eigenvalue is already known, a repetitive calculation is not necessary, and thus the amount of calculation can be reduced. However, these methods do not always have high numerical stability and high accuracy. The reason for this is that in both of the stqds transformation and the rpqds transformation, cancellation due to subtraction may occur. For example, in the stqds transformation, the number of significant digits may be only one even in double-precision calculation if $q_k^{(+1)}$ is to be obtained in the case of $q_k^{(0)} + e_{k-1}^{(0)} - \lambda_j \sim e_{k-1}^{(+1)}$. In this case, if $q_k^{(0)} e_k^{(0)} / q_k^{(+1)}$ is calculated, errors occur. In other words, $e_k^{(+1)}$ cannot be accurately calculated. Furthermore, sequential calculation is requested, i.e., $e_k^{(+1)}$ is necessary in order to obtain $q_{k+1}^{(+1)}$, and $q_k^{(+1)}$ is necessary in order to obtain $e_k^{(+1)}$. Thus, a cancellation error occurred at one section spreads, and thus errors may increase. As a result, a numerically unstable situation also may be expected in which $q_k^{(+1)} \neq 0$ in theory, but $q_k^{(+1)} = 0$ due to error accumulation, and thus overflow occurs in calculation of $q_k^{(0)} e_k^{(0)}/q_k^{(+1)}$. If the element $\{b_{2k-1}^{(0)}, b_{2k}^{(0)}\}$ of $B^{(0)}$ is given, that is, $\{q_k^{(0)}, e_k^{(0)}\}$ is given, $\lambda_j$ and $e_{k-1}^{(+1)}$ are uniquely determined, and thus this situation cannot be avoided. Since the rpqds transformation has a similar property, it is not considered that this transformation has reached a practical level. Although improved FORTRAN routine DSTEGR has been disclosed in LAPACK, the above-described problems are not completely solved.

Here, the process in which each element of the diagonal matrix T is transformed into each element of the matrix $B^{(0)}$, and qd-type transformation is performed on each element of the matrix $B^{(0)}$ in this manner is also referred to as a 'process of performing qd-type transformation on each element of the diagonal matrix T' because also in this case qd-type transformation is indirectly performed on each element of the diagonal matrix T. Furthermore, standard qd-type transformation was described in this example, but the qd-type transformation may be differential qd-type transformation.

(LV-Type Twisted Factorization)

Next, Miura transformation, dLVv-type transformation, inverse Miura transformation used in LV-type twisted factorization will be described (see FIG. 15).

Miura transformation: $\{q_k^{(0)}, e_k^{(0)}\} \mapsto \{u_{2k-1}^{(0)}, u_{2k}^{(0)}\}$ stdLVv transformation: $u_k^{(0)} \mapsto u_k^{(+1)}$ rdLVv transformation: $u_k^{(0)} \mapsto u_k^{(-1)}$ inverse Miura transformation: $u_k^{(0)} \mapsto u_k^{(-1)}$ First, Miura transformation will be described. This transformation is $$u_{2k-1}^{(0)} = \frac{t_k^{(0)}}{\delta^{(0)}}, k = 1, 2, \ldots, m,$$

$$u_{2k}^{(0)} = \frac{e_k^{(0)}}{t_k^{(0)}}, k = 1, 2, \ldots, m-1,$$

$$t_k^{(0)} \equiv \frac{q_k^{(0)}}{\frac{1}{\delta^{(0)}} + u_{2k-2}^{(0)}} - 1,$$

$$u_0^{(0)} \equiv 0,$$

where $\delta^{(0)}$ may be freely selected.

Next, dLVv-type transformation will be described. This transformation is further divided into stationary discrete Lotka-Volterra with variable step-size (stdLVv) transformation:

$$u_k^{(+1)} = u_k^{(0)} \times \frac{1 + \delta^{(0)} u_{k-1}^{(0)}}{1 + \delta^{(+1)} u_{k-1}^{(+1)}}, k = 1, 2, \ldots, 2m-1,$$

$$u_0^{(0)} \equiv 0, u_0^{(+1)} \equiv 0, \text{ and}$$

reverse-Time discrete Lotka-Volterra with variable step-size (rdLVv) transformation:

$$u_k^{(-1)} = u_k^{(0)} \times \frac{1 + \delta^{(0)} u_{k-1}^{(0)}}{1 + \delta^{(-1)} u_{k+1}^{(-1)}}, k = 1, 2, \ldots, 2m-1,$$

$$u_0^{(0)} \equiv 0, u_{2m}^{(-1)} \equiv 0$$

where $\delta^{(\pm 1)}$ may be freely selected within a range satisfying $$\frac{1}{\delta^{(0)}} - \frac{1}{\delta^{(n)}} = \lambda_j, (n = +1, -1).$$

Lastly, inverse Miura transformation will be described. This transformation is shown as:

$$q_k^{(\pm 1)} = \frac{(1 + \delta^{(\pm 1)} u_{2k-2}^{(\pm 1)}) \times (1 + \delta^{(\pm 1)} u_{2k-1}^{(\pm 1)})}{\delta^{(\pm 1)}}, k = 1, 2, \ldots, m,$$

$$e_k^{(\pm 1)} = \delta^{(\pm 1)} u_{2k-1}^{(\pm 1)} u_{2k}^{(\pm 1)}, k = 1, 2, \ldots, m-1$$

$$u_0^{(\pm 1)} \equiv 0.$$

In this manner, Cholesky decomposition can be performed as in qd-type transformation. A significant feature of discrete Lotka-Volterra-type transformation, not seen in qd-type transformation, is that the discrete Lotka-Volterra-type transformation has an arbitrary parameter. More specifically, $\delta^{(n)}$ can be freely set within a range satisfying $\lambda_j = 1/\delta^{(0)} - 1/\delta^{(\pm 1)}$. If $\delta^{(n)}$ is varied, an auxiliary variable $u_k^{(n)}$ also changes. However, it is possible to judge in advance whether or not cancellation errors or numerical instability occurs. This judgment may be implemented by an 'if' clause. In this case, calculation may be performed again after $\delta^{(n)}$ is set again. Furthermore, if $u_k^{(+1)}$ is obtained, $q_k^{(\pm 1)}$ and $e_k^{(\pm 1)}$ are independently calculated by inverse Miura transformation, and thus errors do not spread. Herein, inverse Miura transformation may be referred to as Miura transformation, Miura transformation may be referred to as inverse Miura transformation, stdLVv transformation may be referred to as stLVv transformation, and rdLVv transformation may be referred to as rLVv transformation.

Here, the process in which each element of the diagonal matrix T is transformed into each element of the matrix $B^{(0)}$, and LV-type transformation is performed on each element of the matrix $B^{(0)}$ in this manner is also referred to as a 'process of performing LV-type transformation on each element of the diagonal matrix T' because also in this case LV-type transformation is indirectly performed on each element of the diagonal matrix T.

Herein, a more detailed example of a process according to LV-type twisted factorization will be described. FIGS. 16 to 21 are flowcharts showing an example of a process according to LV-type twisted factorization.

FIG. 16 is a diagram showing an example of the entire process of Cholesky decomposition.

(step S901) The Cholesky decomposition portion 31 performs Miura transformation. This process will be described later in detail.

(step S902) The Cholesky decomposition portion 31 sets $1/\delta^{(\pm 1)}$ to $1/\delta^{(0)} \lambda_j$.

(step S903) The Cholesky decomposition portion 31 performs the process to of Procedure 1 described later.

(step S904) The Cholesky decomposition portion 31 performs the process of Procedure 2 described later.

(step S905) The Cholesky decomposition portion 31 judges whether or not $q_k^{(+1)}$ and $e_k^{(+1)}$ have been already computed. If $q_k^{(+1)}$ and $e_k^{(+1)}$ have been already computed, the series of processes of Cholesky decomposition end. If not, the procedure returns to step S901.

FIG. 17 is a flowchart showing a detailed process in step S903 of the flowchart in FIG. 16.

(step S1001) The Cholesky decomposition portion 31 judges whether or not $q_k^{(+1)}$ and $e_k^{(+1)}$ have been already computed. If $q_k^{(+1)}$ and $e_k^{(+1)}$ have been already computed, the procedure ends. If not, the procedure proceeds to step S1002.

(step S1002) The Cholesky decomposition portion 31 performs a process such as stdLVv transformation. This process will be described later in detail.

FIG. 18 is a flowchart showing a detailed process in step S904 of the flowchart in FIG. 16.

(step S1101) The Cholesky decomposition portion 31 judges whether or not $q_k^{(-1)}$ and $e_k^{(-1)}$ have been already computed. If $q_k^{(-1)}$ and $e_k^{(-1)}$ have been already computed, the procedure ends. If not, the procedure proceeds to step S1102.

(step S1102) The Cholesky decomposition portion 31 performs a process such as rdLVv transformation. This process will be described later in detail.

FIG. 19 is a flowchart showing a detailed process in step S901 of the flowchart in FIG. 16.

(step S1201) The Cholesky decomposition portion 31 determines $1/\delta^{(o)}$. As described above, this value can be freely determined, and thus is determined to a value that changes the matrix into positive definite. For example, the Cholesky decomposition portion 31 determines $1/\delta^{(o)}$ as the following equation.

$$-\frac{1}{\delta^{(0)}} = |\lambda_{min}| + \varepsilon^{(0)} \times |\lambda_{max}|$$

In the equation, $\varepsilon^{(o)}$ may be a value obtained by multiplying the machine epsilon by a constant (a real number such as 2, 3, or 4, and preferably a value selected for reducing calculation errors), or may be other appropriate values.

Subsequently, for example, if it is judged in step S1203 or the like that cancellation may occur, the Cholesky decomposition portion 31 may set $\varepsilon^{(o)}$ that determines $1/\delta^{(o)}$, for example, while successively incrementing, by 1, the constant by which the machine epsilon is to be multiplied. It will be appreciated that the method for determining $1/\delta^{(o)}$ is not limited to this. In this manner, in LV-type twisted factorization, $1/\delta^{(o)}$ can be freely set, and thus the matrix T does not have to be changed into positive definite as in the case of qd-type twisted factorization. Also, it will be appreciated that LV-type twisted factorization may be performed after the matrix T is changed into positive definite as in the case of qd-type twisted factorization.

(step S1202) The Cholesky decomposition portion 31 sets $\beta 1$ to $q_1^{(o)} - 1/\delta^{(o)}$.

(step S1203) The Cholesky decomposition portion 31 judges whether or not the absolute value of $\beta 1$ is larger than $\varepsilon$. If the absolute value of $\beta 1$ is larger than $\varepsilon$, the procedure proceeds to step S1204. If not, the procedure returns to step S1201 where the process of determining $1/\delta^{(o)}$ is performed again. Herein, $\varepsilon$ also can be freely determined. For example, the machine epsilon may be used as $\varepsilon$. If $\varepsilon$ is made larger, accuracy is improved. If $\varepsilon$ is made smaller, accuracy becomes poor. Herein, the process performed in step S1203 is a process of judging the possibility of cancellation to occur. If the absolute value of $\beta 1$ is not larger than $\varepsilon$, it will be judged that there is a possibility of cancellation to occur.

(step S1204) The Cholesky decomposition portion 31 sets $\beta 2$ to $q_1^{(o)}/(1+\delta^{(o)}u_0^{(o)})$. This means that $\beta 2$ has been set to $q_1^{(o)}$, because $u_0^{(o)}=0$ as described above.

(step S1205) The Cholesky decomposition portion 31 sets $u_1^{(o)}(1+\delta^{(o)}u_0^{(o)})$ to $\beta 1$. The reason for this is that although $\beta 1$ has been set to $q_1^{(o)} - 1/\delta^{(o)}$ in step S1202, $u_0^{(o)}=0$ as described above, and thus $\beta 1$ is equal to $q_1^{(o)}/(1+\delta^{(o)}u_0^{(o)})-1/\delta^{(o)}$, and $u_1^{(o)}=u_{2k-1}^{(o)}|_{k=1}$ is obtained by Miura transformation. Herein, since $u_0^{(o)}=0$, $(1+\delta^{(o)}u_0^{(o)})=1$.

(step S1206) The Cholesky decomposition portion 31 sets a counter k to '1'.

(step S1207) The Cholesky decomposition portion 31 sets $\alpha 1$ to $e_k^{(o)}/\beta 1$. As described above, $\beta 1$ is $u_{2k-1}^{(o)}$, and thus $\alpha 1=\delta^{(o)}u_{2k}^{(o)}$ is obtained by Miura transformation performed on $e_k^{(o)}/\beta 1$.

(step S1208) The Cholesky decomposition portion 31 sets $\alpha 2$ to $\alpha 1+1$. As shown in the description of step S1207, $\alpha 2$ is equal to $1+\delta^{(o)}u_{2k}^{(o)}$.

(step S1209) The Cholesky decomposition portion 31 judges whether or not the absolute value of $\alpha 2$ is larger than $\varepsilon$. If the absolute value of $\alpha 2$ is larger than $\varepsilon$, the procedure proceeds to step S1210. If not, the procedure returns to step S1201 where the process of determining $1/\delta^{(o)}$ is performed again. Herein, the process performed in step S1209 is a process of judging the possibility of cancellation to occur, as in step S1203. If the absolute value of $\alpha 2$ is not larger than $\varepsilon$, it will be judged that there is a possibility of cancellation to occur.

(step S1210) The Cholesky decomposition portion 31 computes $\alpha 1 \times \beta 2$ and sets $u_{2k}^{(o)}(1+\delta^{(o)}u_{2k-1}^{(o)})$ to the computed value. The reason for this is that as described above, $\alpha 1$ is equal to $\delta^{(o)}u_{2k}^{(o)}$ and $\beta 2$ is $q_k^{(o)}/(1+\delta^{(o)}u_{2k-2}^{(o)})$, and thus $\alpha 1 \times \beta 2 = u_{2k}^{(o)}(1+\delta^{(o)}u_{2k-1}^{(o)})$ is obtained by Miura transformation performed on $\alpha 1 \times \beta 2$.

(step S1211) The Cholesky decomposition portion 31 sets $\beta 2$ to $q_{k+1}^{(o)}/\alpha 2$. As described above, $\alpha 2$ is equal to $1+\delta^{(o)}u_{2k}^{(o)}$, and thus $\beta 2$ is $q_{k+1}^{(o)}/(1+\delta^{(o)}u_{2k}^{(o)})$. Accordingly, this means that k in $\beta 2$ has been incremented by 1.

(step S1212) The Cholesky decomposition portion 31 sets $\beta 1$ to $\beta 2 - 1/\delta^{(o)}$. As described above, $\beta 2$ is equal to $q_{k+1}^{(o)}/(1+\delta^{(o)}u_{2k}^{(o)})$, and thus $\beta 1$ is $q_{k+1}^{(o)}/(1+\delta^{(o)}u_{2k}^{(o)})-1/\delta^{(o)}$, and $\beta 1=u_{2k+1}^{(o)}$ is obtained by Miura transformation. Accordingly, this means that k in $\beta 1$ has been incremented by 1.

(step S1213) The Cholesky decomposition portion 31 judges whether or not the absolute value of $\beta 1$ is larger than $\varepsilon$. If the absolute value of $\beta 1$ is larger than $\varepsilon$, the procedure proceeds to step S1214. If not, the procedure returns to step S1201 where the process of determining $1/\delta^{(o)}$ is performed again. Herein, the process performed in step S1213 is a process of judging the possibility of cancellation to occur, as in step S1203. If the absolute value of $\beta 1$ is not larger than $\varepsilon$, it will be judged that there is a possibility of cancellation to occur.

(step S1214) The Cholesky decomposition portion 31 computes $\alpha 2 \times \beta 1$ and sets $u_{2k+1}^{(o)}(1+\delta^{(o)}u_{2k}^{(o)})$ to the computed value. The reason for this is that $\alpha 2$ is equal to $1+\delta^{(o)}u_{2k}^{(o)}$, and $\beta 1$ is equal to $u_{2k+1}^{(o)}$, as described above.

(step S1215) The Cholesky decomposition portion 31 increments the counter k by 1.

(step S1216) The Cholesky decomposition portion 31 judges whether or not the counter k is equal to m. If the counter k is equal to m, the series of processes end. If not, the procedure returns to step S1207.

In this manner, $u_{2k+1}^{(o)}(1+\delta^{(o)}u_{2k}^{(o)})$ and $u_{2k}^{(o)}(1+\delta^{(o)}u_{2k-1}^{(o)})$ are computed. These values may be temporarily stored in a memory (not shown) or the like included in the Cholesky decomposition portion 31.

FIG. 20 is a flowchart showing a detailed process in step S1002 of the flowchart in FIG. 17.

(step S1301) The Cholesky decomposition portion 31 sets $\alpha 2$ to $1+\delta^{(+1)}u_0^{(+1)}$. This means that $\alpha 2$ has been set to '1', because $u_0^{(+1)}=0$ as described above.

(step S1302) The Cholesky decomposition portion 31 sets $\beta 1$ to $u_1^{(o)}(1+\delta^{(o)}u_0^{(o)}/(1+\delta^{(+1)}u_0^{(+1)})$. Herein, the value computed in step S1205 as $u_1^{(0)}(1+\delta^{(0)}u_0^{(0)}$. As described above, $u_0^{(+1)}=0$. Furthermore, stdLVv transformation on the formula of β1 means setting β1 to $u_1^{(+1)}$.

(step S1303) The Cholesky decomposition portion 31 sets a counter k to '1'.

(step S1304) The Cholesky decomposition portion 31 sets α1 to $\beta 1+1/\delta^{(+1)}$.

(step S1305) The Cholesky decomposition portion 31 judges whether or not the absolute value of α1 is larger than ε. If the absolute value of α1 is larger than ε, the procedure proceeds to step S1306. If not, the procedure proceeds to Procedure 2 (step S904) in the flowchart in FIG. 16. Herein, the process performed in step S1305 is a process of judging the possibility of cancellation to occur, as in step S1203. If the absolute value of α1 is not larger than ε, it will be judged that there is a possibility of cancellation to occur.

(step S1306) The Cholesky decomposition portion 31 sets β2 to $u_{2k}^{(0)}(1+\delta^{(0)}u_{2k-1}^{(0)})/\alpha 1$. Herein, the value computed in step S1210 is used as $u_{2k}^{(0)}(1+\delta^{(0)}u_{2k-1}^{(0)})$. Furthermore, stdLVv transformation on the formula of β2 means setting β2 to $\delta^{(+1)}u_{2k}^{(+1)}$.

(step S1307) The Cholesky decomposition portion 31 computes α1×α2. As described above, α1 is equal to $\beta 1+1/\delta^{(+1)}=u_{2k-1}^{(+1)}+1/\delta^{(+1)}$, and α2 is equal to $1+\delta^{(+1)}u_{2k-2}^{(+1)}$, and thus $\alpha 1\times\alpha 2=q_k^{(+1)}$ is obtained by inverse Miura transformation performed on α1×α2. Accordingly, the Cholesky decomposition portion 31 computes α1×α2 and sets $q_k^{(+1)}$ to the computed value.

(step S1308) The Cholesky decomposition portion 31 sets α2 to 1+β2. As described above, β2 is equal to $\delta^{(+1)}u_{2k}^{(+1)}$, and thus α2 is $1+\delta^{(+1)}u_{2k}^{(+1)}$. Accordingly, this means that k in α2 has been incremented by 1.

(step S1309) The Cholesky decomposition portion 31 judges whether or not the absolute value of α2 is larger than ε. If the absolute value of α2 is larger than ε, the procedure proceeds to step S1310. If not, the procedure proceeds to Procedure 2 (step S904) in the flowchart in FIG. 16. Herein, the process performed in step S1309 is a process of judging the possibility of cancellation to occur, as in step S1203. If the absolute value of α2 is not larger than ε, it will be judged that there is a possibility of cancellation to occur.

(step S1310) The Cholesky decomposition portion 31 computes β1×β2. As described above, β1 is equal to $u_{2k-1}^{(+1)}$, and β2 is equal to $\delta^{(+1)}u_{2k}^{(+1)}$, and thus $\beta 1\times\beta 2=e_k^{(+1)}$ is obtained by inverse Miura transformation performed on β1×β2. Accordingly, the Cholesky decomposition portion 31 computes β1×β2 and sets $e_k^{(+1)}$ to the computed value.

(step S1311) The Cholesky decomposition portion 31 sets β1 to $u_{2k+1}^{(0)}(1+\delta^{(0)}u_{2k}^{(0)})/\alpha 2$. Herein, the value computed in step S1214 is used as $u_{2k+1}^{(0)}(1+\delta^{(0)}u_{2k}^{(0)}$. Furthermore, stdLVv transformation on the formula of β1 means setting β1 to $u_{2k+1}^{(+1)}$. Accordingly, this means that k in β1 has been incremented by 1.

(step S1312) The Cholesky decomposition portion 31 increments the counter k by 1.

(step S1313) The Cholesky decomposition portion 31 judges whether or not the counter k is equal to m. If the counter k is equal to m, the procedure proceeds to step S1314. If not, the procedure returns to step S1304.

(step S1314) The Cholesky decomposition portion 31 computes $\alpha 2\times(\beta 1+1/\delta^{(+1)})$. This is the same as a process in which after α1 is updated in step S1304, α1×α2 is calculated in step S1307. Accordingly, the Cholesky decomposition portion 31 computes $\alpha 2\times(\beta 1+1/\delta^{(+1)})$ and sets $q_1^{(+1)}$ to the computed value. In this manner, the process of computing $q_k^{(+1)}$ and $e_k^{(+1)}$ by performing stdLVv transformation and inverse Miura transformation on the result obtained by Miura trans-formation ends. These values may be temporarily stored in a memory (not shown) or the like included in the Cholesky decomposition portion 31.

FIG. 21 is a flowchart showing a detailed process in step S1102 of the flowchart in FIG. 18.

(step S1401) The Cholesky decomposition portion 31 sets β1 to $u_{2m-1}^{(0)}(1+\delta^{(0)}u_{2m-2}^{(0)})/(1+\delta^{(-1)}u_{2m}^{(-1)})$. Herein, the value computed in step S1214 is used as $u_{2m-1}^{(0)}(1+\delta^{(0)}u_{2m-2}^{(0)})$. As described above, $u_{2m}^{(-1)}=0$. Furthermore, rdLVv transformation on the formula of β1 means setting β1 to $u_{2m-1}^{(-1)}$.

(step S1402) The Cholesky decomposition portion 31 sets a counter k to 'm−1'.

(step S1403) The Cholesky decomposition portion 31 sets α1 to $\beta 1+1/\delta^{(-1)}$.

(step S1404) The Cholesky decomposition portion 31 judges whether or not the absolute value of α1 is larger than ε. If the absolute value of α1 is larger than ε, the procedure proceeds to step S1405. If not, the procedure returns to Miura transformation (step S901) in the flowchart in FIG. 16. Herein, the process performed in step S1404 is a process of judging the possibility of cancellation to occur, as in step S1203. If the absolute value of α1 is not larger than ε, it will be judged that there is a possibility of cancellation to occur.

(step S1405) The Cholesky decomposition portion 31 sets β2 to $u_{2k}^{(0)}(1+\delta^{(0)}u_{2k-1}^{(0)})/\alpha 1$. Herein, the value computed in step S1210 is used as $u_{2k}^{(0)}(1+\delta^{(0)}u_{2k-1}^{(0)})$. Furthermore, rdLVv transformation on the formula of β2 means setting β2 to $\delta^{(-1)}u_{2k}^{(-1)}$.

(step S1406) The Cholesky decomposition portion 31 sets α2 to 1+β2. As described above, β2 is equal to $\delta^{(-1)}u_{2k}^{(-1)}$, and thus α2 is $1+\delta^{(-1)}u_{2k}^{(-1)}$.

(step S1407) The Cholesky decomposition portion 31 judges whether or not the absolute value of α2 is larger than ε. If the absolute value of α2 is larger than ε, the procedure proceeds to step S1408. If not, the procedure returns to Miura transformation (step S901) in the flowchart in FIG. 16. Herein, the process performed in step S1407 is a process of judging the possibility of cancellation to occur, as in step S1203. If the absolute value of α2 is not larger than ε, it will be judged that there is a possibility of cancellation to occur.

(step S1408) The Cholesky decomposition portion 31 computes α1×α2. As described above, α1 is equal to $\beta 1+1/\delta^{(-1)}=u_{2k+1}^{(-1)}+1/\delta^{(-1)}$, and α2 is equal to $1+\delta^{(-1)}u_{2k}^{(-1)}$, and thus $\alpha 1\times\alpha 2=q_{k+1}^{(-1)}$ is obtained by inverse Miura transformation performed on α1×α2. Accordingly, the Cholesky decomposition portion 31 computes α1×α2 and sets $q_{k+1}^{(-1)}$ to the computed value.

(step S1409) The Cholesky decomposition portion 31 sets β1 to $u_{2k-1}^{(0)}(1+\delta^{(0)}u_{2k-2}^{(0)})/\alpha 2$. Herein, the value computed in steps S1205 and S1214 is used as $u_{2k-1}^{(0)}(1+\delta^{(0)}u_{2k-2}^{(0)})$. Furthermore, stdLVv transformation on the formula of β1 means setting β1 to $u_{2k-1}^{(-1)}$. Accordingly, this means that k in β1 has been decremented by 1.

(step S1410) The Cholesky decomposition portion 31 computes β1×β2. As described above, β1 is equal to $u_{2k-1}^{(-1)}$, and β2 is equal to $\delta^{(-1)}u_{2k}^{(-1)}$, and thus $\beta 1\times\beta 2=e_k^{(-1)}$ is obtained by inverse Miura transformation performed on β1×β2. Accordingly, the Cholesky decomposition portion 31 computes β1×β2 and sets $e_k^{(-1)}$ to the computed value.

(step S1411) The Cholesky decomposition portion 31 decrements the counter k by 1.

(step S1412) The Cholesky decomposition portion 31 judges whether or not the counter k is equal to 0. If the counter k is equal to 0, the procedure proceeds to step S1413. If not, the procedure returns to step S1403.

(step S1413) The Cholesky decomposition portion 31 computes $\beta 1+1/\delta^{(-1)}$. This is the same as a process in which after $\alpha 1$ is updated in step S1403, $\alpha 1 \times \alpha 2$ is calculated in step S1408. The reason for this is that in this case, $\alpha 2$ is 1. Accordingly, the Cholesky decomposition portion 31 computes $\beta 1+1/\delta^{(-1)}$ and sets $q_1^{(-1)}$ to the computed value. In this manner, the process of computing $q_k^{(-1)}$ and $e_k^{(-1)}$ by performing rdLVv transformation and inverse Miura transformation on the result obtained by Miura transformation ends. These values may be temporarily stored in a memory (not shown) or the like included in the Cholesky decomposition portion 31.

Herein, in the process in the flowchart in FIG. 16, an eigenvector corresponding to one eigenvalue can be computed. Thus, if eigenvectors corresponding to all eigenvalues are to be computed, the Cholesky decomposition portion 31 repeats the process in the flowchart in FIG. 16 as many times as the number of the eigenvalues.

In order to reduce memory consumption, an array for the auxiliary variable $u_k^{(n)}$ does not necessarily have to be prepared. It is possible to reduce the memory consumption and the calculation amount, by securing a memory area for $1+\delta^{(0)}u^{(0)}$ and using this value throughout the steps of Miura transformation, dLVv-type transformation, and inverse Miura transformation. Accordingly, errors are also reduced.

Herein, errors will be described. If a person can perform computation in an ideal situation, that is, can compute an infinite number of digits, both qd-type twisted factorization and LV-type twisted factorization can be used without any problem. However, an attention is necessary for calculation with a computer. On a computer, which can compute only a finite number of digits, even if a mathematically correct calculation is used, a correct result cannot be always obtained. Moreover, unexpected numerical problems may occur (e.g., the calculation may not end no matter how long the calculation is performed).

Known examples of errors in computer calculation include rounding errors and cancellation errors. A single rounding error is an error in which the last significant digit is different from a true value at most, and thus this error is not a significant error. If at least one of addition, multiplication, and division is performed on two real numbers having different exponent parts, a rounding error still occurs, but no error greater than that occurs. Moreover, even in a case where an operation causing this sort of rounding errors is repeated, if the rounding mode is near (round), extreme error accumulation due to automatic rounding-up or rounding-off hardly occurs. Thus, in many methods for calculating numerical values, a special attention is hardly paid to rounding errors caused by at least one of addition, multiplication, and division. Also in the case of appropriate eigenvalue calculation, rounding errors do not increase.

The problem is cancellation caused by subtraction of real numbers having the same sign and addition of real numbers having different signs. After the value becomes 0 due to a cancellation error, if division is performed using this value, 0 is taken as the denominator, which is an irregular form, and thus the calculation cannot be performed. In such a situation, the calculation may not end no matter how long the calculation is performed. Calculation of subtraction and then division is performed in both of qd-type twisted factorization and LV-type twisted factorization, and thus a sufficient attention has to be paid to cancellation errors.

In LV-type twisted factorization, it is possible to judge whether or not the above-described cancellation error is contained, based on whether or not a value obtained by subtraction is small. In the case of qd-type twisted factorization, even if it is known that a cancellation error is contained, the error cannot be avoided. The reason for this is that if $\{q_k^{(0)}, e_k^{(0)}\}$ is given as an initial value, then $\lambda_j$ is uniquely determined, and $\{q_k^{(\pm 1)}, e_k^{(\pm 1)}\}$ is also uniquely determined. In other words, qd-type twisted factorization is a calculation method having no arbitrary parameter, that is, having no degree of freedom.

In contrast, LV-type twisted factorization has a parameter $\delta^{(0)}$ that can be freely set, and thus the auxiliary variable $u_k^{(n)}$ can be variously changed (see FIG. 22). More specifically, $\{q_k^{(\pm 1)}, e_k^{(\pm 1)}\}$ can be calculated in various routes. Thus, even if cancellation occurs, the cancellation can be avoided. The influence of cancellation is checked by judgment on the conditions in FIGS. 19 to 21, and if the condition that the absolute value of a value obtained by subtraction is larger than the small number $\epsilon$ is not satisfied, the procedure returns to setting of the parameter $\delta^{(0)}$. This process is repeated until the condition is satisfied. Herein, in a case where more emphasis is placed on speed than accuracy, an exceptional process may be performed if the condition is not satisfied a several number of times (if $q_k^{(+1)}=0$ or $q_k^{(-1)}=0$).

Here, the qd-type transformation also can be expressed as follows using the equations indicating the correspondence between each element of the matrix T and each element of the matrix $B^{(0)}$.

$$\text{qd-type transformation: } \{t_{2k-1}, t_{2k}\} \mapsto \{q_k^{(\pm 1)}, e_k^{(\pm 1)}\}$$

This transformation is further divided into stqds transformation:

$$\{t_{2k-1}, t_{2k}\} \mapsto \{q_k^{(+1)}, e_k^{(+1)}\}$$

$$q_k^{(+1)} + e_{k-1}^{(+1)} = t_{2k-1} - \lambda_j, \; k=1, 2, \ldots, m,$$

$$q_k^{(+1)} e_k^{(+1)} = (t_{2k})^2, \; k=1, 2, \ldots, m-1,$$

$$e_0^{(+1)} \equiv 0, \text{ and}$$

$$\text{rpqds transformation: } \{t_{2k-1}, t_{2k}\} \mapsto \{q_k^{(-1)}, e_k^{(-1)}\}$$

$$q_k^{(-1)} + e_k^{(-1)} = t_{2k-1} - \lambda_j, \; k=1, 2, \ldots, m,$$

$$q_{k+1}^{(-1)} e_k^{(-1)} = (t_{2k})^2, \; k=1, 2, \ldots, m-1,$$

$e_m^{(-1)} \equiv 0$. In this manner, in a case where $\{q_k^{(\pm 1)}, e_k^{(\pm 1)}\}$ is obtained based on $\{t_{2k-1}, t_{2k}\}$, the calculation amount can be reduced, and the calculation speed can be improved, compared with a case where $\{q_k^{(0)}, e_k^{(0)}\}$ of is obtained based on $\{t_{2k-1}, t_{2k}\}$, and $\{q_k^{(\pm 1)}, e_k^{(\pm 1)}\}$ is further obtained based on $\{q_k^{(0)}, e_k^{(0)}\}$.

In this case, qd-type transformation is directly performed on each element of the diagonal matrix T. Accordingly, it will be appreciated that this transformation is included in 'performing qd-type transformation on each element of the diagonal matrix T'.

Furthermore, Miura transformation in LV-type transformation also can be expressed as follows using the equations indicating the correspondence between each element of the matrix T and each element of the matrix $B^{(0)}$, as in the case of qd-type transformation.

$$\text{Miura transformation: } \{t_{2k-1}, t_{2k}\} \mapsto \{u_{2k-1}^{(0)}, u_{2k}^{(0)}\}$$

$$\text{stdLVv transformation: } u_k^{(0)} \mapsto u_k^{(+1)}$$

$$\text{rdLVv transformation: } u_k^{(0)} \mapsto u_k^{(-1)}$$

$$\text{inverse Miura transformation: } \{u_{2k-1}^{(\pm 1)}, u_{2k}^{(\pm 1)}\} \mapsto \{q_k^{(\pm 1)}, e_k^{(\pm 1)}\}$$

Miura transformation in this case is shown as:

$$t_{2k-1} = \frac{1}{\delta^{(0)}}(1+\delta^{(0)}u_{2k-2}^{(0)})(1+\delta^{(0)}u_{2k-1}^{(0)}) + \delta^{(0)}u_{2k-3}^{(0)}u_{2k-2}^{(0)}$$

$$k = 1, 2, \ldots, m$$

$$(t_{2k})^2 = (1+\delta^{(0)}u_{2k-2}^{(0)})(1+\delta^{(0)}u_{2k-1}^{(0)})u_{2k-1}^{(0)}u_{2k}^{(0)}$$

$$k = 1, 2, \ldots, m-1$$

$$u_0^{(0)} \equiv 0,$$

where $\delta^{(0)}$ may be freely selected.

In this manner, in a case where $\{u_{2k-1}^{(0)}, u_{2k}^{(0)}\}$ is obtained based on $\{t_{2k-1}, t_{2k}\}$, the calculation amount can be reduced, and the calculation speed can be improved, compared with a case where $\{q_k^{(0)}, e_k^{(0)}\}$ is obtained based on $\{t_{2k-1}, t_{2k}\}$, and $\{u_{2k-1}^{(0)}, u_{2k}^{(0)}\}$ is further obtained based on $\{q_k^{(0)}, e_k^{(0)}\}$.

In this case, LV-type transformation is directly performed on each element of the diagonal matrix T. Accordingly, it will be appreciated that this transformation is included in 'performing LV-type transformation on each element of the diagonal matrix T'.

If Cholesky decomposition can be performed using qd-type twisted factorization or LV-type twisted factorization, the twisted matrix $N_k$ can be computed as described above. Then, $x_j$ can be computed by solving $N_k^T x_j = e_k$ of the matrix $N_k$. Herein, $x_j$ is normalized by replacing $x_j$ as $$x_j \leftarrow \frac{x_j}{\|x_j\|}.$$

In this manner, the eigenvector $x_j$ can be obtained. The orthogonal matrix $Q_T$ can be computed according to $Q_T = (x_1, x_2, \ldots, x_m)$ using this eigenvector $x_j$.

Accordingly, eigenvalue decomposition has been performed on the symmetric tridiagonal matrix T as in the following equation.

$$T = Q_T D_T Q_T^T$$

Furthermore, if eigenvalue decomposition on the symmetric tridiagonal matrix T can be performed, eigenvalue decomposition on the symmetric matrix A is also performed as follows.

$$A = PTP^T$$
$$= P(Q_T D_T Q_T^T)P^T$$
$$= (PQ_T)D_T(PQ_T)^T$$
$$= Q_A D_T Q_A^T$$

As described above, the eigenvector computing portion 19 computes the eigenvectors of the symmetric tridiagonal matrix T, using the eigenvalues of the symmetric tridiagonal matrix T stored in the eigenvalue storage portion 18 and the symmetric tridiagonal matrix T stored in the diagonal matrix storage portion 13. First, the Cholesky decomposition portion 31 reads the symmetric tridiagonal matrix T from the diagonal matrix storage portion 13, and reads the eigenvalues of the symmetric tridiagonal matrix T from the eigenvalue storage portion 18. Then, the Cholesky decomposition portion 31 performs the Cholesky decomposition process by performing transformations as shown in the flowchart in FIG. 23. Herein, a case will be described in which LV-type twisted factorization is used.

The Cholesky decomposition portion 31 first obtains $q_k^{(0)}$ and $e_k^{(0)}$ based on the value of each element of the symmetric tridiagonal matrix T. Then, the Cholesky decomposition portion 31 sequentially obtains $u_1^{(0)}$, $u_2^{(0)}$, and the like by performing Miura transformation (step S1501).

Next, the Cholesky decomposition portion 31 sequentially obtains $u_1^{(+1)}$ and the like by performing stdLVv transformation, using $u_k^{(0)}$ obtained in the Miura transformation (step S1502). Furthermore, the Cholesky decomposition portion 31 sequentially obtains $u_{2m-1}^{(-1)}$ and the like by performing rdLVv transformation, using $u_k^{(0)}$ obtained in the Miura transformation (step S1503).

Lastly, the Cholesky decomposition portion 31 sequentially obtains $q_1^{(\pm 1)}$, $e_1^{(\pm 1)}$, and the like by performing inverse Miura transformation, using $u_k^{(+1)}$ obtained in the stdLVv transformation and $u_k^{(-1)}$ obtained in the rdLVv transformation (step S1504). If $q_k^{(\pm 1)}$ and $e_k^{(\pm 1)}$ are obtained, that is, if the upper bidiagonal matrix $B^{(+1)}$ and the lower bidiagonal matrix $B^{(-1)}$ are obtained, the Cholesky decomposition portion 31 passes them to the vector computing portion 32. Herein, it is assumed that the Cholesky decomposition portion 31 performs Cholesky decomposition on each eigenvalue.

In this example, the Cholesky decomposition process was described with reference to the flowchart in FIG. 23, for the sake of convenience of this description, but it will be appreciated that processes may be performed as shown in the flowcharts in FIGS. 16 to 21.

The vector computing portion 32 reads the eigenvalues from the eigenvalue storage portion 18, and determines k using Equation 5. The vector computing portion 32 uses k to obtain a twisted matrix $N_k$ according to $q_k^{(\pm 1)}$ and $e_k^{(\pm 1)}$, and computes $x_j$ by solving $N_k^T x_j = e_k$ (step S802).

Next, the vector computing portion 32 normalizes the computed $x_j$ to obtain an eigenvector $x_j$, and stores the eigenvector $x_j$ in the eigenvector storage portion 20 (step S803). Here, the vector computing portion 32 can compute all eigenvectors by performing the process of computing and normalizing $x_j$ on each eigenvalue. In this manner, the computation of the eigenvectors ends.

Subsequently, the eigenvectors of the symmetric matrix A stored in the matrix storage portion 11 may be computed. The method for computing the eigenvectors is as described above.

Furthermore, the eigenvalue decomposition apparatus 1 may include an output portion (not shown) that outputs the eigenvalues computed by the eigenvalue computing portion 17 and the eigenvectors computed by the eigenvector computing portion 19. Herein, the output by the output portion (not shown) may refer to, for example, displaying the eigenvalues and the like on a display device (e.g., a CRT, a liquid crystal display, etc.), transmission of the eigenvalues and the like via a communication line to a given device, printing of the eigenvalues and the like using a printer, or accumulation of the eigenvalues and the like in a storage medium. Herein, the output portion may or may not include an output device (e.g., a display device, a printer, etc.). Furthermore, the output portion may be realized as hardware, or may be realized as software such as a driver that drives the device.

In this example, the case was described in which the Cholesky decomposition portion 31 performs Cholesky decomposition by LV-type twisted factorization, but the Cholesky decomposition portion 31 may perform Cholesky decomposition by qd-type twisted factorization. For example, the Cholesky decomposition portion 31 may check the distribution of the computed eigenvalues, and use qd-type twisted factorization if the eigenvalues are not densely distributed.

Furthermore, in the description above, the case was described in which the matrix $B^{(0)}$ is an upper bidiagonal matrix, but eigenvalue decomposition can be performed in a similar manner also in a case where the matrix $B^{(0)}$ is a lower bidiagonal matrix. However, the equations indicating the correspondence between each element of the matrix T and each element of the matrix $B^{(0)}$ become different from those shown above.

In the description above, the case was described in which the eigenvalue computing portion 17 computes all eigenvalues, but only part of the eigenvalues may be computed. For example, in FIG. 9, the eigenvalue computing portion 17 has to compute all eigenvalues up to the process of computing those of the matrices $T_1$ and $T_2$. However, in computation of the eigenvalues of the symmetric tridiagonal matrix T based on the matrices $T_1$ and $T_2$, only necessary eigenvalues may be computed. Accordingly, the eigenvalue computing portion 17 may be a portion that computes at least one eigenvalue of the symmetric tridiagonal matrix T. In this case, an extra process accompanying computation of unnecessary eigenvalues does not have to be performed, and thus the processing load can be reduced. If only part of the eigenvalues are to be computed in this manner, for example, the calculation time for a process of computing the eigenvalues of the symmetric tridiagonal matrix T can be approximately $(1+k/m)/2$ times shorter than the original calculation time. Herein, m is a matrix size, and k is the number of eigenvalues that are to be obtained.

In the description above, the case was described in which the eigenvector computing portion 19 computes all eigenvectors corresponding to the computed eigenvalues. However, as shown in the description above, the process of computing an eigenvector may be performed for each eigenvalue. Accordingly, the eigenvector computing portion 19 may be a portion that computes at least one eigenvector of the symmetric tridiagonal matrix T. In this manner, the eigenvector computing portion 19 can compute only necessary eigenvectors, and does not have to perform an extra process accompanying computation of unnecessary eigenvectors, and thus the processing load can be reduced.

Next, parallel processing in the eigenvalue decomposition apparatus 1 according to this embodiment will be described.

In the eigenvalue decomposition apparatus 1 according to this embodiment, the processes can be performed in parallel in calculation of eigenvalues and calculation of eigenvectors. For example, as shown in FIGS. 24 to 26, in the eigenvalue decomposition apparatus 1, parallel processing may be performed in each of the eigenvalue decomposition portion 15, the eigenvalue computing portion 17, the Cholesky decomposition portion 22, the vector computing portion 23, the Cholesky decomposition portion 31, and the vector computing portion 32.

The eigenvalue decomposition portion 15 may include multiple eigenvalue decomposition units 15a and 15b, and the multiple eigenvalue decomposition units 15a and 15b may perform, in parallel, the process of computing eigenvalues and matrix elements of the symmetric tridiagonal matrix after division. For example, in FIG. 9, the eigenvalue decomposition unit 15a may perform eigenvalue decomposition on the matrices $T_{111}$, $T_{112}$, $T_{121}$, and $T_{122}$, and the eigenvalue decomposition unit 15b may perform eigenvalue decomposition on the matrices $T_{211}$, $T_{212}$, $T_{221}$, and $T_{222}$.

The eigenvalue computing portion 17 may include multiple eigenvalue computing units 17a and 17b, and the multiple eigenvalue computing units 17a and 17b may perform, in parallel, the process of computing eigenvalues and matrix elements of the symmetric tridiagonal matrix that is the division origin. For example, in FIG. 9, the eigenvalue computing unit 17a may perform the process of computing eigenvalues and the like of the matrices $T_{11}$, $T_{12}$, $T_1$, and T, and the eigenvalue computing unit 17b may perform the process of computing eigenvalues and the like of the matrices $T_{21}$, $T_{22}$, and $T_2$.

The Cholesky decomposition portion 22 may include multiple Cholesky decomposition units 22a and 22b, and the multiple Cholesky decomposition units 22a and 22b may perform, in parallel, Cholesky decomposition on the symmetric tridiagonal matrix T. For example, the Cholesky decomposition unit 22a may perform the process of Cholesky decomposition on half eigenvalues, and the Cholesky decomposition unit 22b may perform the process of Cholesky decomposition on the other half eigenvalues.

The vector computing portion 23 may include multiple vector computing units 23a and 23b, and the multiple vector computing units 23a and 23b may perform, in parallel, the process of computing eigenvectors. For example, the vector computing unit 23a may perform the process of computing eigenvectors on which Cholesky decomposition has been performed by the Cholesky decomposition unit 22a, and the vector computing unit 23b may perform the process of computing eigenvectors on which Cholesky decomposition has been performed by the Cholesky decomposition unit 22b.

The Cholesky decomposition portion 31 may include multiple Cholesky decomposition units 31a and 31b, and may perform, in parallel, Cholesky decomposition on the symmetric tridiagonal matrix T, as in the case of the Cholesky decomposition portion 22.

The vector computing portion 32 may include multiple vector computing units 32a and 32b, and may perform, in parallel, the process of computing eigenvectors, as in the case of the vector computing portion 23.

Here, the multiple eigenvalue computing units 17a and 17b of the eigenvalue computing portion 17 may perform, in parallel, the process of computing eigenvalues and matrix elements of the matrix $T_0$ that is the division origin based on the eigenvalues and the matrix elements of the two matrices $T_1$ and $T_2$ after the division shown in FIG. 6. Hereinafter, this process will be described.

First, Equation 1 shows that the process of obtaining the eigenvalues can be performed in parallel. For example, the eigenvalue computing unit 17a may compute half eigenvalues, and the eigenvalue computing unit 17b may compute the other half eigenvalues. Here, it is assumed that each of the eigenvalue computing units 17a and 17b has the value of each element of the matrix $D_{12}$ and the vector z.

Furthermore, Equation 2 shows that the process of obtaining each eigenvector $q_i$ also can be performed in parallel. For example, the eigenvalue computing unit 17a may compute half eigenvectors $q_i$ corresponding to the computed eigenvalues, and the eigenvalue computing unit 17b may compute the other half eigenvectors $q_i$ corresponding to the computed eigenvalues.

Furthermore, Equations 3 and 4 show that the process of obtaining f and l also can be performed in parallel. For example, the eigenvalue computing unit 17a may compute part of elements of f and l using the computed eigenvectors $q_i$, and the eigenvalue computing unit 17b may compute the other elements of f and l using the computed eigenvectors $q_i$. Subsequently, the elements of f and l computed by the eigenvalue computing units 17a and 17b are put together by the eigenvalue computing unit 17a or the eigenvalue computing unit 17b, and thus f and l shown in Equations 3 and 4 can be computed.

In this example, the process performed by the eigenvalue computing units 17a and 17b in a case where the elements of z do not include 0 and the diagonal elements of $D_{12}$ do not include the same value was described, but the process of solving the eigenvalue equations, the process of computing the eigenvectors $q_i$, and the process of computing matrix elements of a matrix that is the division origin based on eigenvectors can be performed in parallel in a similar manner even in a case where the elements of z include 0 or in a case where the diagonal elements of $D_{12}$ include the same value.

In this sort of parallel processing in each constituent element, if each unit uses a memory in which information of eigenvalues and the like is stored, multiple units may use the same memory, that is, a shared memory, or the units may respectively use different memories.

In this example, the case was described with reference to FIGS. 24 to 26, in which the eigenvalue decomposition portion 15, the eigenvalue computing portion 17, and the like perform parallel processing using two units. However, the eigenvalue decomposition portion 15, the eigenvalue computing portion 17, and the like may include three or more units that perform parallel processing. Furthermore, the case was described in which parallel processing is performed in each of the eigenvalue decomposition portion 15, the eigenvalue computing portion 17, the Cholesky decomposition portion 22, the vector computing portion 23, the Cholesky decomposition portion 31, and the vector computing portion 32. However, parallel processing may be not performed in one or more given portions. For example, parallel processing may be not performed in the eigenvalue decomposition portion 15.

Furthermore, the parallel processing may be performed in one apparatus using two or more CPUs or the like, or may be performed in two or more apparatuses. For example, as shown in FIG. 27, an apparatus A and an apparatus B may respectively include the eigenvalue decomposition units 15a and 15b, and the apparatuses may perform eigenvalue decomposition in parallel. In this case, an eigenvalue decomposition portion 15-1 including the eigenvalue decomposition unit 15a in the apparatus A and an eigenvalue decomposition portion 15-2 including the eigenvalue decomposition unit 15b in the apparatus B constitute the eigenvalue decomposition portion 15. Accordingly, the eigenvalue decomposition apparatus 1 has a system constituted by the apparatus A and the apparatus B. In this example, the parallel processing by the eigenvalue decomposition portion 15 was described, but the eigenvalue computing portion 17, the Cholesky decomposition portion 22, and the like also may perform parallel processing using two or more apparatuses.

Next, performance evaluation according to a numerical experiment will be described. In this example, the method using the eigenvalue decomposition apparatus 1 according to this embodiment (DDC), standard D&C (DC), QR (QR), and the method using bisection and inverse iteration in combination (B&I) are compared. In the method using the eigenvalue decomposition apparatus 1 according to this embodiment, Cholesky decomposition was performed using qd-type twisted factorization, and inverse iteration (see step S701 in FIG. 12) was used once. DSTEDC provided in LAPACK was used in D&C. DSTEQR provided in LAPACK was used in QR. DSTEVR, whose source code has been partially changed, provided in LAPACK was used in the method using bisection and inverse iteration in combination. LAPACK used in the experiment calls BLAS (basic linear algebra subprograms). In the eigenvalue decomposition portion 15 of the eigenvalue decomposition apparatus 1 according to this embodiment, eigenvalue decomposition was performed using QR. In this numerical experiment, a matrix obtained by performing symmetric tridiagonalization using Lanczos method on a diagonal matrix given at random was used. In graphs showing results of the numerical experiment, the horizontal axis represents the size of a matrix used in the numerical experiment.

FIG. 28 is a graph showing the execution time of calculation. A shorter execution time indicates that the calculation can be performed at higher speed. As seen from the graph in FIG. 28 showing results of the numerical experiment, the method using the eigenvalue decomposition apparatus 1 according to this embodiment can perform eigenvalue decomposition at higher speed than the other methods.

FIG. 29 is a graph showing the orthogonality of computed eigenvectors. A smaller value indicates that the orthogonality is higher. As seen from the graph in FIG. 29 showing results of the numerical experiment, the orthogonality of eigenvectors in the method using the eigenvalue decomposition apparatus 1 according to this embodiment is not as high as those in the other methods. It is seen that the method using the eigenvalue decomposition apparatus 1 according to this embodiment has orthogonality similar to that of the method using bisection and inverse iteration in combination. The reason for this seems to be that eigenvalues are first computed, and then eigenvectors are computed.

FIG. 30 is a graph showing the total sum of relative errors of all eigenvalues. A smaller value indicates that errors are fewer and the accuracy is higher. As seen from the graph in FIG. 30 showing results of the numerical experiment, the accuracy of eigenvalues in the method using the eigenvalue decomposition apparatus 1 according to this embodiment is high compared with those in the other methods. The method according to this embodiment has an accuracy of eigenvalues similar to that of D&C. This result seems to be natural because eigenvalues are computed using D&C in the method using the eigenvalue decomposition apparatus 1 according to this embodiment.

FIG. 31 is a graph showing the total sum of errors of all eigenvectors. A smaller value indicates that errors are fewer and the accuracy is higher. As seen from the graph in FIG. 31 showing results of the numerical experiment, the accuracy of eigenvectors in the method using the eigenvalue decomposition apparatus 1 according to this embodiment is high compared with those in the other methods.

In this manner, with the method using the eigenvalue decomposition apparatus 1 according to this embodiment, eigenvalue decomposition can be performed at high speed, and the accuracy of eigenvalues and eigenvectors is high. Furthermore, this method has excellent parallelism as described above, and thus the process can be performed at higher speed by performing parallel processing.

[Recognition of Facial Images Using Principal Component Analysis]

Next, a case where eigenvalue decomposition is applied to recognition of facial images using the principal component analysis will be described.

The process of recognition of facial images using the principal component analysis is performed following the steps below:

(1) Formation of a projection matrix;
(2) Registration of information related to individual facial images; and
(3) Recognition based on comparison between an input facial image and registered information related to individual facial images.

First, (1) Formation of a projection matrix will be described.

Facial image data of various people is prepared. Herein, the facial image data may be, for example, two-dimensional image data read by an optical reading device such as a scanner, a digital still camera, or a digital video camera, or the like. The facial image data can be displayed as vectors in which each element is represented as a pixel value. The vectors are taken as follows. It is assumed that M pieces of facial image data are handled in this example.

$$x_1, x_2, \ldots, x_M$$

Next, an average value µ of facial image data vectors is computed.

$$\mu = \frac{1}{M} \sum_{i=1}^{M} x_i$$

Then, a covariance matrix C is computed using the computed µ as follows.

$$C = \frac{1}{M} \sum_{i=1}^{M} \sum_{j=1}^{M} (\mu - x_i)(\mu - x_j)^T$$

Subsequently, the eigenvalue decomposition apparatus 1 performs eigenvalue decomposition on the matrix C. That is to say, the matrix C is stored in the matrix storage portion 11, and processes such as diagonalization and matrix division are performed on the matrix C, and thus eigenvalue decomposition is performed. An eigenvalue $\lambda_j$ obtained by performing the eigenvalue decomposition is stored in the eigenvalue storage portion 18. An eigenvector $v_j$ obtained by performing the eigenvalue decomposition can be obtained as described above by causing the orthogonal matrix used in the diagonalization to act on the eigenvector stored in the eigenvector storage portion 20. Here, it is assumed that the subscript j is set in descending order of eigenvalues. That is to say, the eigenvalue $\lambda_j$ is the maximum eigenvalue.

Among the obtained eigenvectors, eigenvectors corresponding to the first d eigenvalues are used to compute a projection matrix η as follows.

$$\eta = (v_1, v_2, \ldots, v_d)$$

Next, (2) Registration of information related to individual facial images will be described.

First, m pieces of facial image data $x^k, x_2^k, \ldots, x_m^k$ are prepared for each individual. Here, the superscript k is a superscript for identifying an individual.

Each of the vectors is multiplied by the projection matrix η, m d-dimensional vectors $\xi_i$ are computed as in the following equation, and thus the average value $\mu^k$ is computed. The average value $\mu^k$ is registered.

$$\xi_i^k = \eta^T x_i^k \quad i = 1, 2, \ldots, m$$

$$\mu^k = \frac{1}{m} \sum_{i=1}^{m} \xi_i^k$$

Next, (3) Recognition based on comparison between an input facial image and registered information related to individual facial images will be described.

It is assumed that facial image data vector x of a person has been input. Then, the facial image data vector x is multiplied by the projection matrix η, and thus the d-dimensional vector ξ is computed.

$$\xi = \eta^T x$$

Next, the norm of a difference between the d-dimensional vector ξ and the average value $\mu^k$ of the d-dimensional vectors $\xi_i$ of the individuals is calculated.

$$\|\mu^k - \xi\|$$

If the norm is smaller than a preset threshold, it may be judged that the input facial image is the individual facial image identified with the superscript k. Alternately, the norm may be calculated for all superscripts k, and it may be judged that the input facial image is the individual facial image identified with the superscript k corresponding to the smallest norm. In this manner, recognition of facial images using the principal component analysis can be performed using the eigenvalue decomposition apparatus 1.

[Application to Image Processing of Restoring Two-Dimensional Images to a Three-Dimensional Image]

Next, a case will be described in which eigenvalue decomposition is applied to image processing of restoring two-dimensional images of an object to a three-dimensional image.

The processing of restoring multiple two-dimensional images to a three-dimensional image is performed following the steps below:

(1) a step of extracting feature points from the two-dimensional images;

(2) a step of calculating data relating to shape (three-dimensional coordinate data of the feature points of the original object) and rotation (transform from the three-dimensional data to the feature point data) based on the feature point data; and (3) a step of performing visualization based on the shape and rotation data.

Hereinafter, the steps (1) and (2) will be described with reference to the flowchart in FIG. 32. Herein, the two-dimensional image may be, for example, a two-dimensional image read by an optical reading device such as a scanner, a digital still camera, or a digital video camera, or the like.

In step S5001, coordinates $(x_i^j, y_i^j)$ of feature points i (i=1, ..., n, n is an integer of 2 or more) are extracted from two-dimensional images j (j=1, ..., m, m is an integer of 3 or more). The two-dimensional images that are handled are preferably weak perspective projection images. At that time, the following equation is obtained.

$$\begin{pmatrix} x_i^j \\ y_i^j \end{pmatrix} = s_j \begin{pmatrix} r_{1,j}^T \\ r_{2,j}^T \end{pmatrix} \begin{pmatrix} X_i \\ Y_i \\ Z_i \end{pmatrix}$$

Herein, $s_j$ is the scale of the jth image with respect to the scale of the object, $r_{1,j}$ and $r_{2,j}$ are respectively the first and the second row vectors of the rotation matrix of the jth camera coordinate system with respect to the object coordinate system, and $(X_i, Y_i, Z_i)^T$ are three-dimensional coordinates of the ith point. The scale of the object is set to be the same as that of the first image ($s_1=1$). The posture of the coordinate system of the object is set to be the same as that of the camera coordinate system of the first image ($r_{1,1}=(1,0,0)^T, r_{2,1}=(0,1,0)^T$). If the coordinates of all n points in m images are arranged as elements of a matrix D, the following equation is obtained.

$D = MS$, where $$D = \begin{pmatrix} x_1^1 & \ldots & x_i^1 & \ldots & x_n^1 \\ \ldots & \ldots & \ldots & \ldots & \ldots \\ x_1^j & \ldots & x_i^j & \ldots & x_n^j \\ \ldots & \ldots & \ldots & \ldots & \ldots \\ x_1^m & \ldots & x_i^m & \ldots & x_n^m \\ y_1^1 & \ldots & y_i^1 & \ldots & y_n^1 \\ \ldots & \ldots & \ldots & \ldots & \ldots \\ y_1^j & \ldots & y_i^j & \ldots & y_n^j \\ \ldots & \ldots & \ldots & \ldots & \ldots \\ y_1^m & \ldots & y_i^m & \ldots & y_n^m \end{pmatrix}, M = \begin{pmatrix} s_1 r_{1,1}^T \\ \ldots \\ s_j r_{1,j}^T \\ \ldots \\ s_m r_{1,m}^T \\ s_1 r_{2,1}^T \\ \ldots \\ s_1 r_{2,j}^T \\ \ldots \\ s_m r_{2,m}^T \end{pmatrix},$$

$$S = \begin{pmatrix} X_1 & \ldots & Y_i & \ldots & X_n \\ Y_1 & \ldots & Y_i & \ldots & Y_n \\ Z_1 & \ldots & Z_i & \ldots & Z_n \end{pmatrix}.$$

The shapes of M and S show that the rank of D is 3. In this example, in step S5001, the matrix D has been given. Hereinafter, the rotation data M and the shape S are obtained.

The singular value decomposition of the matrix D, $D = U\Sigma V^T$, is considered. In the equation, $\Sigma$ is a matrix in which singular values are arranged in size order on the diagonal line, and U and V are respectively the left orthogonal matrix and the right orthogonal matrix. In this singular value decomposition, the above-described eigenvalue decomposition can be used. More specifically, in the eigenvalue decomposition apparatus 1, if the symmetric matrix A stored in the matrix storage portion 11 is taken as $D^T D$, eigenvalue decomposition on the symmetric matrix A is performed as described above. Herein, in the eigenvalue decomposition apparatus 1, the eigenvectors of the symmetric tridiagonal matrix T obtained by transforming the symmetric matrix $D^T D$ are stored in the eigenvector storage portion 20, and thus the eigenvectors have to be transformed into eigenvectors of the matrix $D^T D$ as described above. Furthermore, one-half power (square root) of each eigenvalue of the matrix $D^T D$ is each singular value. That is to say, singular value $\sigma_j = (\lambda_j)^{1/2}$. Furthermore, since the eigenvector and the right singular vector $x_j$ constituting each column of the right orthogonal matrix V are the same, a matrix whose columns are represented as the eigenvector is the right orthogonal matrix V. Here, in a case where the singular value $\sigma_j$ is not 0, the left singular vector $y_j$ constituting each column of the left orthogonal matrix U can be obtained as follows.

$$y_j = \frac{D x_j}{\sigma_j}$$

On the other hand, in a case where the singular value $\sigma_j$ is 0, $y_j$ can be computed by solving $D^T y_j = 0$. Here, the left singular vector $y_j$ is normalized by performing the following replacement.

$$y_j \leftarrow \frac{y_j}{\|y_j\|}$$

In this manner, the left singular vector $y_j$ can be obtained, and the left orthogonal matrix U can be computed by using this left singular vector $y_j$ to obtain $U = (y_1, y_2, \ldots, y_m)$.

Herein, three or more non-zero singular values are obtained due to digital errors of the images. However, the fourth and subsequent singular values are generated due to noise, and are extremely smaller than the first three singular values. Thus, in step 55002, singular vectors are calculated for the first three singular values. That is to say, in the eigenvalue decomposition apparatus 1 according to this embodiment, eigenvectors corresponding to the first three eigenvalues are calculated. The three vectors used herein are represented as follows.

$$D' = L' \Sigma' R'^T = M' S'$$

where $M' = L'(\Sigma')^{1/2}$, $S' = (\Sigma')^{1/2} R'^T$, and D' are a matrix of rank 3 that minimizes $\|D - D'\|$.

Next, M and S are to be obtained using D'. However, the number of the combination is not limited to one. The reason for this is that a given regular matrix C satisfies $D' = (M'C)(C^{-1} S')$. Thus, C in this equation is obtained so that $M = M'C$ is satisfied. C satisfies the following equation.

$$M M^T = M' C C^T M'^T = \begin{pmatrix} 1 & \ldots & \ldots & 0 & \ldots & \ldots \\ \vdots & \ddots & \vdots & \vdots & \ddots & \vdots \\ \ldots & \ldots & s_m^2 & \ldots & \ldots & 0 \\ 0 & \ldots & \ldots & 1 & \ldots & \ldots \\ \vdots & \ddots & \vdots & \vdots & \ddots & \vdots \\ \ldots & \ldots & 0 & \ldots & \ldots & s_m^2 \end{pmatrix}$$

If $E = CC^T$, $2m+1$ linear equations relating to six elements of E are obtained using this equation. Since $m \geq 3$, the elements of E can be uniquely determined. In step S5003, the matrix E is obtained.

Next, in step S5004, C is obtained using E. The degree (9) of freedom of C is higher than the degree (6) of freedom of E. Thus, C can be determined by adding the condition $r_{1j} = (1, 0, 0)^T$, $r_{2j} = (0, 1, 0)^T$. At that time, two solutions (Necker Reversal) are obtained.

Next, in step S5005, the rotation data M and the shape S are determined using $M = M'C$ and $S = C^{-1} S'$.

[Application to Document Search]

Next, a case will be described in which eigenvalue decomposition is applied to document search. Terms associated with the contents of documents are extracted from the documents, and the weights of the terms are calculated. Then, in a vector space model, the documents are represented as vectors whose elements are the weights of the terms. Herein, documents that are to be searched for are taken as $d_1, d_2, \ldots, d_n$, and it is assumed that there are m terms $w_1, w_2, \ldots, w_m$ in total throughout the entire document group. At that time, a document $d_j$ is represented as the following vector. This vector is referred to as a document vector.

$$d_j = \begin{pmatrix} d_{1j} \\ d_{2j} \\ \vdots \\ d_{mj} \end{pmatrix}$$

In the equation, $d_{ij}$ is the weight of a term $w_i$ in the document $d_j$. Furthermore, the entire document group can be represented as an m×n matrix D as follows.

$$D = (d_1 \ d_2 \ \ldots \ d_n) = \begin{pmatrix} d_{11} & d_{12} & \ldots & d_{1n} \\ d_{21} & d_{22} & \ldots & d_{2n} \\ \vdots & \vdots & \ddots & \vdots \\ d_{m1} & d_{m2} & \ldots & d_{mn} \end{pmatrix}$$

The matrix D is referred to as a term-document matrix. Each column of the term-document matrix is a document vector that represents information relating to the document. In a similar manner, each row of the term-document matrix is a vector that represents information relating to the term, and is referred to as a term vector. As in the case of the documents, a search query also can be represented as a vector whose elements are the weights of the terms. If the weight of a term $w_i$ contained in a search query sentence is taken as $q_i$, a search query vector q is represented as follows.

$$q = \begin{pmatrix} q_1 \\ q_2 \\ \vdots \\ q_m \end{pmatrix}$$

In actual document search, a document similar to a given search query sentence has to be found. This process is performed by calculating the similarity between the search query vector q and each of the document vectors $d_j$. Various methods for determining the similarity between vectors are conceivable, but cosine measure (the angle between two vectors) or inner product is frequently used in document search.

$$\cos(d_j, q) = \frac{d_j \cdot q}{\|d_j\|\|q\|} = \frac{\sum_{i=1}^{m} d_{ij} q_i}{\sqrt{\sum_{i=1}^{m} d_{ij}^2} \sqrt{\sum_{i=1}^{m} q_i^2}} \text{ Cosine Measure}$$

$$d_j \cdot q = \sum_{i=1}^{m} d_{ij} q_i \text{ Inner Product}$$

Herein, if the length of the vectors is normalized to 1 (if cosine normalization is performed), the cosine measure matches the inner product.

FIG. 33 is a flowchart showing an example of a document search method using the eigenvalue decomposition apparatus 1 according to this embodiment.

In step S6001, a query vector q is received.

In this example, search using an approximate matrix $D_k$ of D is considered. In a vector space model, search is performed by calculating the similarity between the search query vector q and each of the document vectors $d_j$ in the term-document matrix D, but $D_k$ is used instead of D in this example. In a vector space model, the number of the dimensions of the document vectors is equal to the total number of the terms. Accordingly, as the number of documents that are to be searched for increases, the number of the dimensions of the document vectors also tends to increase. However, as the number of the dimensions increases, problems such as limitation due to a memory of a computer or an increase in search time occur. Furthermore, the noise-related influences of unnecessary terms contained in the documents lower search accuracy. Latent semantic indexing (LSI) is a technique that improves search accuracy by projecting document vectors in a high-dimensional space into a low-dimensional space.

Terms separately treated in a high-dimensional space may be treated as mutually associated terms in a low-dimensional space, and thus search based on the semantics and the concepts of the terms can be performed. For example, in an ordinary vector space model, the term 'car' is totally different from the term 'automobile', and thus a query with one of the terms cannot be used in the search for a document containing the other term. However, in a low-dimensional space, it is expected that these terms semantically associated to each other are reduced to one dimension, and thus the search query 'car' can be used in the search not only for a document containing 'car' but also for a document containing 'automobile'. In LSI, the number of the dimensions of a high-dimensional vector is reduced by singular value decomposition. This process is basically equivalent to principal component analysis in multivariate analysis.

In step S6002, k is selected. Herein, k satisfying k<r is selected, r=min(n, m), and k may be given in advance or may be selectable in each calculation.

Next, in step S6003, singular value decomposition on a matrix D is performed. In this singular value decomposition, the method using eigenvalue decomposition can be used as described in the application to image processing of restoring two-dimensional images to a three-dimensional image. More specifically, in the eigenvalue decomposition apparatus 1, if the symmetric matrix A stored in the matrix storage portion 11 is taken as the matrix $D^T D$, eigenvalue decomposition on the symmetric matrix A is performed as described above. As a result, singular value decomposition can be performed on the matrix D. In this singular value decomposition, singular vectors of D are computed for k singular values consisting of the first to the kth calculated singular values arranged in descending order by size. That is to say, in the eigenvalue decomposition, eigenvectors may be computed for k eigenvalues consisting of the first to the kth calculated eigenvalues arranged in descending order by size, and the eigenvectors may be used to compute singular vectors. Herein, k is the value selected in step S6002.

More specifically, $U_k$ and $V_k$ satisfying $D_k = U_k \Sigma V_k^T$ are calculated. Herein, $U_k$ is an m×k matrix constituted only by the first k left singular vectors, $V_k$ is an n×k matrix constituted only by the first k right singular vectors, and $\Sigma$ is a k×k diagonal matrix constituted only by the first k singular values.

Next, in step S6004, the similarity between the matrix $D_k$ and the query vector q is calculated. If a vector $e_j$ is taken as an n-dimensional unit vector, the jth document vector of $D_k$ can be represented as $D_k e_j$. Examples of the manner in which the similarity between the document vector $D_k e_j$ and the search query vector q is calculated include, but are not limited to, $$\cos(D_k e_j, q) = \frac{(D_k e_j) \cdot q}{\|D_k e_j\|\|q\|}$$

$$= \frac{(D_k e_j)^T q}{\|D_k e_j\|\|q\|}$$

$$= \frac{(U_k \Sigma_k V_k^T e_j)^T q}{\|U_k \Sigma_k V_k^T e_j\|\|q\|}$$

$$= \frac{e_j^T V_k \Sigma_k U_k^T q}{\|\Sigma_k V_k^T e_j\|\|q\|}$$

$$= \frac{(\Sigma_k V_k^T e_j)^T (U_k^T q)}{\|\Sigma_k V_k^T e_j\| \|q\|}.$$

This equation shows that $D_k$ does not have to be rebuilt based on $U_k$, $E_k$, and $V_k$, and that the similarity can be directly calculated using a result of the singular value decomposition. In this equation, $E_k V_k^T e_j$ can be rewritten as $\Sigma_k V_k^T e_j = U_k^T D_k e_j$. The right side of this equation represents the coordinates of the jth document vector in the approximate matrix $D_k$ under the basis $U_k$ (representation of the document in k dimensions). In a similar manner, $U_k^T q$ in the equation shown above refers to the coordinates of the search query vector q under the basis $U_k$ (representation of the search query in k dimensions).

In step S6005, a result of the search using the similarity calculated in step S6004 as a reference is output.

In this manner, the eigenvalue decomposition apparatus 1 according to this embodiment can be used for various processes such as image processing and search processing. It will be appreciated that the eigenvalue decomposition apparatus 1 can be used for processes other than the above.

As described above, in the eigenvalue decomposition apparatus 1 according to this embodiment, only eigenvalues are computed using D&C. Accordingly, vector update, which is performed in standard D&C, does not have to be performed, and thus the processing can be performed much faster than standard D&C. Furthermore, the process of computing eigenvectors based on the eigenvalues also can be performed at high speed. Moreover, the eigenvalue decomposition apparatus 1 according to this embodiment has substantially high parallelism in both of the step of computing eigenvalues and the step of computing eigenvectors based on the eigenvalues, although it is difficult to perform the step of computing eigenvalues in parallel in QR. Furthermore, it is seen that the accuracy obtained using the eigenvalue decomposition apparatus 1 according to this embodiment is higher than those of other methods.

Herein, the eigenvalue decomposition apparatus 1 according to this embodiment may be a stand-alone apparatus, may be a server apparatus in a server-client system, or may be a system constituted by multiple apparatuses as described above. If the eigenvalue decomposition apparatus 1 is a server apparatus in a server-client system, the symmetric matrix A stored in the matrix storage portion 11, eigenvalues stored in the eigenvalue storage portion 18, eigenvectors stored in the eigenvector storage portion 20, and the like may be exchanged via a communication line such as the Internet or an intranet.

Furthermore, in computation of eigenvectors using the eigenvalue decomposition apparatus 1 according to this embodiment, qd-type twisted factorization may be used in computation of eigenvectors using some eigenvalues, and LV-type twisted factorization may be used in computation of eigenvectors using the other eigenvalues. For example, eigenvectors may be computed using LV-type twisted factorization for eigenvalues that are close to each other, and eigenvectors may be computed using qd-type twisted factorization for eigenvalues that are not close to each other. It is possible to judge whether or not eigenvalues are close to each other, based on comparison with a preset threshold stored in a given storage medium or the like.

Furthermore, in the foregoing embodiments, each processing or each function may be realized by integrated processing by a single apparatus or a single system, or alternatively, may be realized by distributed processing by multiple apparatuses or multiple systems.

Furthermore, in the foregoing embodiments, each constituent element may be constituted by dedicated hardware, or alternatively, constituent elements that can be realized as software may be realized by executing a program. For example, each constituent element may be realized by a program execution portion such as a CPU reading and executing a software program stored in a storage medium such as a hard disk or a semiconductor memory. Herein, the software that realizes the eigenvalue decomposition apparatus in the foregoing embodiments may be a following program. Specifically, this program is a program for causing a computer to execute: a matrix dividing step of reading a symmetric tridiagonal matrix T from a diagonal matrix storage portion in which the symmetric tridiagonal matrix T is stored, dividing the symmetric tridiagonal matrix T into two symmetric tridiagonal matrices, and storing the symmetric tridiagonal matrices in the diagonal matrix storage portion, and repeating the process of dividing the symmetric tridiagonal matrix into two symmetric tridiagonal matrices and storing the symmetric tridiagonal matrices in the diagonal matrix storage portion until the size of each of the symmetric tridiagonal matrices after the division becomes not greater than a predetermined size; an eigenvalue decomposition step of reading each of the symmetric tridiagonal matrices whose size is not greater than the predetermined size from the diagonal matrix storage portion, performing eigenvalue decomposition on each of the symmetric tridiagonal matrices, at least computing eigenvalues of each of the symmetric tridiagonal matrices and matrix elements of an orthogonal matrix constituted by eigenvectors of each of the symmetric tridiagonal matrices, and storing the eigenvalues and the matrix elements in an eigenvalue decomposition storage portion; an eigenvalue computing step of reading the eigenvalues and the matrix elements of each of the symmetric tridiagonal matrices from the eigenvalue decomposition storage portion, computing eigenvalues of the symmetric tridiagonal matrix that is the division origin and matrix elements of the symmetric tridiagonal matrix that is the division origin based on the eigenvalues and the matrix elements, and storing the computed eigenvalues and matrix elements in the eigenvalue decomposition storage portion, repeating the process of computing eigenvalues and matrix elements of the symmetric tridiagonal matrix that is the division origin until at least one eigenvalue of the symmetric tridiagonal matrix T is computed, and storing the at least one eigenvalue of the symmetric tridiagonal matrix T in an eigenvalue storage portion; and an eigenvector computing step of reading the symmetric tridiagonal matrix T from the diagonal matrix storage portion, reading the eigenvalue of the symmetric tridiagonal matrix T from the eigenvalue storage portion, computing at least one eigenvector of the symmetric tridiagonal matrix T based on the symmetric tridiagonal matrix T and the eigenvalue thereof using twisted factorization, and storing the at least one eigenvector in an eigenvector storage portion.

Furthermore, this program may be configured so that, in the eigenvector computing step, an eigenvector is computed using qd-type twisted factorization.

Furthermore, this program may be configured so that the eigenvector computing step comprises: a positive-definite forming step of reading the eigenvalues of the symmetric tridiagonal matrix T from the eigenvalue storage portion, and, if any of the eigenvalues is a negative value, reading the symmetric tridiagonal matrix T from the diagonal matrix storage portion, changing the symmetric tridiagonal matrix T into positive definite so that all eigenvalues of the symmetric tridiagonal matrix T are positive values, without changing the eigenvectors of the symmetric tridiagonal matrix T, storing eigenvalues after the positive-definite formation in the eigenvalue storage portion, and storing a symmetric tridiagonal matrix T after the positive-definite formation in the diagonal matrix storage portion; a Cholesky decomposition step of reading the symmetric tridiagonal matrix T in which all eigenvalues are positive values from the diagonal matrix storage portion, reading the positive eigenvalues of the symmetric tridiagonal matrix T from the eigenvalue storage portion, and performing Cholesky decomposition on the symmetric tridiagonal matrix T into an upper bidiagonal matrix $B^{(+1)}$ and a lower bidiagonal matrix $B^{(-1)}$, by performing qd-type transformation on each element of the symmetric tridiagonal matrix T; and a vector computing step of computing eigenvectors using each element of the upper bidiagonal matrix $B^{(+1)}$ and the lower bidiagonal matrix $B^{(-1)}$ and the positive eigenvalues of the symmetric tridiagonal matrix T, and storing the eigenvectors in the eigenvector storage portion.

Furthermore, this program may be configured so that, in the eigenvector computing step, an eigenvector is computed using LV-type twisted factorization.

Furthermore, this program may be configured so that the eigenvector computing step comprises: a Cholesky decomposition step of reading the symmetric tridiagonal matrix T from the diagonal matrix storage portion, reading the eigenvalue of the symmetric tridiagonal matrix T from the eigenvalue storage portion, and performing Cholesky decomposition on the symmetric tridiagonal matrix T into an upper bidiagonal matrix $B^{(+1)}$ and a lower bidiagonal matrix $B^{(-1)}$, by performing Miura transformation, dLVv-type transformation, and inverse Miura transformation on each element of the symmetric tridiagonal matrix T; and a vector computing step of computing an eigenvector using each element of the upper bidiagonal matrix $B^{(+1)}$ and the lower bidiagonal matrix $B^{(-1)}$ and the eigenvalue of the symmetric tridiagonal matrix T, and stores the eigenvector in the eigenvector storage portion.

Furthermore, in this program, the computer may be caused to further execute a diagonalization step of reading a symmetric matrix A from a matrix storage portion in which the symmetric matrix A is stored, computing a symmetric tridiagonal matrix T in which the symmetric matrix A is tridiagonalized, and storing the symmetric tridiagonal matrix T in the diagonal matrix storage portion.

It should be noted that in this program, a process that can be performed only with hardware is not at least included, for example, in the step of storing information.

Furthermore, this program may be executed by downloading from a server or the like, or may be executed by reading a program stored on a given storage medium (e.g., an optical disk such as a CD-ROM, a magnetic disk, a semiconductor memory, etc.).

Furthermore, the computer that executes this program may be a single computer or multiple computers. More specifically, centralized processing may be performed, or distributed processing may be performed.

FIG. 34 is a schematic diagram showing an example of the external appearance of a computer that executes the above-described program to realize the eigenvalue decomposition apparatus 1 in the foregoing embodiments. The foregoing embodiments can be realized by computer hardware and a computer program executed thereon.

In FIG. 34, a computer system 100 includes a computer 101 including a CD-ROM (compact disk read only memory) drive 105 and an FD (flexible disk) drive 106, a keyboard 102, a mouse 103, and a monitor 104.

FIG. 35 is a diagram showing the computer system. In FIG. 35, the computer 101 includes, not only the CD-ROM drive 105 and the FD drive 106, but also a CPU (central processing unit) 111, a ROM (read only memory) 112 in which a program such as a startup program is to be stored, a RAM (random access memory) 113 that is connected to the CPU 111, and in which a command of an application program is temporarily stored, and a temporary storage area is provided, a hard disk 114 in which an application program, a system program, and data are stored, and a bus 115 that connects the CPU 111, the ROM 112, and the like. Herein, the computer 101 may include a network card (not shown) for providing a connection to a LAN.

The program for causing the computer system 100 to execute the functions of the eigenvalue decomposition apparatus 1 in the foregoing embodiments may be stored in a CD-ROM 121 or an FD 122, inserted into the CD-ROM drive 105 or the FD drive 106, and transmitted to the hard disk 114. Alternatively, the program may be transmitted to the computer 101 via a network (not shown) and stored in the hard disk 114. At the time of execution, the program is loaded into the RAM 113. The program may be loaded from the CD-ROM 121 or the FD 122, or directly from a network.

Furthermore, the matrix storage portion 11, the diagonal matrix storage portion 13, the eigenvalue decomposition storage portion 16, the eigenvalue storage portion 18, and the eigenvector storage portion 20 may be realized as the RAM 113 or the hard disk 114.

The program does not necessarily have to include, for example, an operating system (OS) or a third party program for causing the computer 101 to execute the functions of the eigenvalue decomposition apparatus 1 in the foregoing embodiments. The program may only include a command portion to call an appropriate function (module) in a controlled mode and obtain desired results. The manner in which the computer system 100 operates is well known, and thus a detailed description thereof has been omitted.

The present invention is not limited to the embodiments set forth herein. Various modifications are possible within the scope of the present invention.

In the description above, only some of typical embodiments of the present invention were described in detail. It will be apparent to those skilled in the art that many modifications can be made to the typical embodiments without substantially departing from the merits and the novel technique of the present invention. Accordingly, all of these modifications are within the scope of the present invention.

Industrial Applicability

As described above, the eigenvalue decomposition apparatus and the like according to the present invention can perform eigenvalue decomposition at high speed, and thus this apparatus and the like are useful, for example, in chemical calculation processing using molecular orbital method, statistical calculation processing, information search processing, and other apparatuses that perform processing using eigenvalue decomposition.

Figure 1:
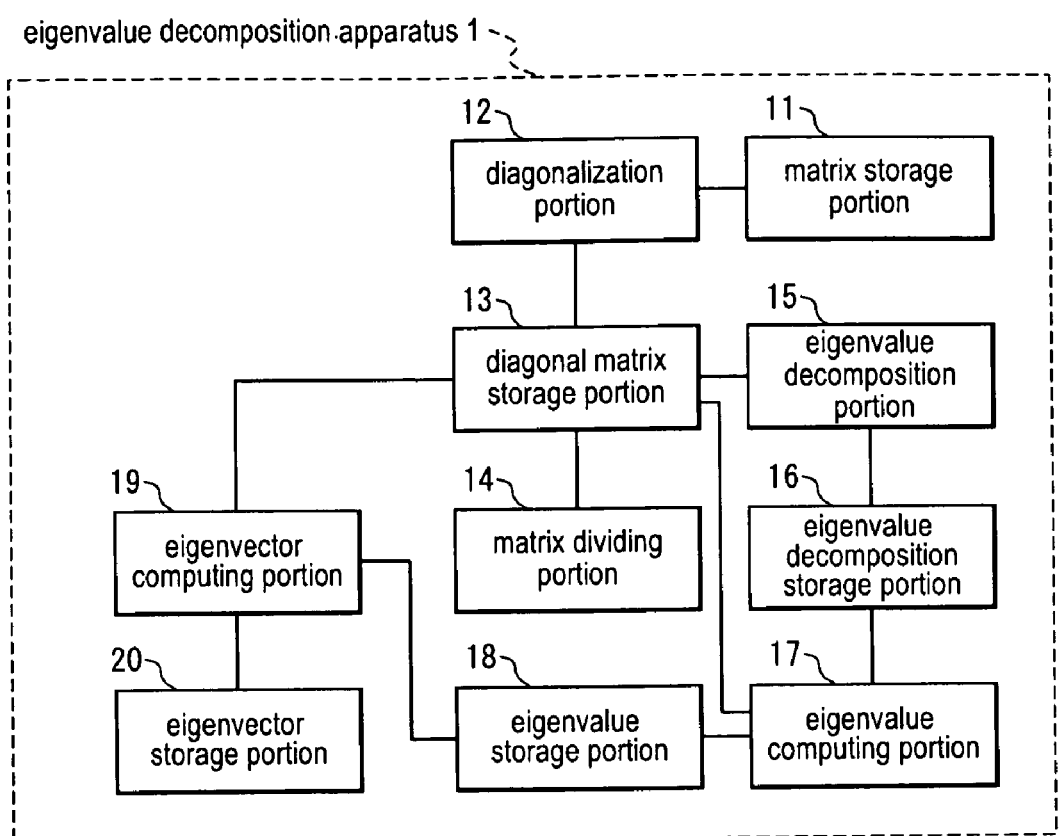
FIG. 1 is a block diagram showing the configuration of an eigenvalue decomposition apparatus according to Embodiment 1 of the present invention.
Figure 2:
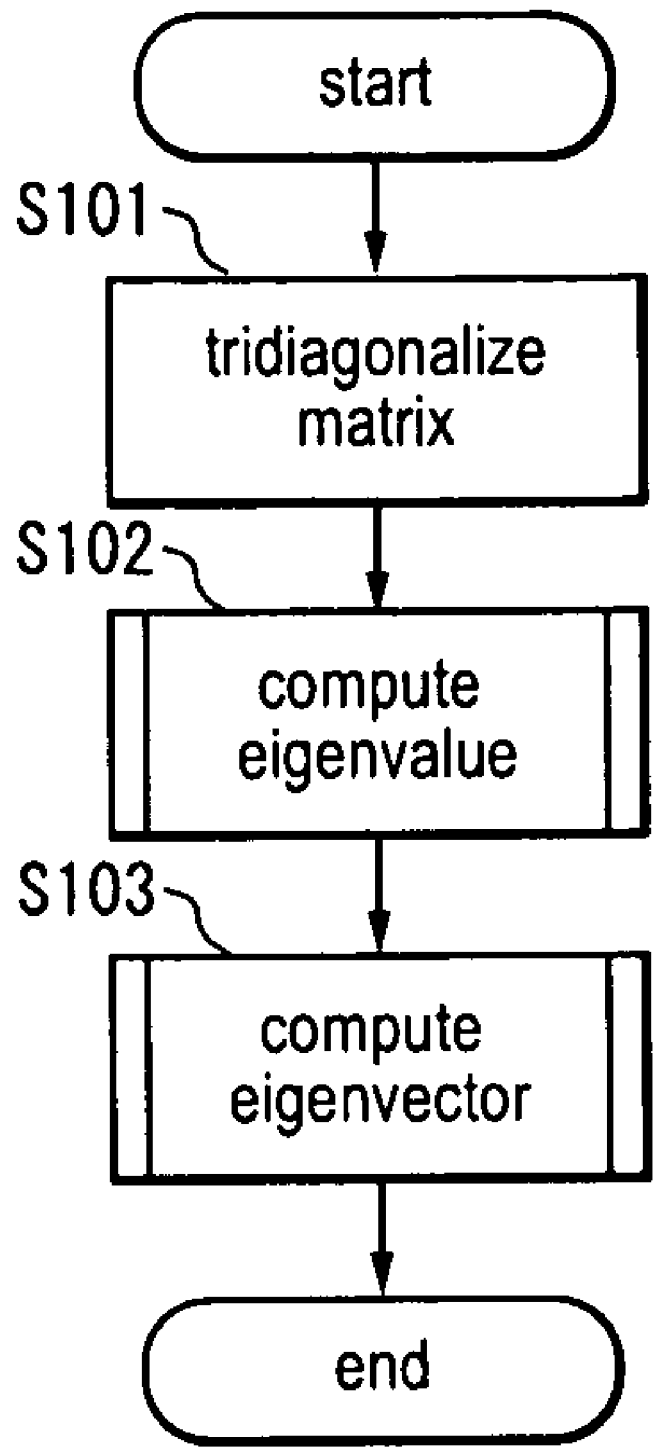
FIG. 2 is a flowchart showing the operation of the eigenvalue decomposition apparatus according to this embodiment.
Figure 3:
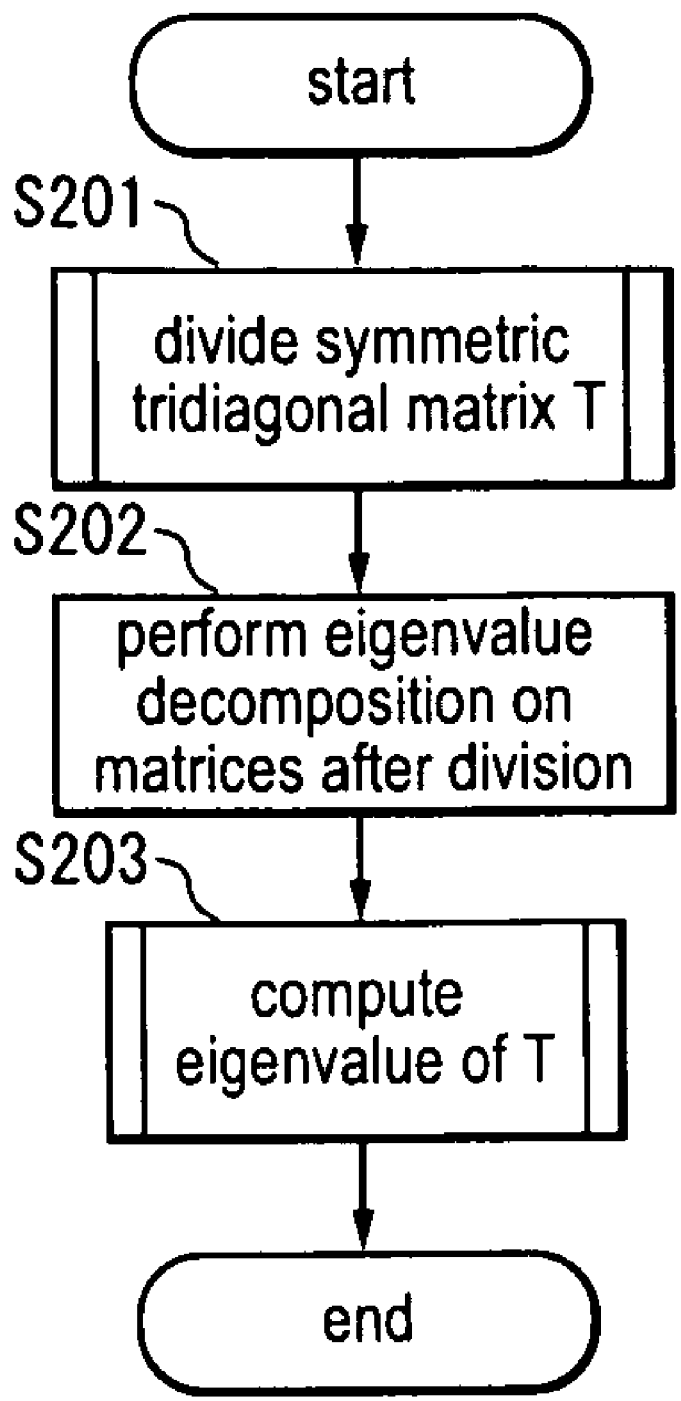
FIG. 3 is a flowchart showing the operation of the eigenvalue decomposition apparatus according to this embodiment.
Figure 4:
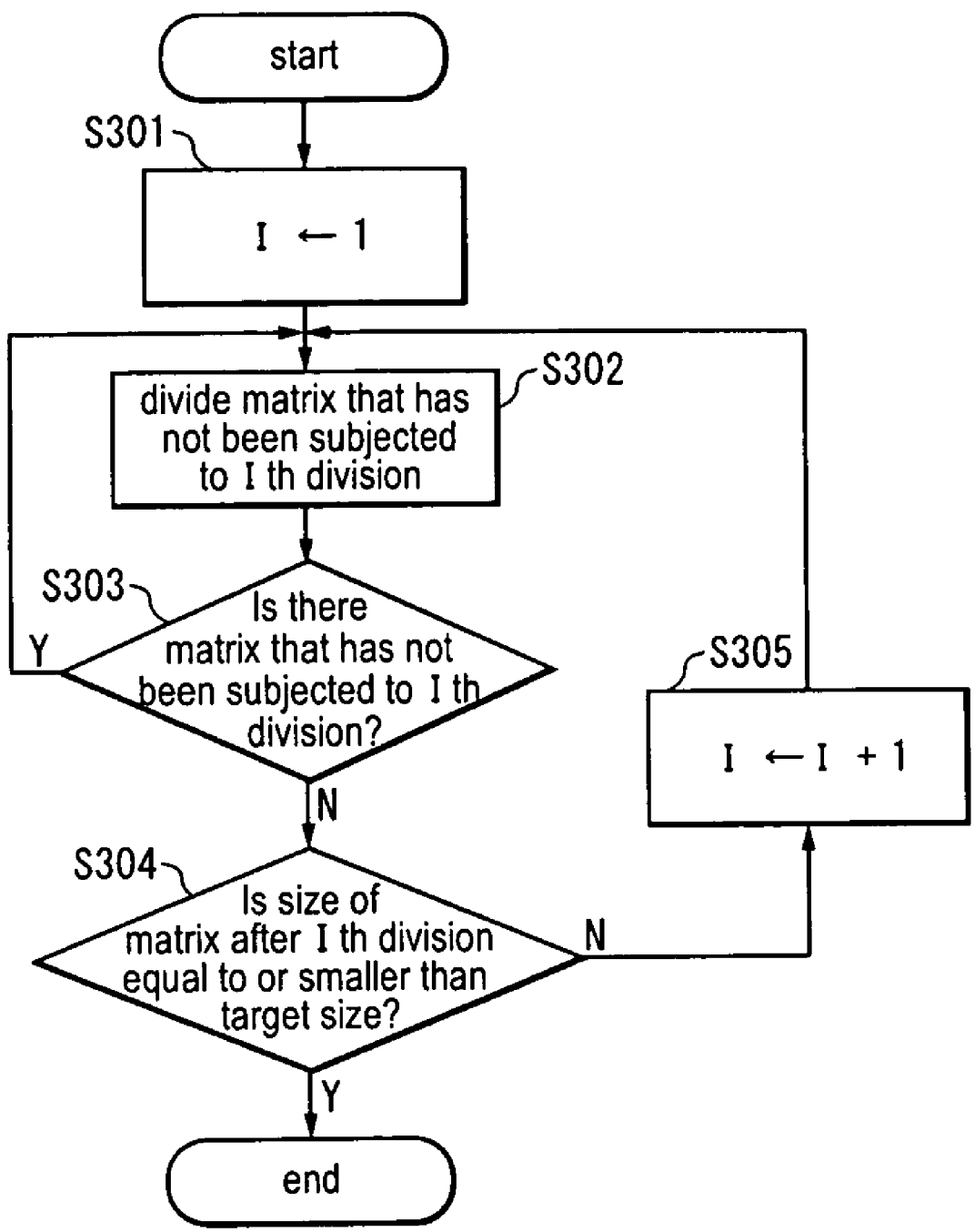
FIG. 4 is a flowchart showing the operation of the eigenvalue decomposition apparatus according to this embodiment.
Figure 5:
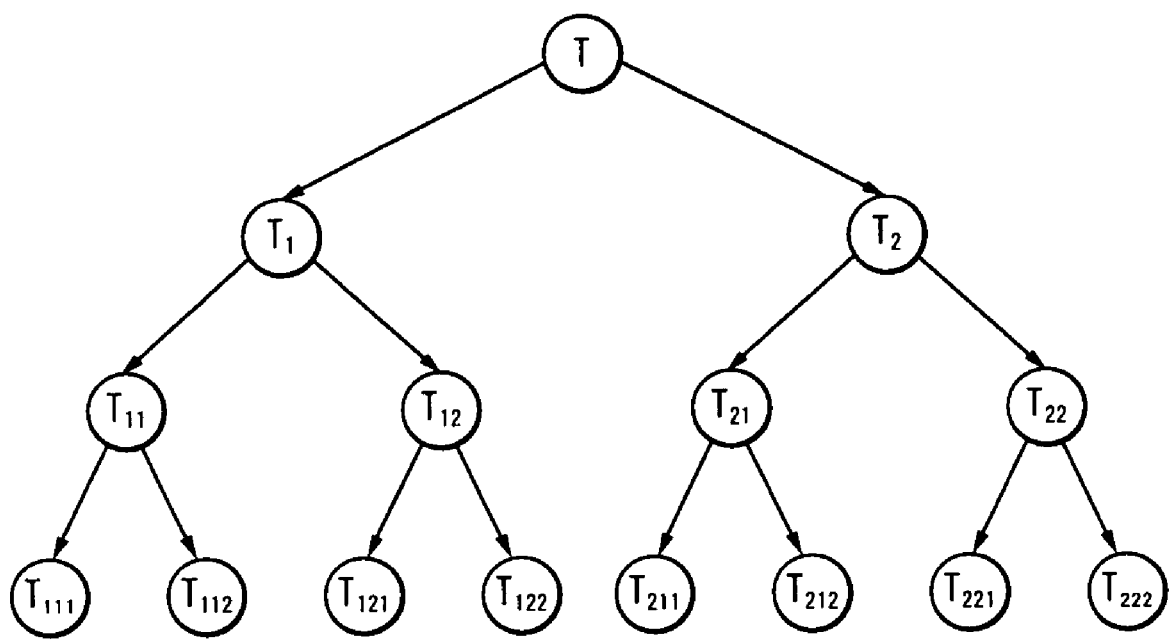
FIG. 5 is a diagram for illustrating a process of dividing a symmetric tridiagonal matrix T according to this embodiment.
Figure 6:
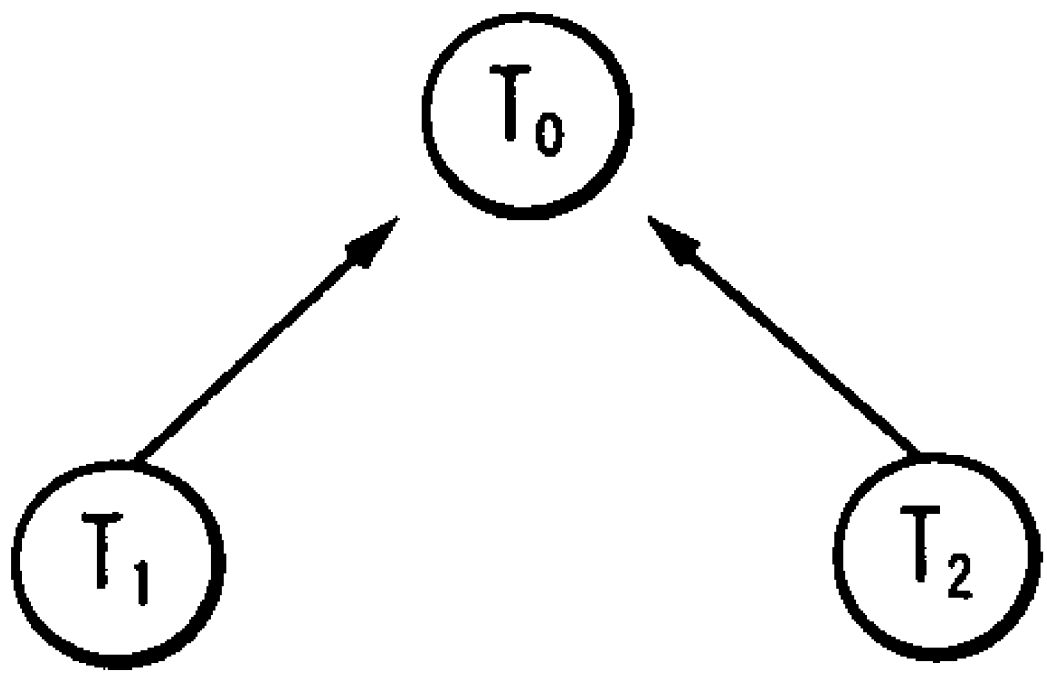
FIG. 6 is a diagram for illustrating a process of computing eigenvalues of the symmetric tridiagonal matrix T according to this embodiment.
Figure 7:
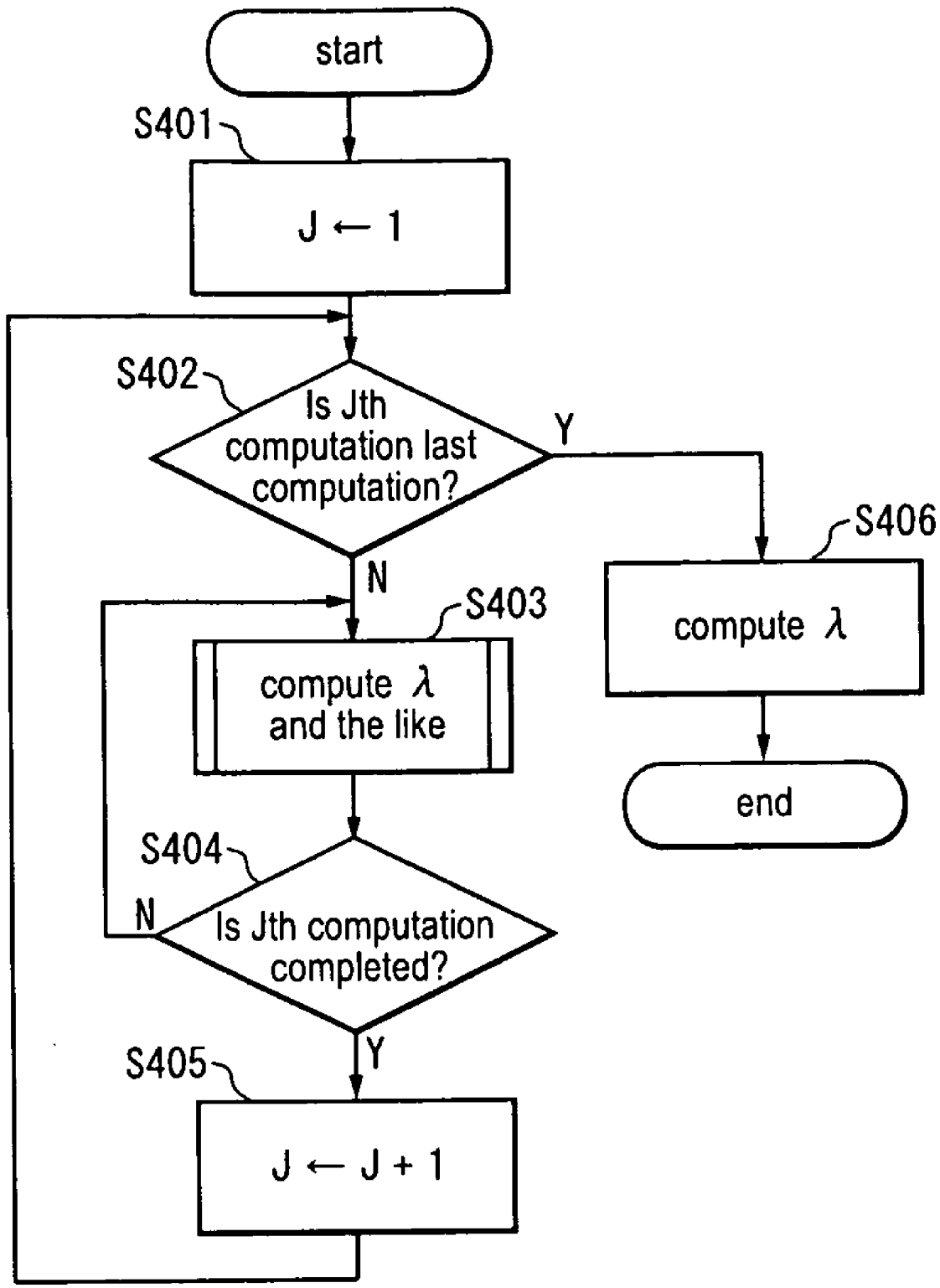
FIG. 7 is a flowchart showing the operation of the eigenvalue decomposition apparatus according to this embodiment.
Figure 8:
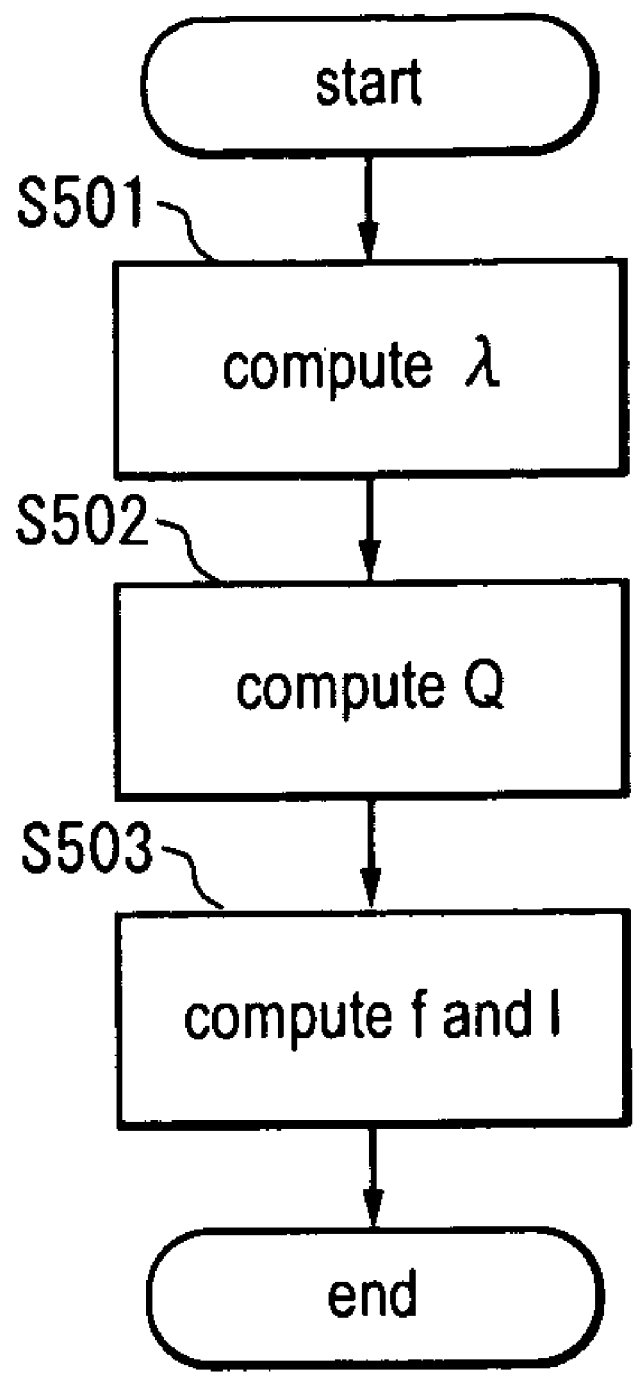
FIG. 8 is a flowchart showing the operation of the eigenvalue decomposition apparatus according to this embodiment.
Figure 9:
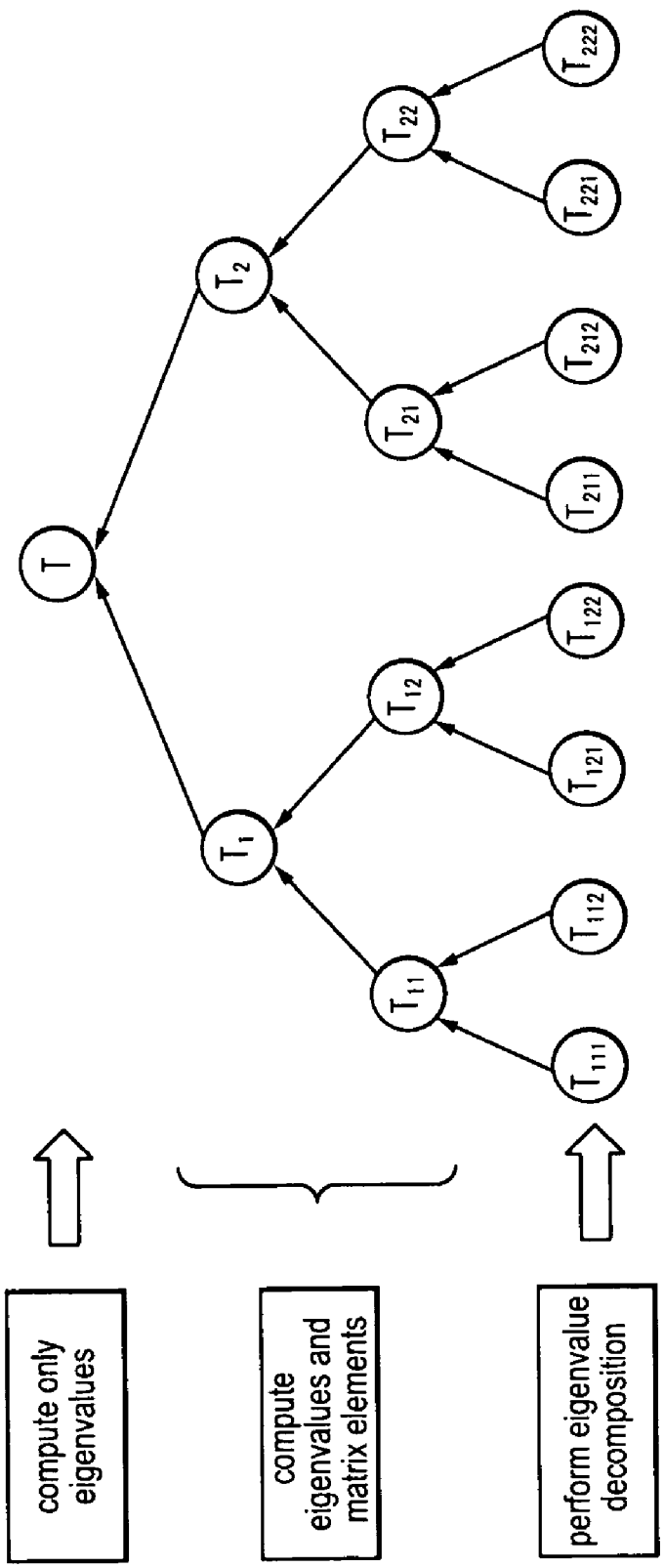
FIG. 9 is a diagram for illustrating a process of computing eigenvalues of the symmetric tridiagonal matrix T according to this embodiment.
Figure 10:
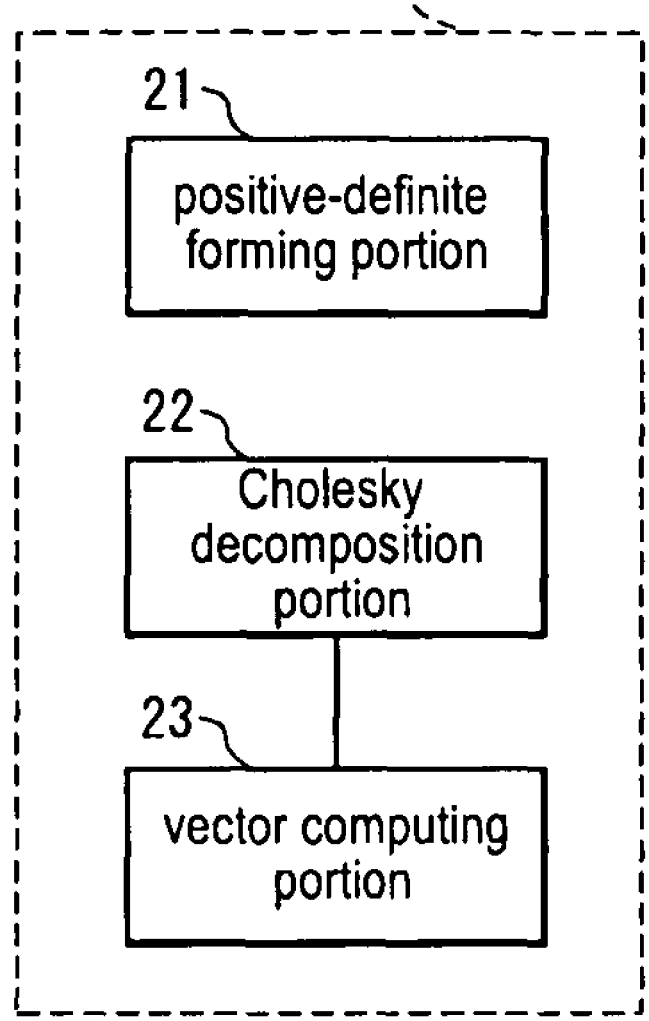
FIG. 10 is a block diagram showing the configuration of an eigenvector computing portion according to this embodiment.
Figure 11:
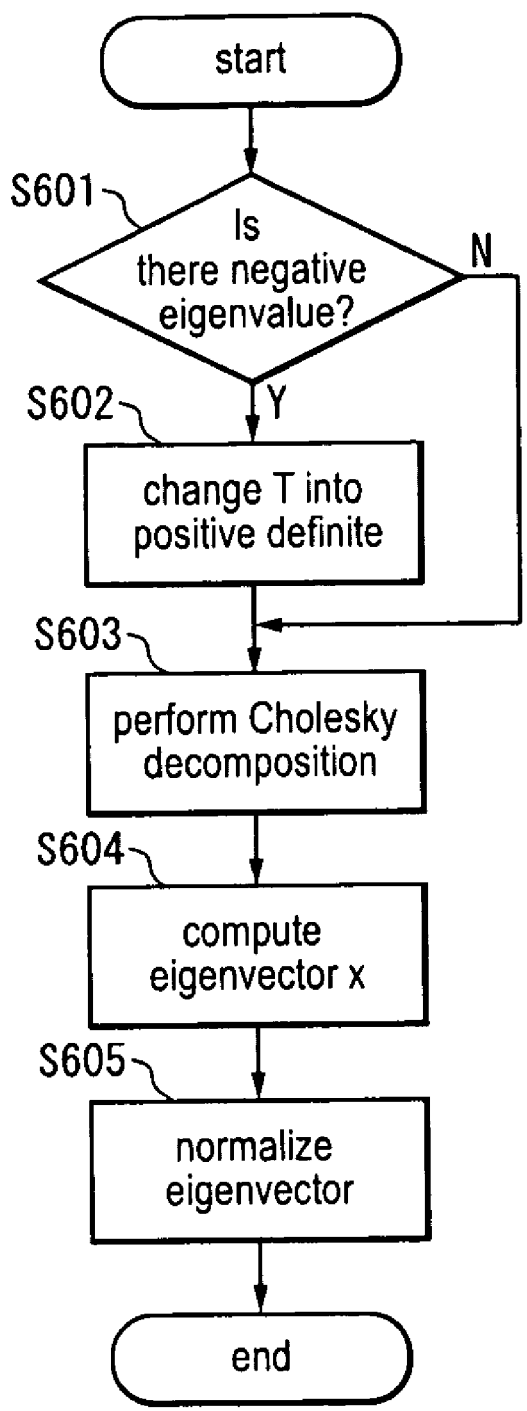
FIG. 11 is a flowchart showing the operation of the eigenvalue decomposition apparatus according to this embodiment.
Figure 12:
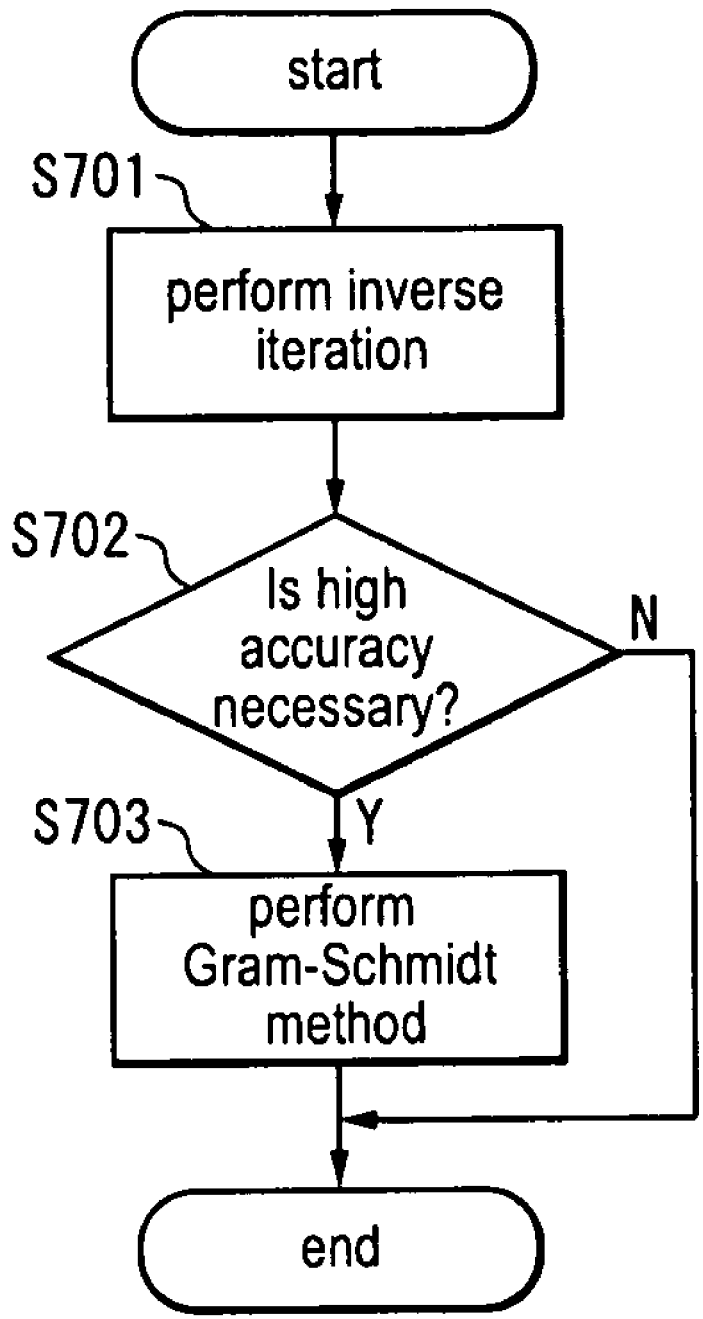
FIG. 12 is a flowchart showing the operation of the eigenvalue decomposition apparatus according to this embodiment.
Figure 13:
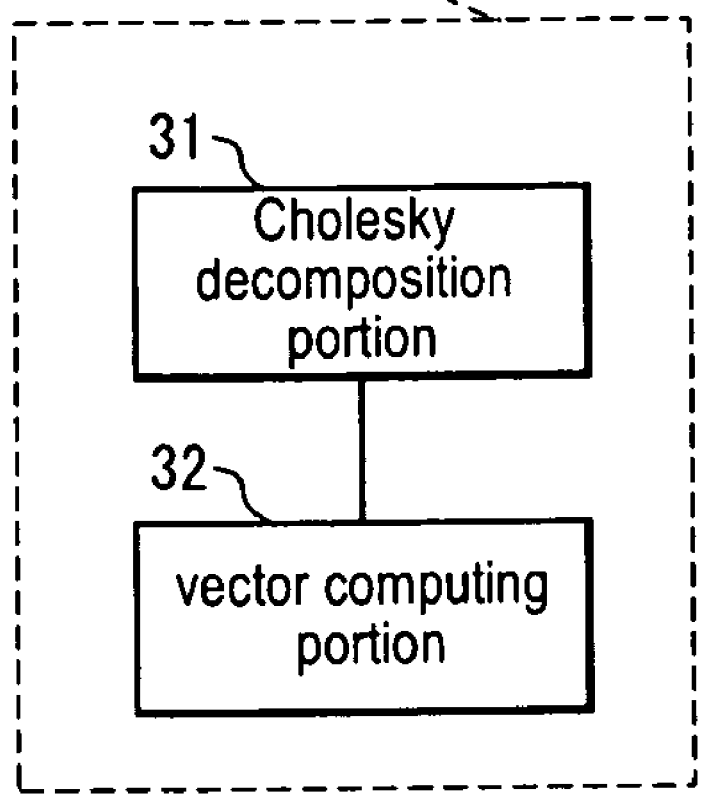
FIG. 13 is a block diagram showing the configuration of the eigenvector computing portion according to this embodiment.
Figure 14:
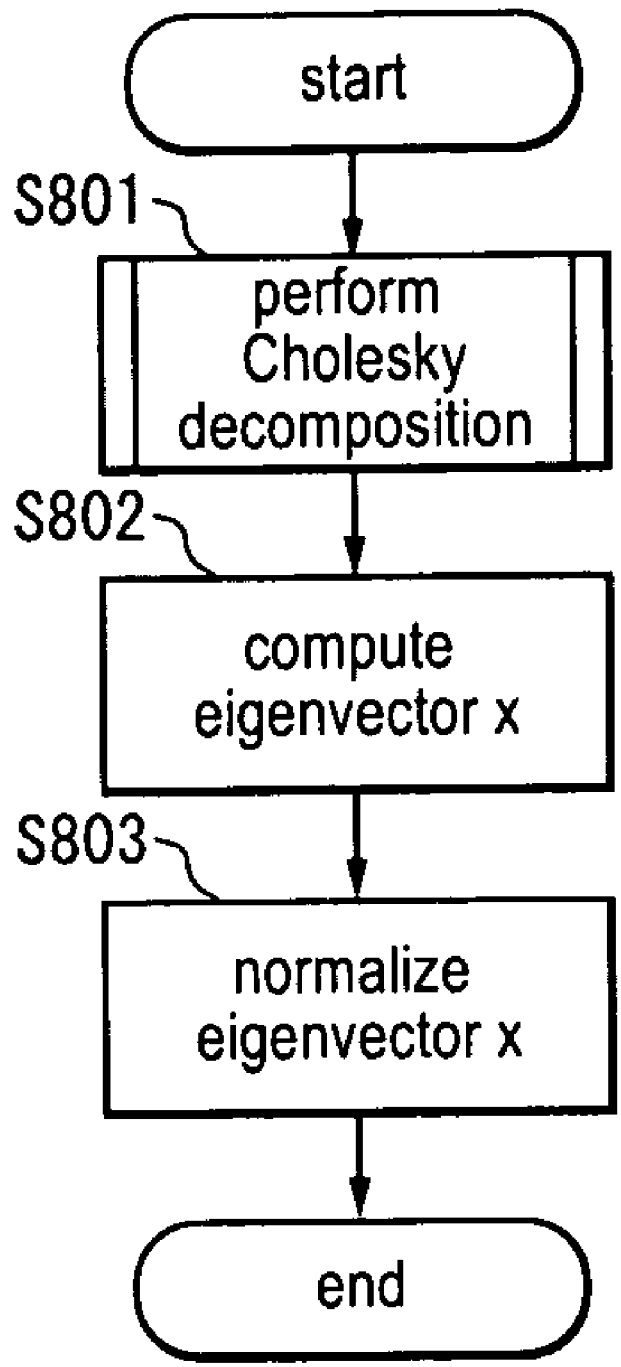
FIG. 14 is a flowchart showing the operation of the eigenvalue decomposition apparatus according to this embodiment.
Figure 15:
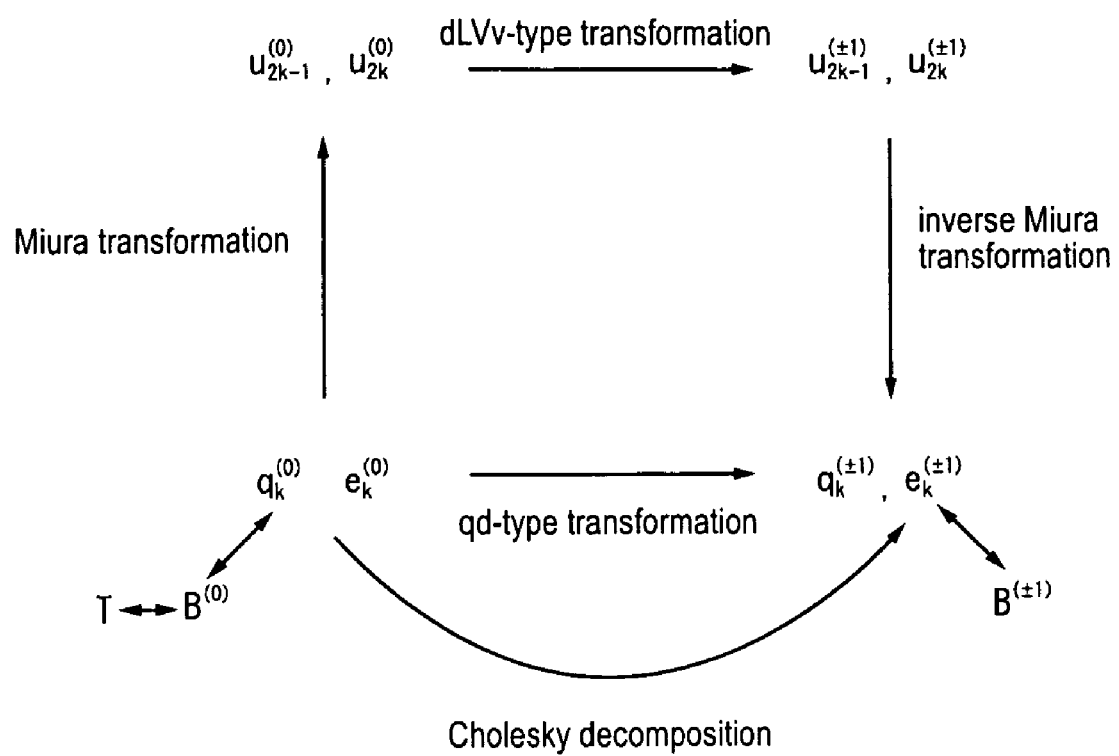
FIG. 15 is a diagram for illustrating Cholesky decomposition according to this embodiment.
Figure 16:
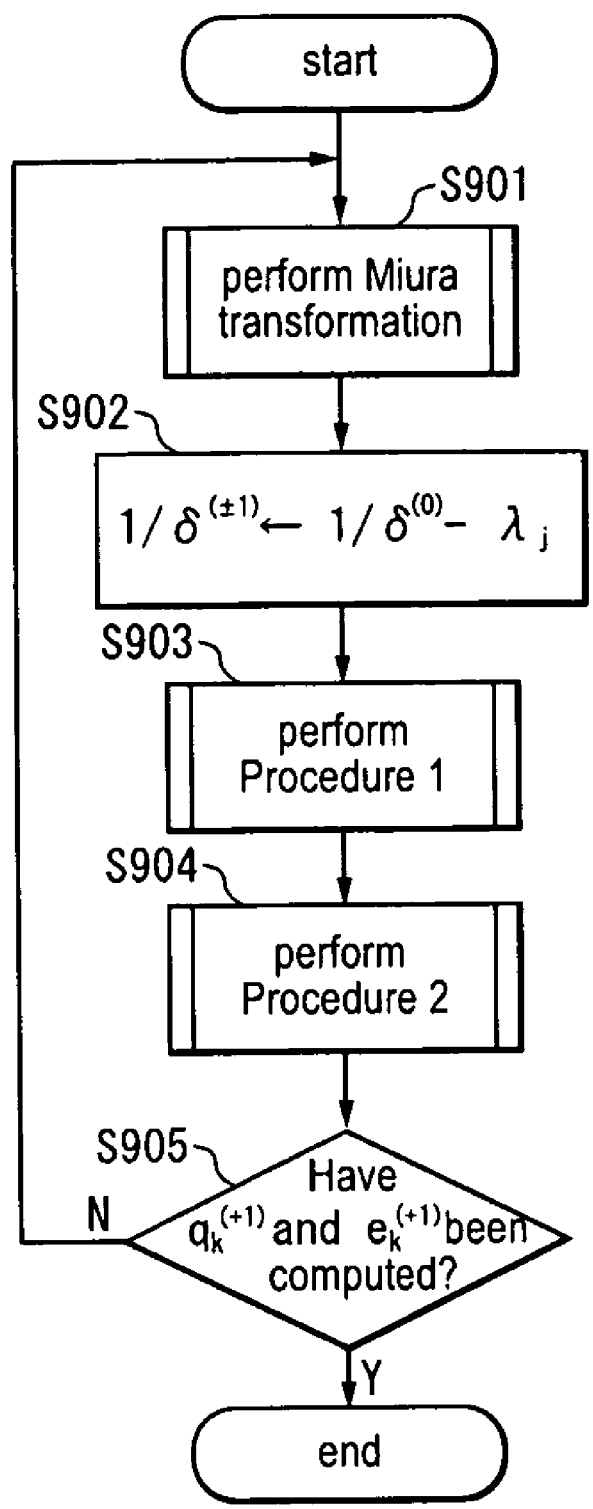
FIG. 16 is a flowchart showing the operation of the eigenvalue decomposition apparatus according to this embodiment.
Figure 17:
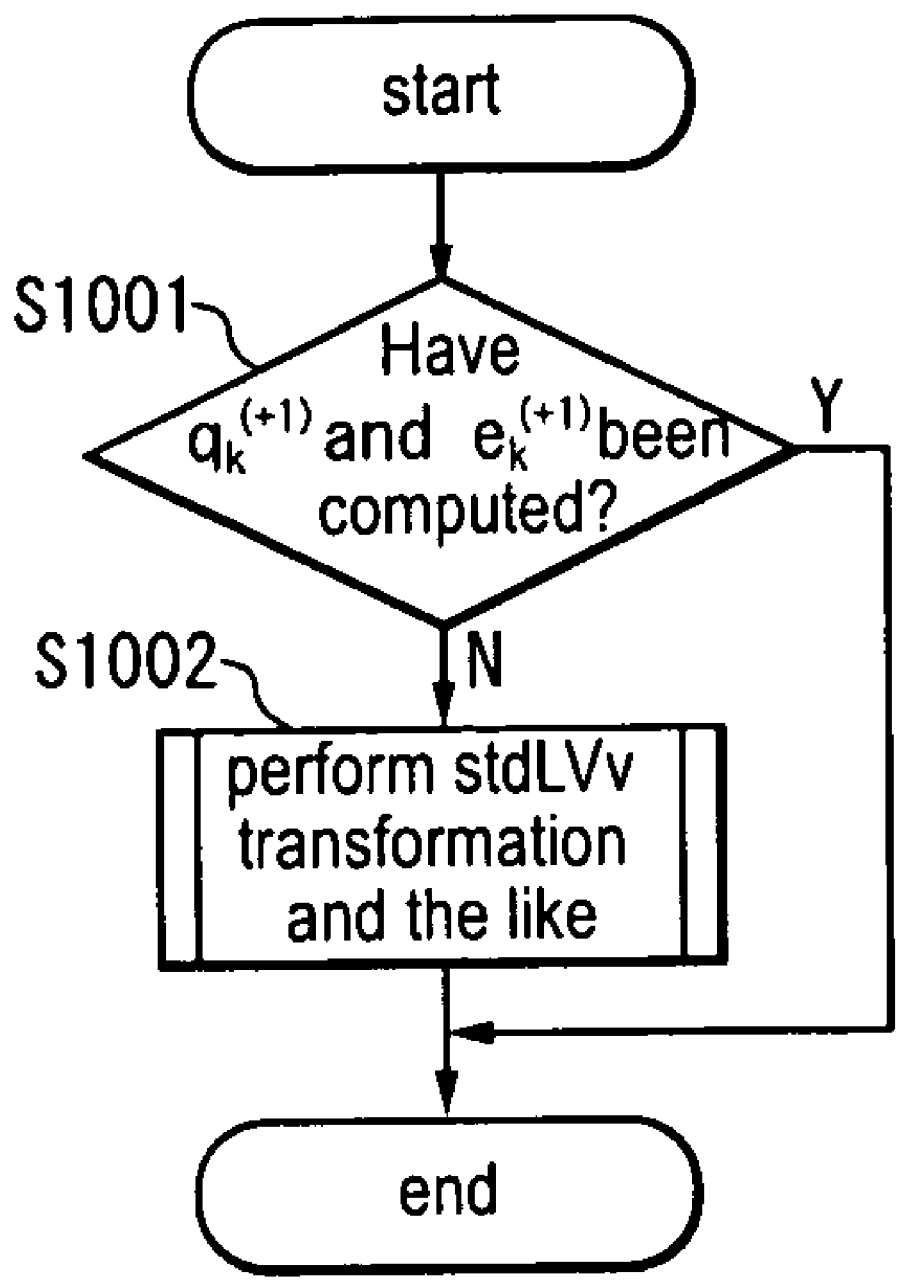
FIG. 17 is a flowchart showing the operation of the eigenvalue decomposition apparatus according to this embodiment.
Figure 18:
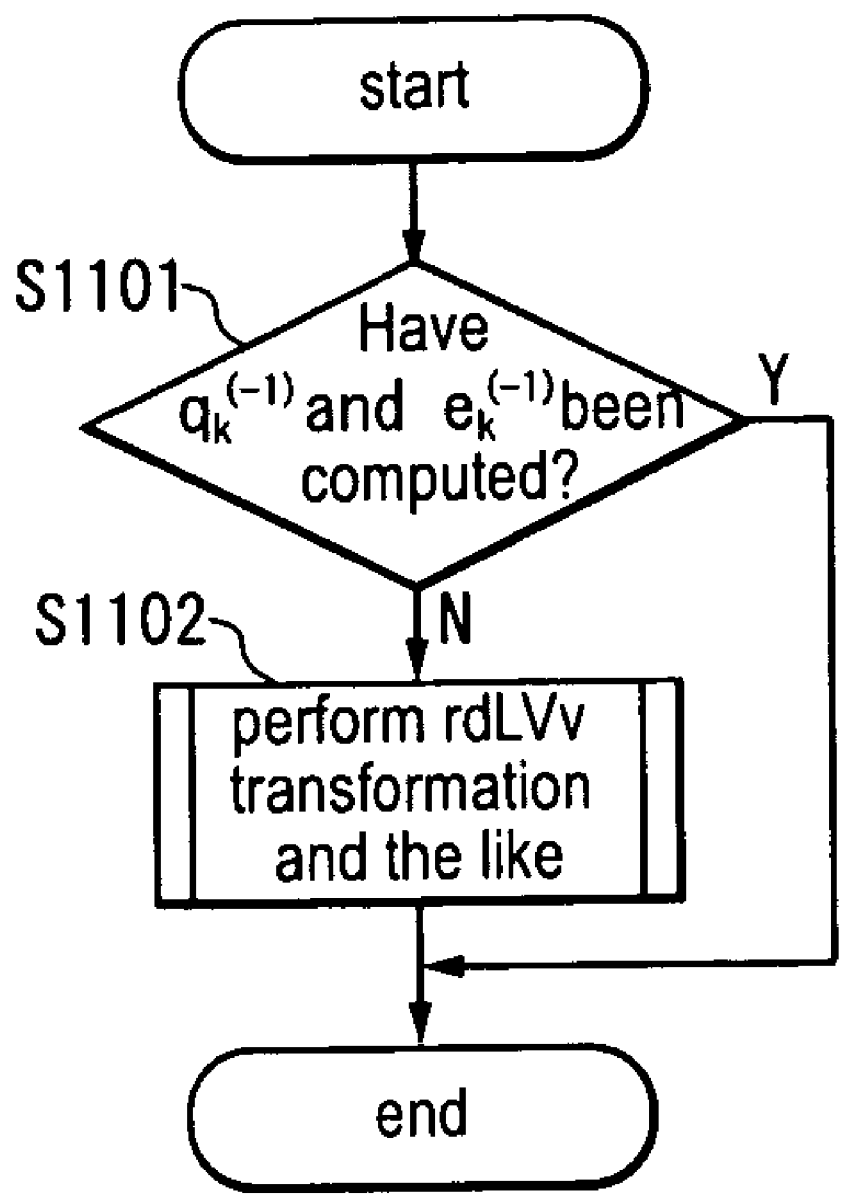
FIG. 18 is a flowchart showing the operation of the eigenvalue decomposition apparatus according to this embodiment.
Figure 19:
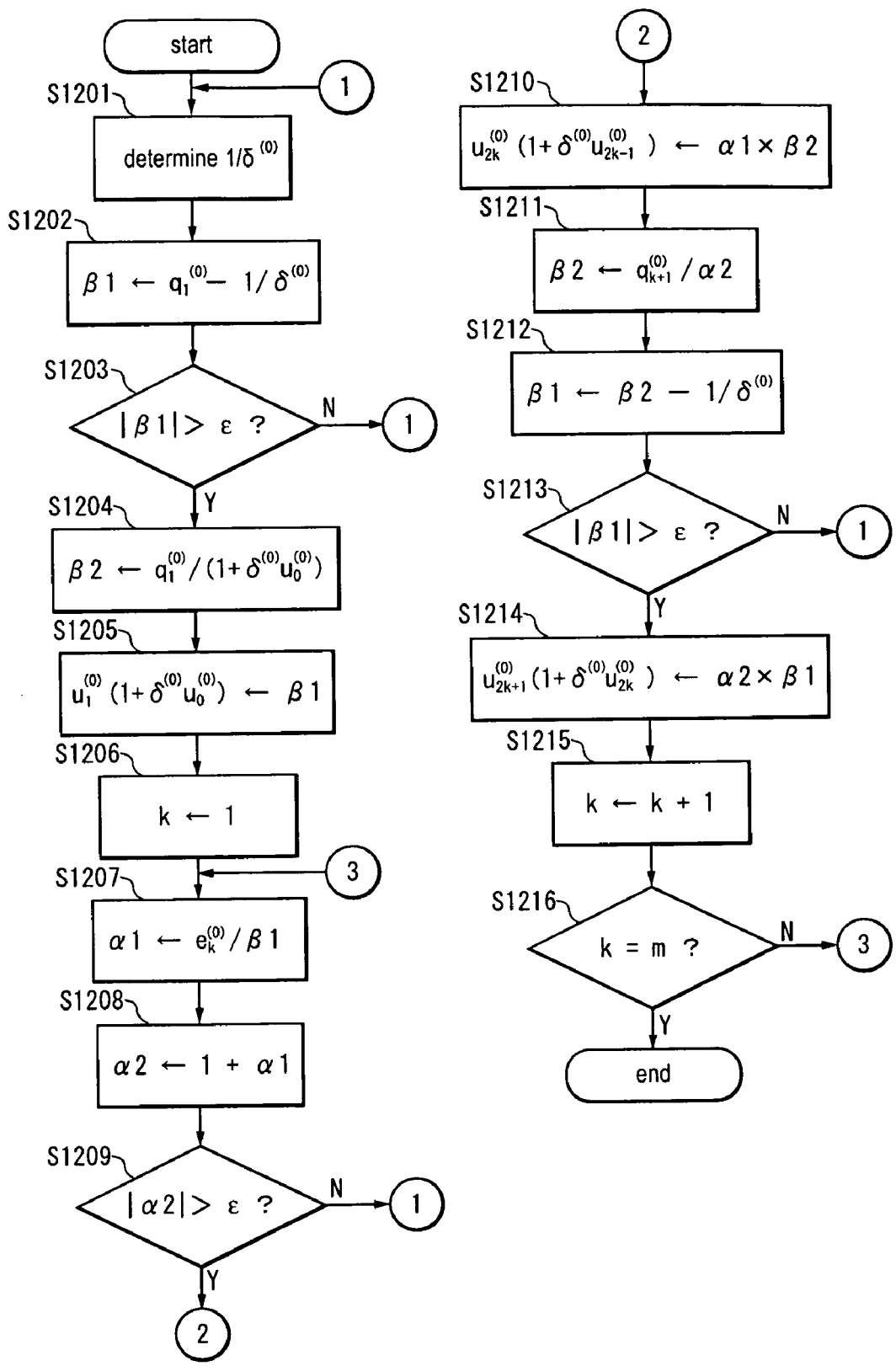
FIG. 19 is a flowchart showing the operation of the eigenvalue decomposition apparatus according to this embodiment.
Figure 20:
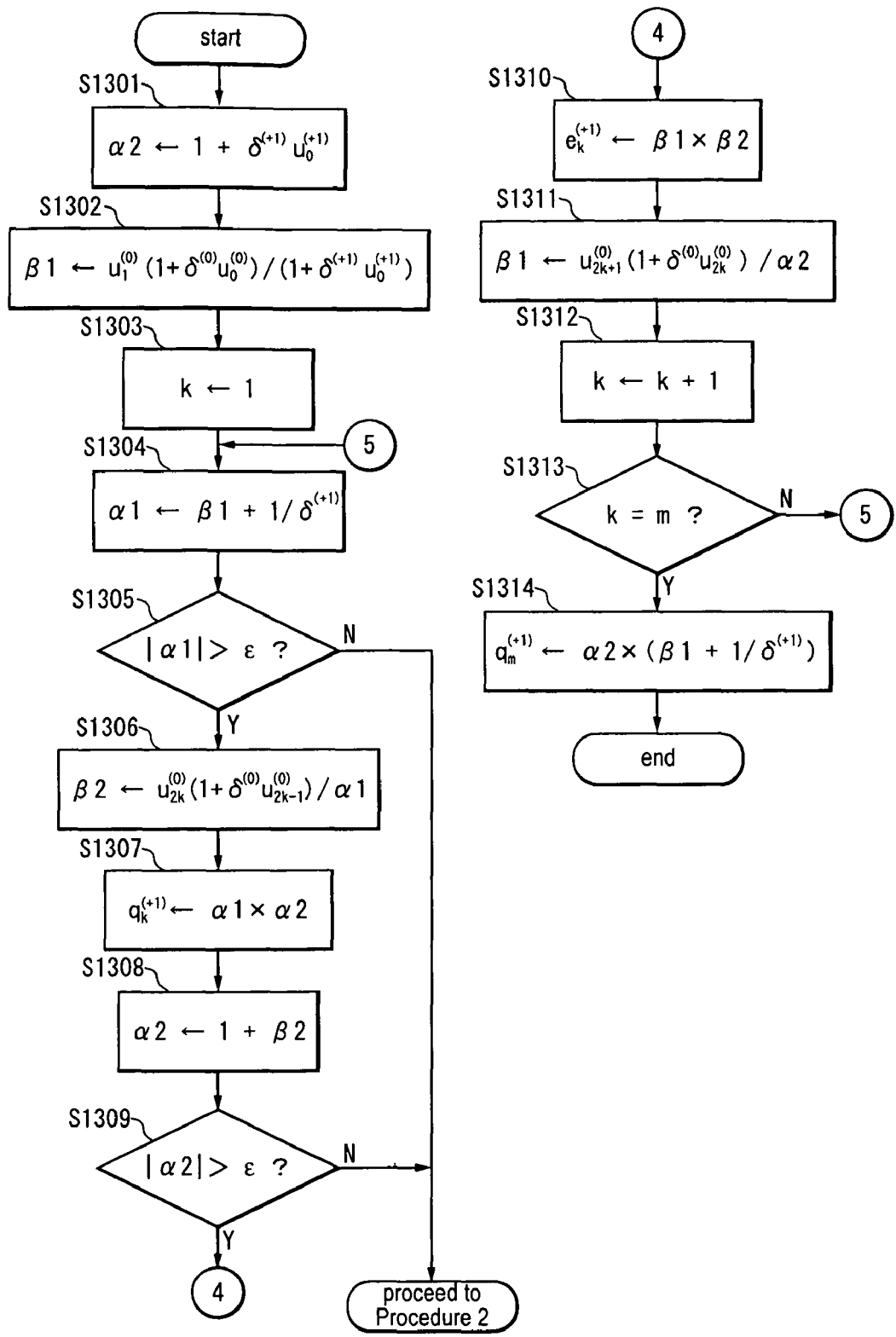
FIG. 20 is a flowchart showing the operation of the eigenvalue decomposition apparatus according to this embodiment.
Figure 21:
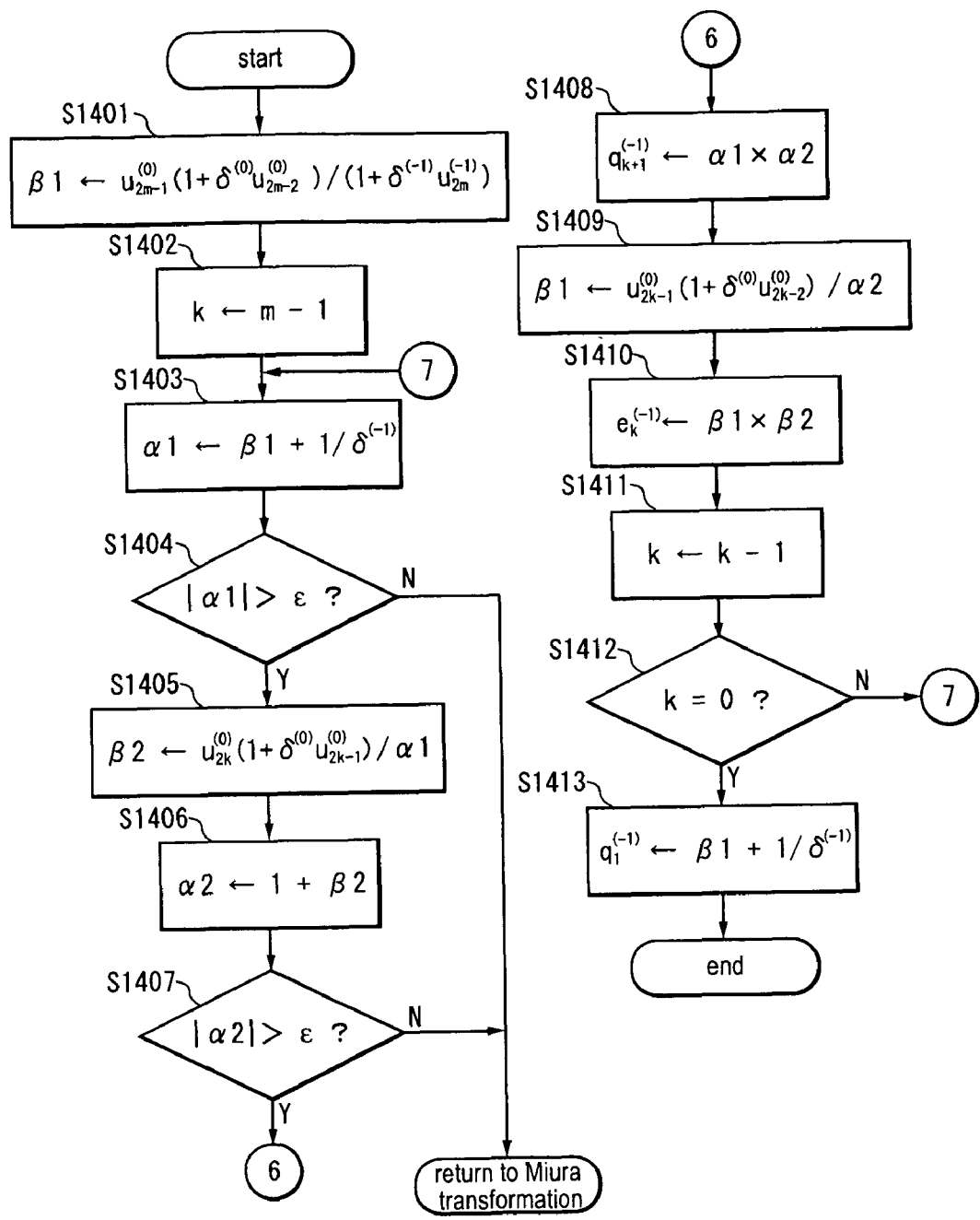
FIG. 21 is a flowchart showing the operation of the eigenvalue decomposition apparatus according to this embodiment.
Figure 22:
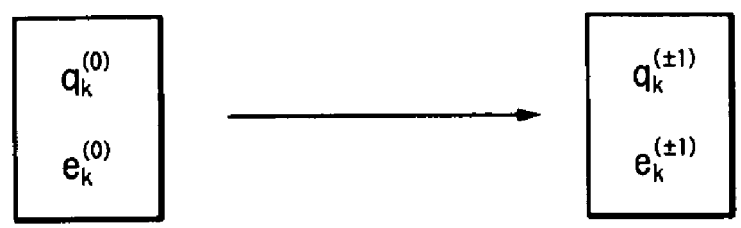
FIG. 22 is a diagram for illustrating qd-type twisted factorization and LV-type twisted factorization according to this embodiment.
Figure 22:
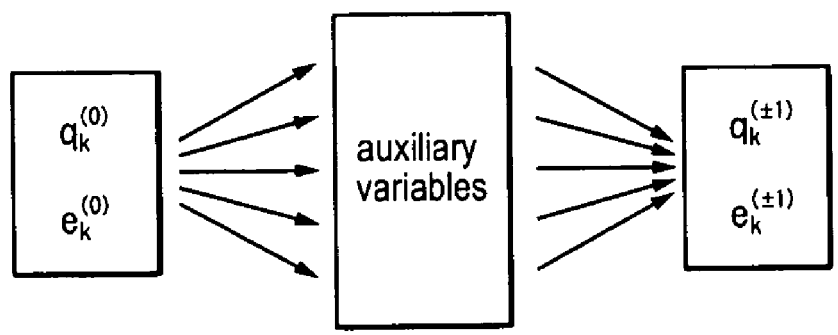
Figure 23:
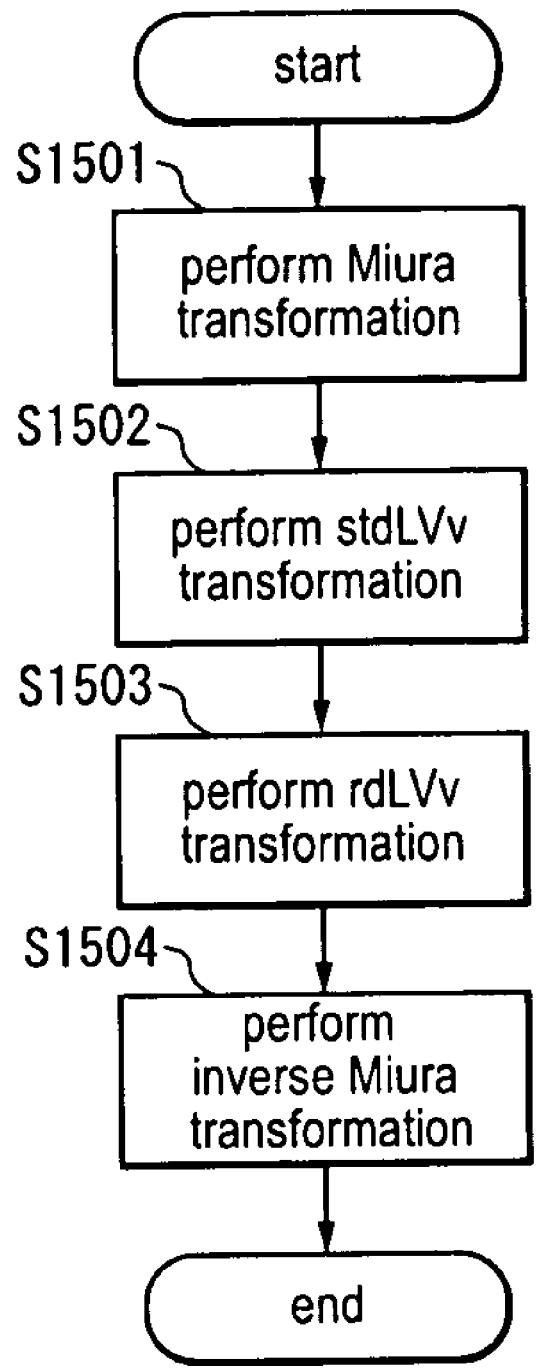
FIG. 23 is a flowchart showing the operation of the eigenvalue decomposition apparatus according to this embodiment.
Figure 24:
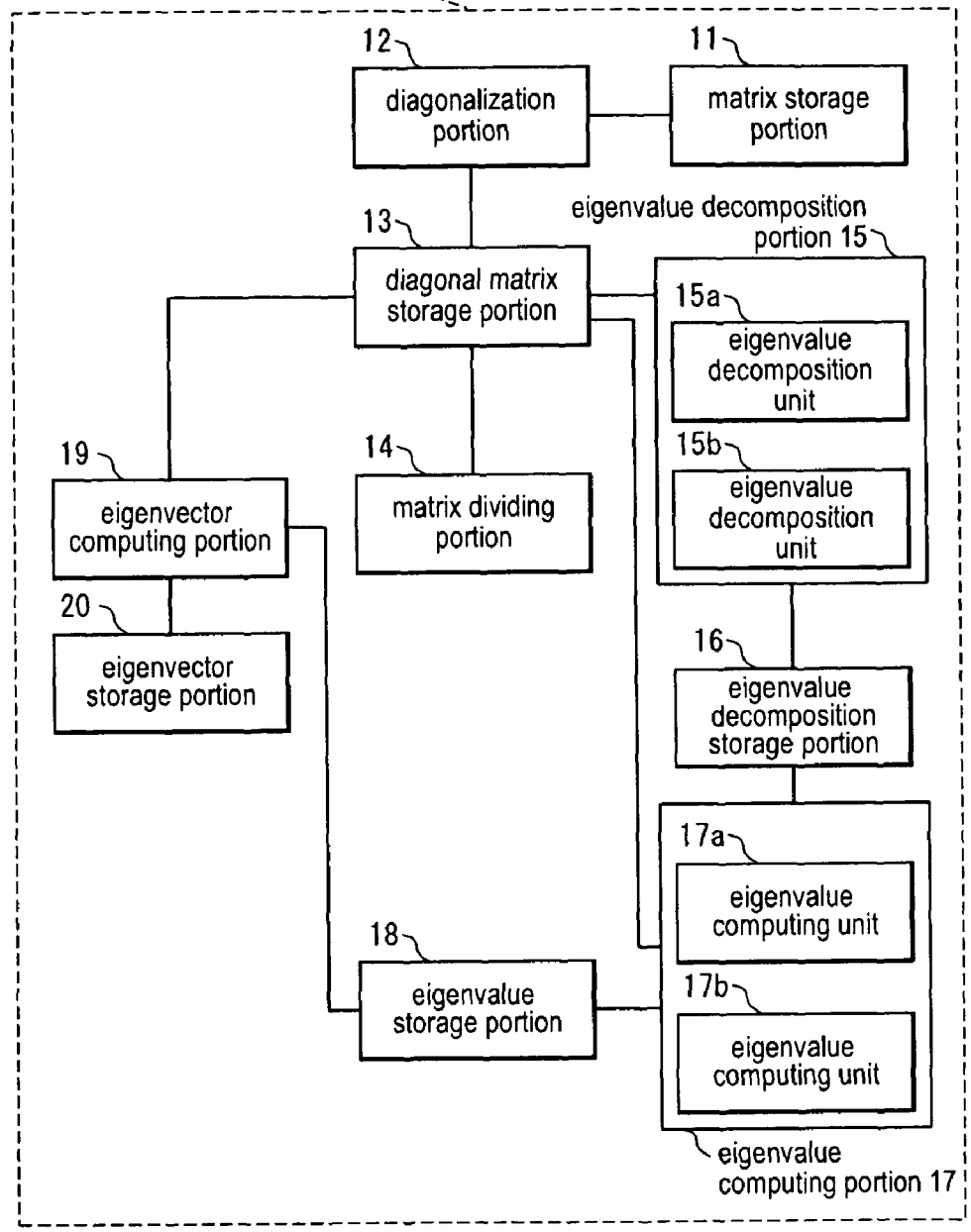
FIG. 24 is a block diagram showing another example of the configuration of the eigenvalue decomposition apparatus according to this embodiment.
Figure 25:
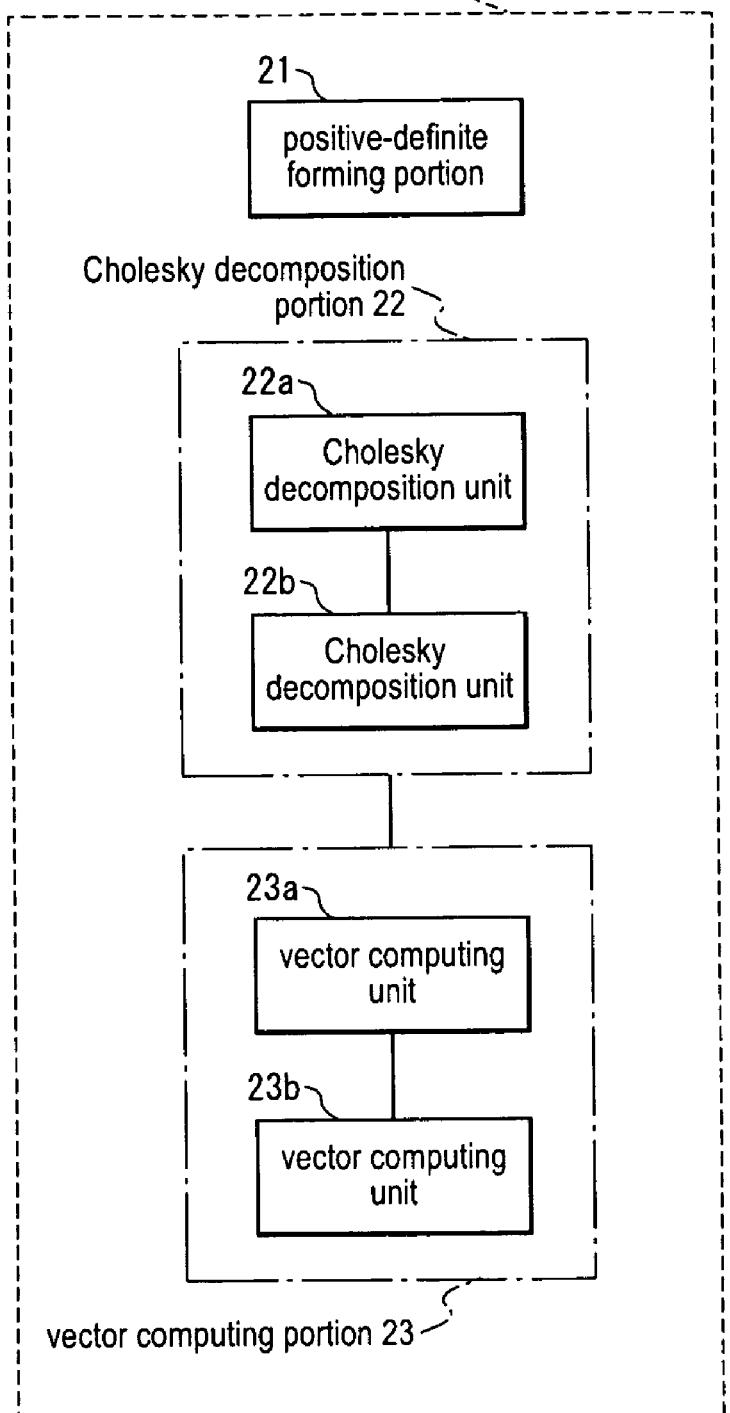
FIG. 25 is a block diagram showing another example of the configuration of the eigenvector computing portion according to this embodiment.
Figure 26:
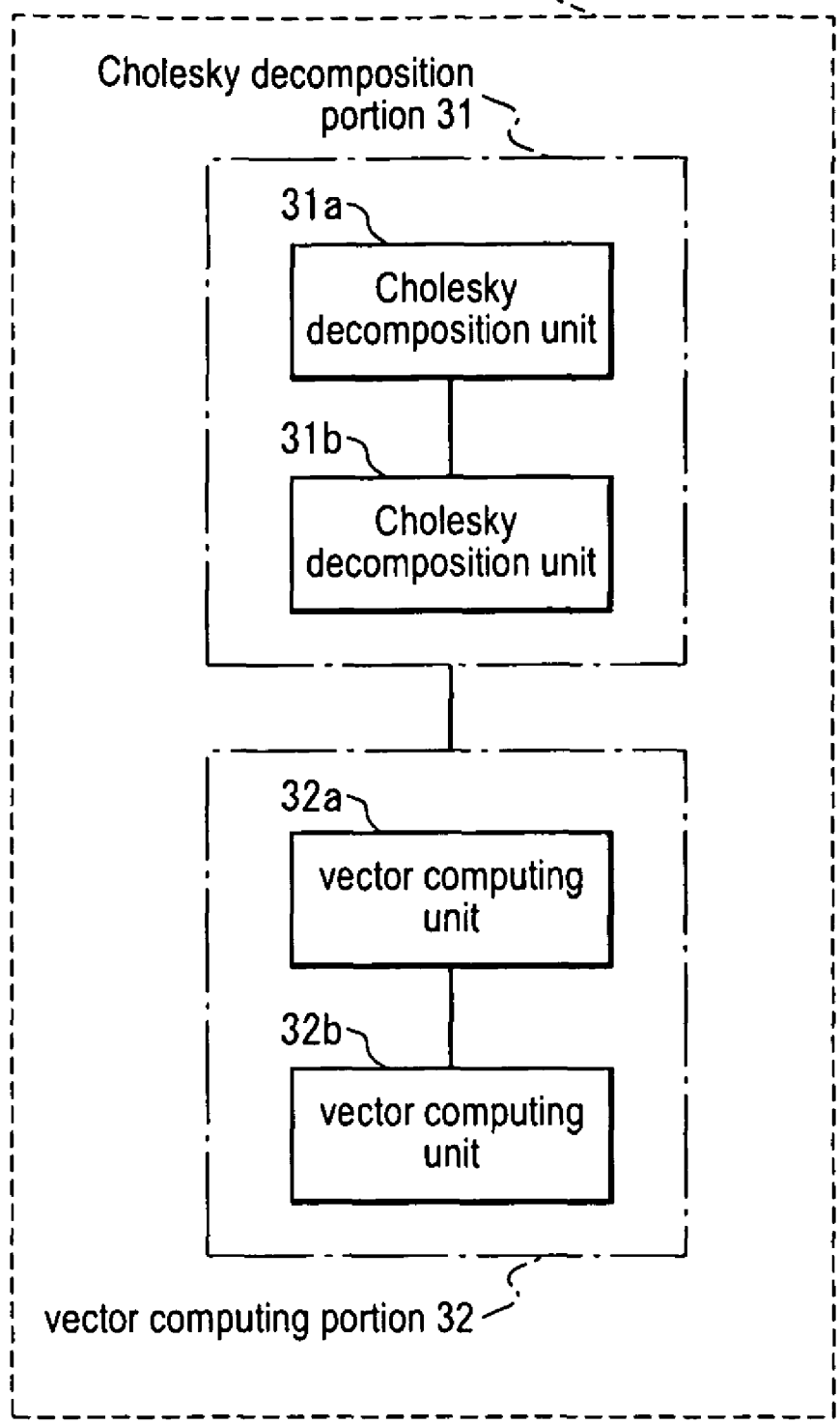
FIG. 26 is a block diagram showing another example of the configuration of the eigenvector computing portion according to this embodiment.
Figure 27:
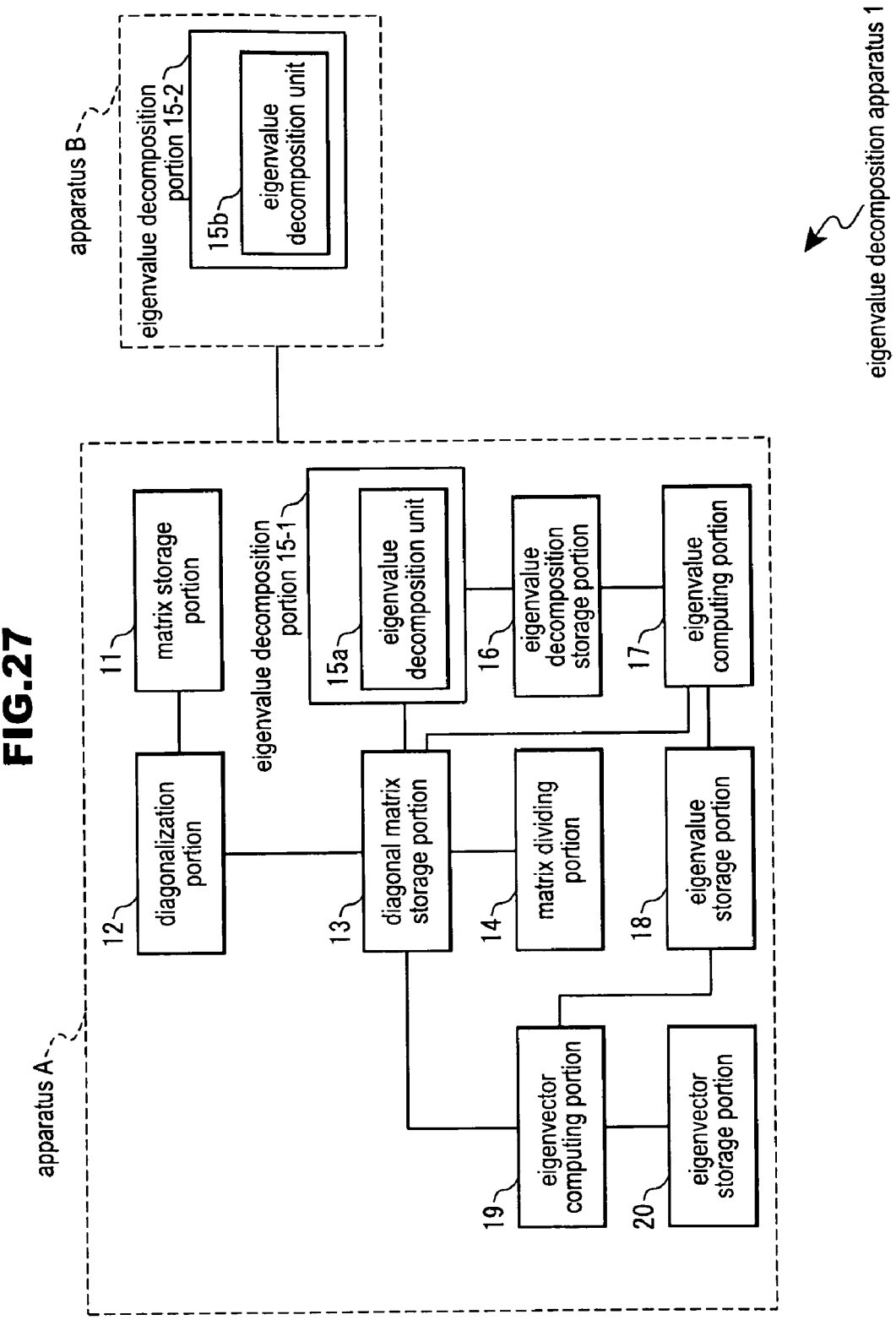
FIG. 27 is a block diagram showing another example of the configuration of the eigenvalue decomposition apparatus according to this embodiment.
Figure 28:
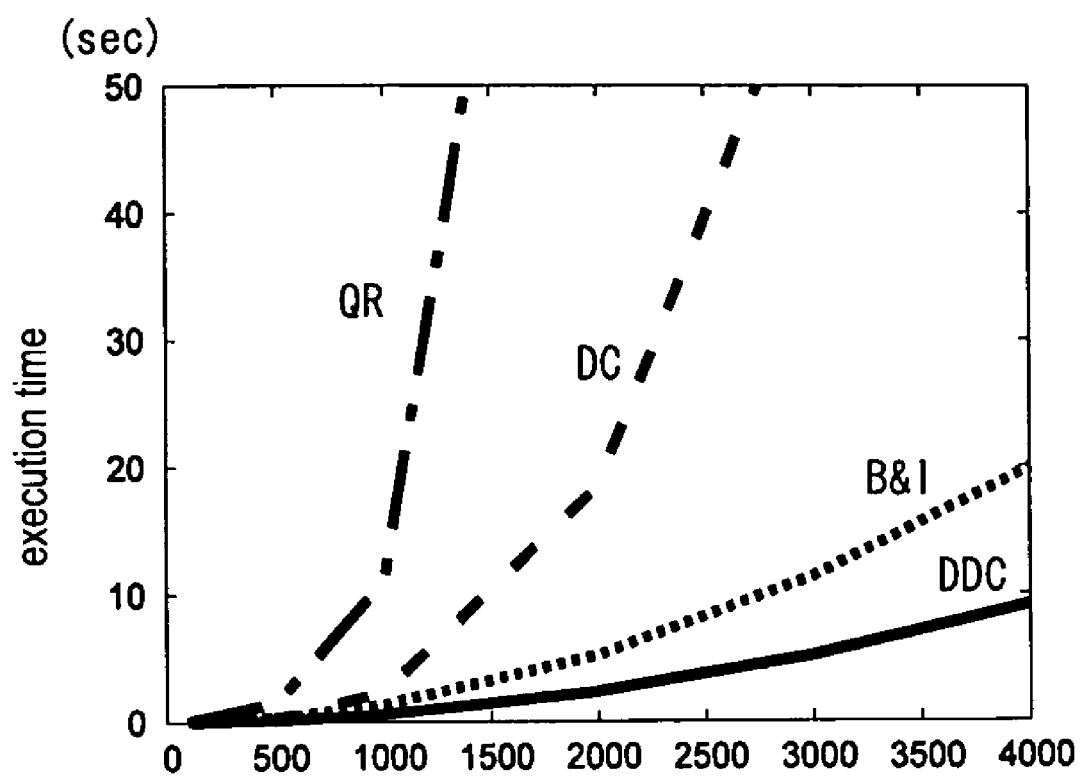
FIG. 28 is a graph showing a result of a numerical experiment using the eigenvalue decomposition apparatus according to this embodiment.
Figure 29:
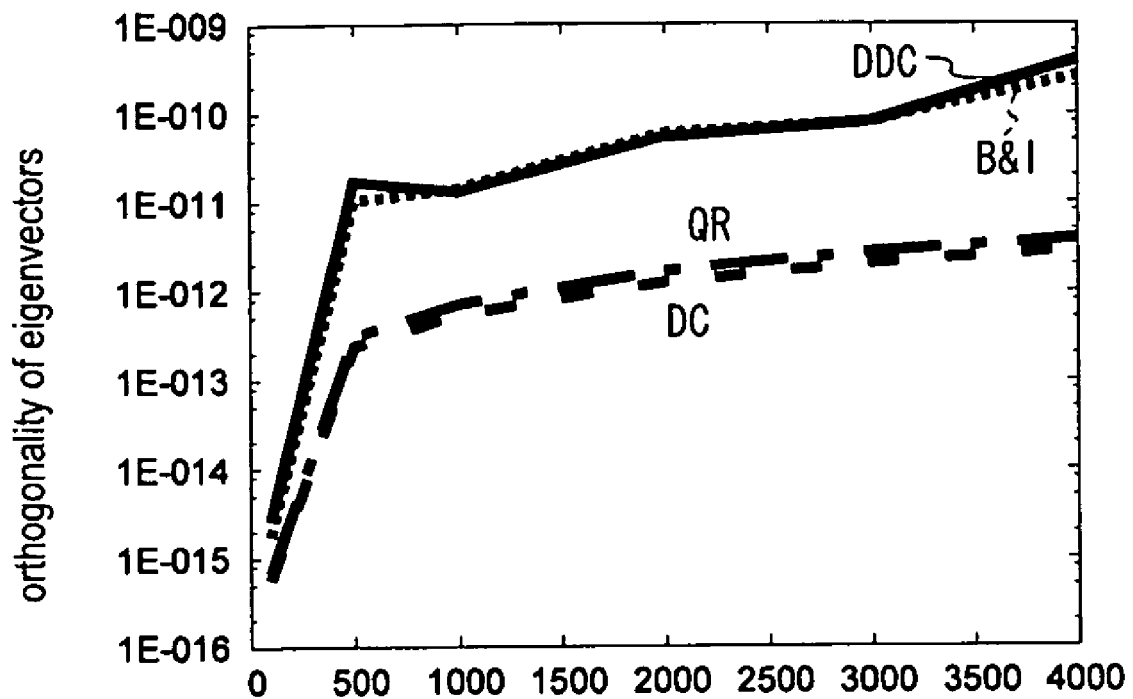
FIG. 29 is a graph showing a result of a numerical experiment using the eigenvalue decomposition apparatus according to this embodiment.
Figure 30:
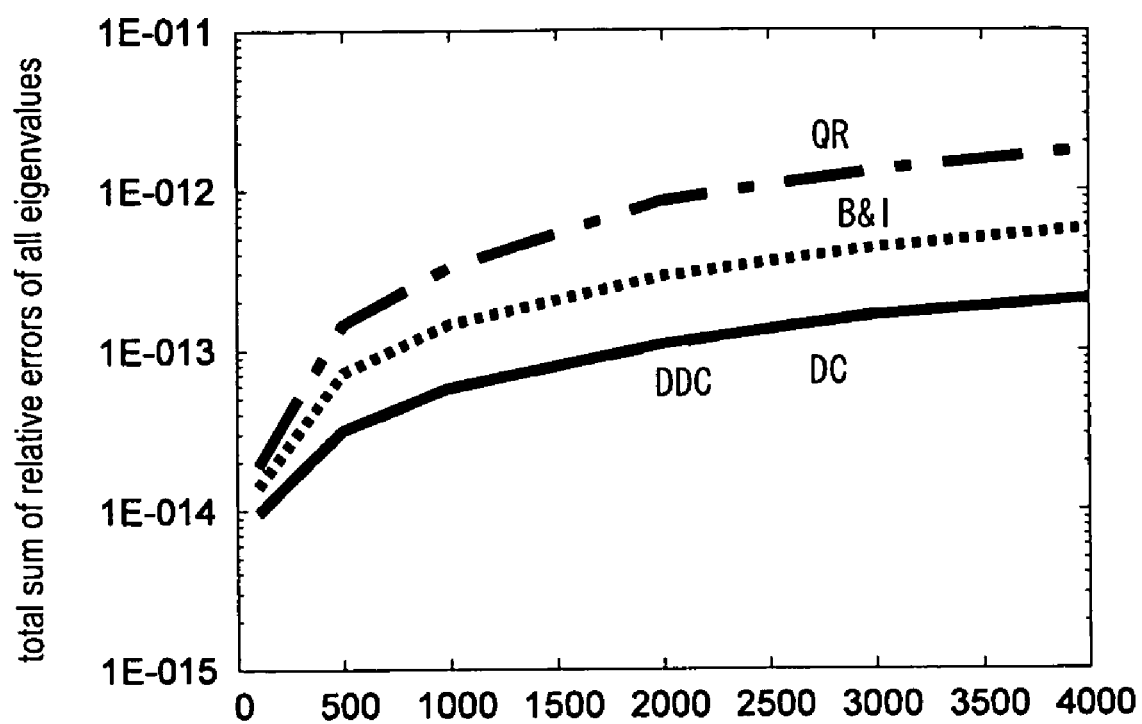
FIG. 30 is a graph showing a result of a numerical experiment using the eigenvalue decomposition apparatus according to this embodiment.
Figure 31:
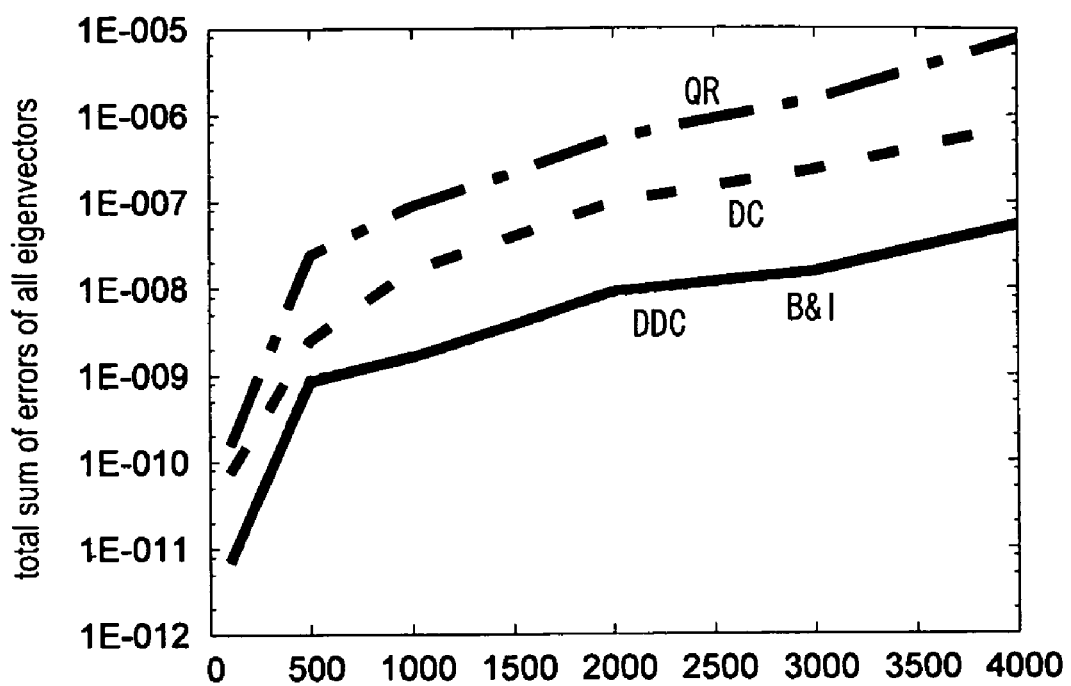
FIG. 31 is a graph showing a result of a numerical experiment using the eigenvalue decomposition apparatus according to this embodiment.
Figure 32:
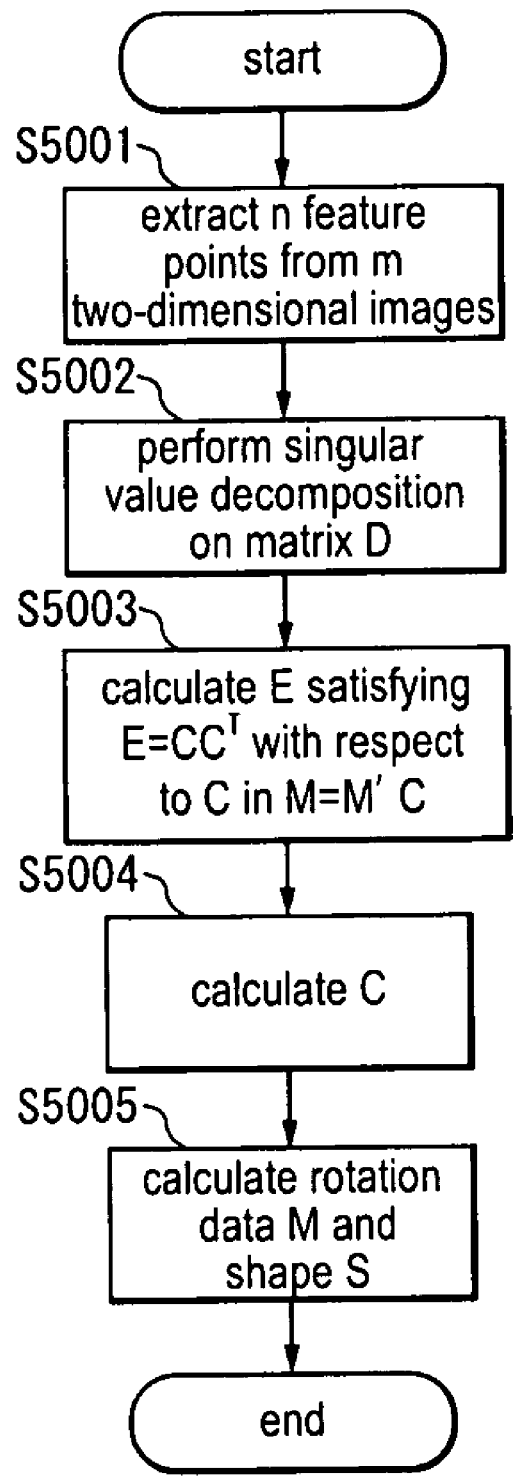
FIG. 32 is a flowchart showing an example of image processing according to this embodiment.
Figure 33:
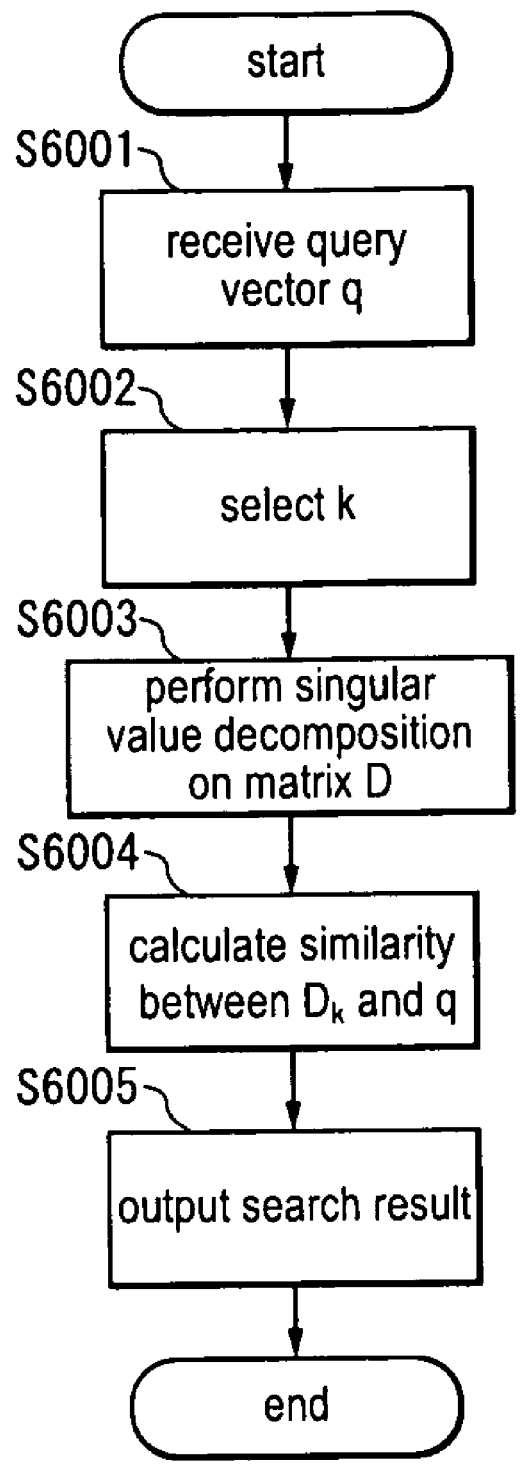
FIG. 33 is a flowchart showing an example of document search according to this embodiment.
Figure 34:
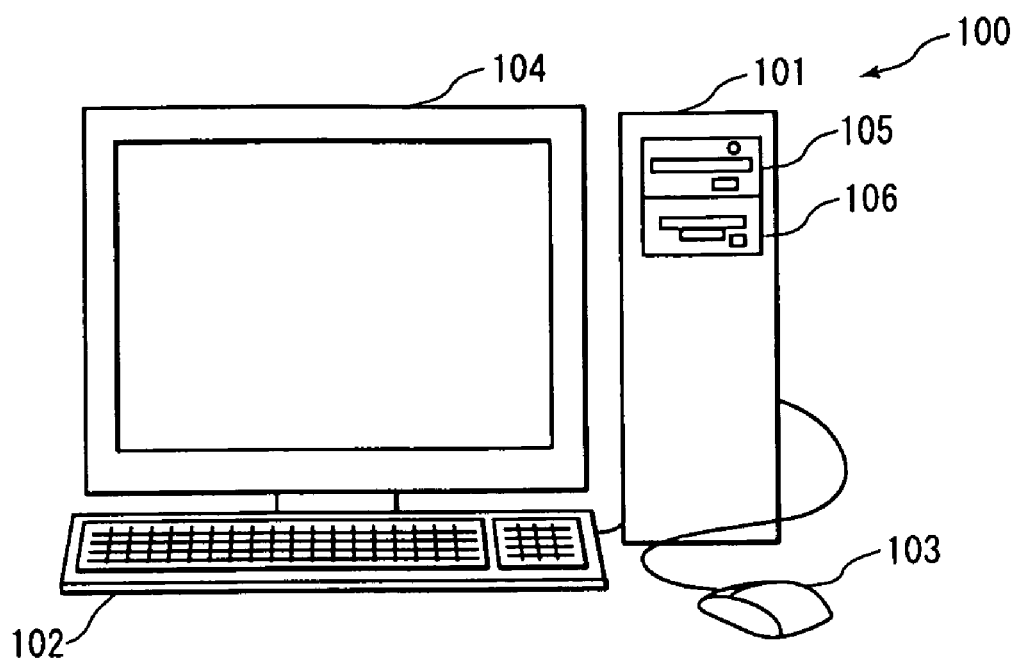
FIG. 34 is a schematic diagram showing an example of the external appearance of a computer system according to this embodiment.
Figure 35:
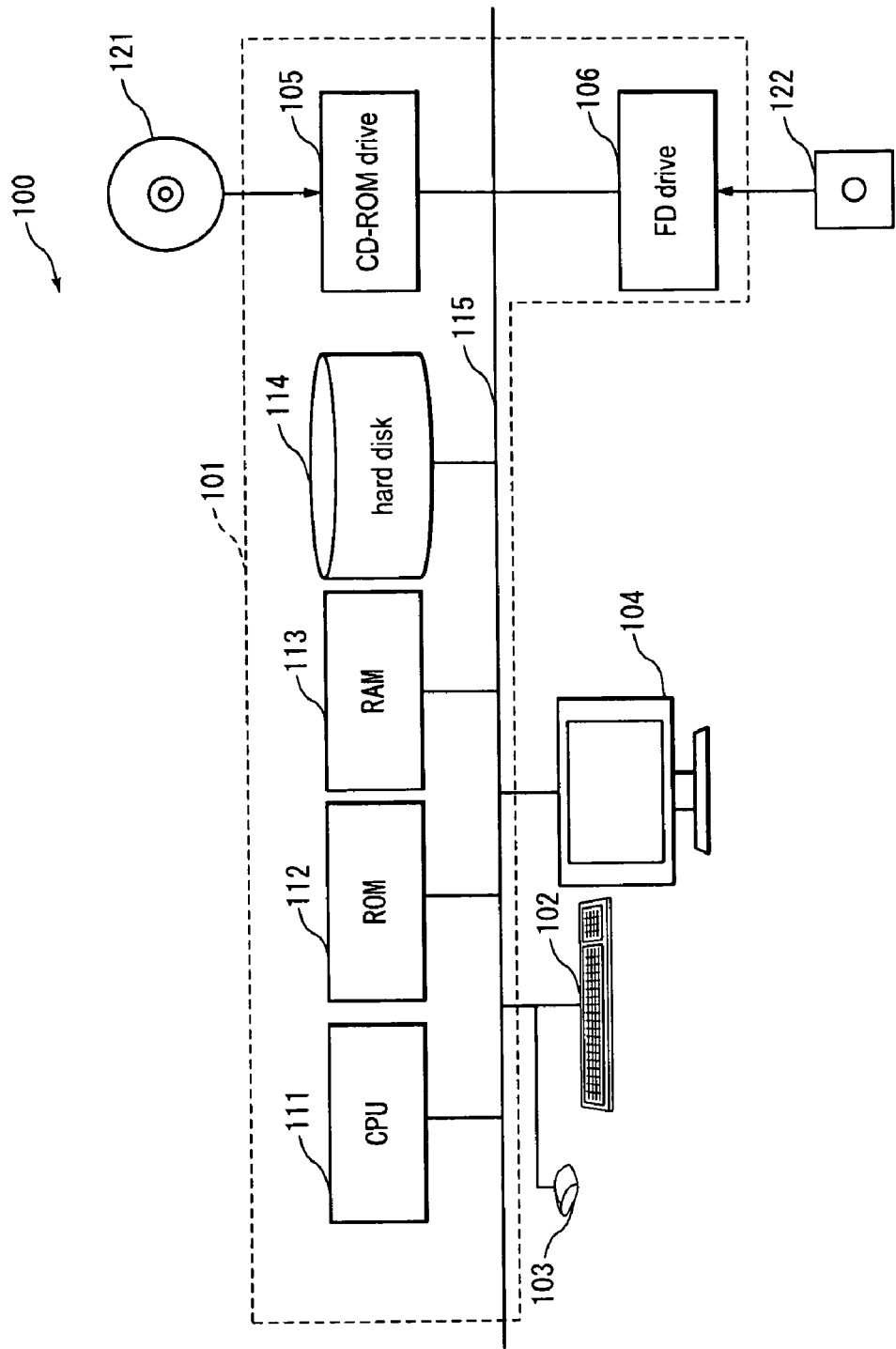
FIG. 35 is a diagram showing an example of the configuration of the computer system according to this embodiment.

The invention claimed is:

1. An eigenvalue decomposition apparatus, comprising:
a diagonal matrix storage portion in which a symmetric tridiagonal matrix T is stored;
a matrix dividing portion that reads the symmetric tridiagonal matrix T from the diagonal matrix storage portion, divides the symmetric tridiagonal matrix T into two symmetric tridiagonal matrices, and stores the symmetric tridiagonal matrices in the diagonal matrix storage portion, and repeats the process of dividing the symmetric tridiagonal matrix into two symmetric tridiagonal matrices and storing the symmetric tridiagonal matrices in the diagonal matrix storage portion until the size of each of the symmetric tridiagonal matrices after the division becomes not greater than a predetermined size;
an eigenvalue decomposition storage portion in which eigenvalues of each of the symmetric tridiagonal matrices whose size is not greater than the predetermined size and matrix elements, which are part of elements of an orthogonal matrix constituted by eigenvectors of each of the symmetric tridiagonal matrices, are stored;
an eigenvalue decomposition portion that reads each of the symmetric tridiagonal matrices whose size is not greater than the predetermined size from the diagonal matrix storage portion, performs eigenvalue decomposition on each of the symmetric tridiagonal matrices, at least computes eigenvalues of each of the symmetric tridiagonal matrices and matrix elements of an orthogonal matrix constituted by eigenvectors of each of the symmetric tridiagonal matrices, and stores the eigenvalues and the matrix elements in the eigenvalue decomposition storage portion;
an eigenvalue storage portion in which an eigenvalue of the symmetric tridiagonal matrix T is stored;
an eigenvalue computing portion that reads the eigenvalues and the matrix elements of each of the symmetric tridiagonal matrices from the eigenvalue decomposition storage portion, computes eigenvalues of the symmetric tridiagonal matrix that is the division origin and matrix elements of the symmetric tridiagonal matrix that is the division origin based on the eigenvalues and the matrix elements, and stores the computed eigenvalues and matrix elements in the eigenvalue decomposition storage portion, repeats the process of computing eigenvalues and matrix elements of the symmetric tridiagonal matrix that is the division origin until at least one eigenvalue of the symmetric tridiagonal matrix T is computed, and stores the at least one eigenvalue of the symmetric tridiagonal matrix T in the eigenvalue storage portion;

an eigenvector storage portion in which an eigenvector of the symmetric tridiagonal matrix T is stored; and an eigenvector computing portion that reads the symmetric tridiagonal matrix T from the diagonal matrix storage portion, reads the eigenvalue of the symmetric tridiagonal matrix T from the eigenvalue storage portion, computes at least one eigenvector of the symmetric tridiagonal matrix T based on the symmetric tridiagonal matrix T and the eigenvalue thereof using twisted factorization, and stores the at least one eigenvector in the eigenvector storage portion.

2. The eigenvalue decomposition apparatus according to claim 1, wherein the eigenvector computing portion computes an eigenvector using qd-type twisted factorization.

3. The eigenvalue decomposition apparatus according to claim 2, wherein the eigenvector computing portion comprises:

a positive-definite forming portion that reads the eigenvalues of the symmetric tridiagonal matrix T from the eigenvalue storage portion, and, if any of the eigenvalues is a negative value, reads the symmetric tridiagonal matrix T from the diagonal matrix storage portion, changes the symmetric tridiagonal matrix T into positive definite so that all eigenvalues of the symmetric tridiagonal matrix T are positive values, without changing the eigenvectors of the symmetric tridiagonal matrix T, stores eigenvalues after the positive-definite formation in the eigenvalue storage portion, and stores a symmetric tridiagonal matrix T after the positive-definite formation in the diagonal matrix storage portion;

a Cholesky decomposition portion that reads the symmetric tridiagonal matrix T in which all eigenvalues are positive values from the diagonal matrix storage portion, reads the positive eigenvalues of the symmetric tridiagonal matrix T from the eigenvalue storage portion, and performs Cholesky decomposition on the symmetric tridiagonal matrix T into an upper bidiagonal matrix $B^{(+1)}$) and a lower bidiagonal matrix $B^{(-1)}$), by performing qd-type transformation on each element of the symmetric tridiagonal matrix T; and a vector computing portion that computes eigenvectors using each element of the upper bidiagonal matrix $B^{(+1)}$ and the lower bidiagonal matrix $B^{(-1)}$ and the positive eigenvalues of the symmetric tridiagonal matrix T, and stores the eigenvectors in the eigenvector storage portion.

4. The eigenvalue decomposition apparatus according to claim 1, wherein the eigenvector computing portion computes an eigenvector using LV-type twisted factorization.

5. The eigenvalue decomposition apparatus according to claim 4, wherein the eigenvector computing portion comprises:

a Cholesky decomposition portion that reads the symmetric tridiagonal matrix T from the diagonal matrix storage portion, reads the eigenvalue of the symmetric tridiagonal matrix T from the eigenvalue storage portion, and performs Cholesky decomposition on the symmetric tridiagonal matrix T into an upper bidiagonal matrix $B^{(+1)}$) and a lower bidiagonal matrix $B^{(-)}$), by performing Miura transformation, dLVv-type transformation, and inverse Miura transformation on each element of the symmetric tridiagonal matrix T; and a vector computing portion that computes an eigenvector using each element of the upper bidiagonal matrix $B^{(+1)}$) and the lower bidiagonal matrix $B^{(-1)}$ and the eigenvalue of the symmetric tridiagonal matrix T, and stores the eigenvector in the eigenvector storage portion.

6. The eigenvalue decomposition apparatus according to claim 3, wherein the Cholesky decomposition portion comprises multiple Cholesky decomposition units, and the multiple Cholesky decomposition units perform, in parallel, the process of Cholesky decomposition on the symmetric tridiagonal matrix T.

7. The eigenvalue decomposition apparatus according to claim 3, wherein the vector computing portion comprises multiple vector computing units, and the multiple vector computing units perform, in parallel, the process of computing eigenvectors.

8. The eigenvalue decomposition apparatus according to claim 1, wherein the eigenvalue computing portion comprises multiple eigenvalue computing units, and the multiple eigenvalue computing units perform, in parallel, the process of computing eigenvalues and matrix elements of the symmetric tridiagonal matrix that is the division origin.

9. The eigenvalue decomposition apparatus according to claim 1, wherein the eigenvalue decomposition portion comprises multiple eigenvalue decomposition units, and the multiple eigenvalue decomposition units perform, in parallel, the process of eigenvalue decomposition on a symmetric tridiagonal matrix.

10. The eigenvalue decomposition apparatus according to claim 1, further comprising:

a matrix storage portion in which a symmetric matrix A is stored; and a diagonalization portion that reads the symmetric matrix A from the matrix storage portion, computes a symmetric tridiagonal matrix T in which the symmetric matrix A is tridiagonalized, and stores the symmetric tridiagonal matrix T in the diagonal matrix storage portion.

11. The eigenvalue decomposition apparatus according to claim 1, wherein the matrix dividing portion divides a symmetric tridiagonal matrix into two substantially half symmetric tridiagonal matrices.

12. The eigenvalue decomposition apparatus according to claim 1, wherein the eigenvalue computing portion computes all eigenvalues of the symmetric tridiagonal matrix T.

13. The eigenvalue decomposition apparatus according to claim 12, wherein the eigenvector computing portion computes all eigenvectors of the symmetric tridiagonal matrix T.

14. The eigenvalue decomposition apparatus according to claim 10, wherein the symmetric matrix A is a covariance matrix computed based on the average of vectors indicating facial image data.

15. An eigenvalue decomposition method used in an eigenvalue decomposition apparatus that comprises a diagonal matrix storage portion in which a symmetric tridiagonal matrix T is stored, a matrix dividing portion, an eigenvalue decomposition portion, an eigenvalue decomposition storage portion in which eigenvalues and matrix elements, which are part of elements of orthogonal matrices constituted by eigenvectors, obtained by eigenvalue decomposition performed by the eigenvalue decomposition portion are stored, an eigenvalue storage portion in which an eigenvalue of the symmetric tridiagonal matrix T is stored, an eigenvalue computing portion, an eigenvector storage portion in which an eigenvector of the symmetric tridiagonal matrix T is stored, and an eigenvector computing portion, comprising:

a matrix dividing step of the matrix dividing portion reading the symmetric tridiagonal matrix T from the diagonal matrix storage portion, dividing the symmetric tridiagonal matrix T into two symmetric tridiagonal matrices, and storing the symmetric tridiagonal matrices in the diagonal matrix storage portion, and repeating the process of dividing the symmetric tridiagonal matrix into two symmetric tridiagonal matrices and storing the symmetric tridiagonal matrices in the diagonal matrix storage portion until the size of each of the symmetric tridiagonal matrices after the division becomes not greater than a predetermined size;

an eigenvalue decomposition step of the eigenvalue decomposition portion reading each of the symmetric tridiagonal matrices whose size is not greater than the predetermined size from the diagonal matrix storage portion, performing eigenvalue decomposition on each of the symmetric tridiagonal matrices, at least computing eigenvalues of each of the symmetric tridiagonal matrices and matrix elements of an orthogonal matrix constituted by eigenvectors of each of the symmetric tridiagonal matrices, and storing the eigenvalues and the matrix elements in the eigenvalue decomposition storage portion;

an eigenvalue computing step of the eigenvalue computing portion reading the eigenvalues and the matrix elements of each of the symmetric tridiagonal matrices from the eigenvalue decomposition storage portion, computing eigenvalues of the symmetric tridiagonal matrix that is the division origin and matrix elements of the symmetric tridiagonal matrix that is the division origin based on the eigenvalues and the matrix elements, and storing the computed eigenvalues and matrix elements in the eigenvalue decomposition storage portion, repeating the process of computing eigenvalues and matrix elements of the symmetric tridiagonal matrix that is the division origin until at least one eigenvalue of the symmetric tridiagonal matrix T is computed, and storing the at least one eigenvalue of the symmetric tridiagonal matrix T in the eigenvalue storage portion; and an eigenvector computing step of the eigenvector computing portion reading the symmetric tridiagonal matrix T from the diagonal matrix storage portion, reading the eigenvalue of the symmetric tridiagonal matrix T from the eigenvalue storage portion, computing at least one eigenvector of the symmetric tridiagonal matrix T based on the symmetric tridiagonal matrix T and the eigenvalue thereof using twisted factorization, and storing the at least one eigenvector in the eigenvector storage portion.

16. A computer-readable storage medium storing a program for causing a computer to execute:

a matrix dividing step of reading a symmetric tridiagonal matrix T from a diagonal matrix storage portion in which the symmetric tridiagonal matrix T is stored, dividing the symmetric tridiagonal matrix T into two symmetric tridiagonal matrices, and storing the symmetric tridiagonal matrices in the diagonal matrix storage portion, and repeating the process of dividing the symmetric tridiagonal matrix into two symmetric tridiagonal matrices and storing the symmetric tridiagonal matrices in the diagonal matrix storage portion until the size of each of the symmetric tridiagonal matrices after the division becomes not greater than a predetermined size;

an eigenvalue decomposition step of reading each of the symmetric tridiagonal matrices whose size is not greater than the predetermined size from the diagonal matrix storage portion, performing eigenvalue decomposition on each of the symmetric tridiagonal matrices, at least computing eigenvalues of each of the symmetric tridiagonal matrices and matrix elements of an orthogonal matrix constituted by eigenvectors of each of the symmetric tridiagonal matrices, and storing the eigenvalues and the matrix elements in an eigenvalue decomposition storage portion;

an eigenvalue computing step of reading the eigenvalues and the matrix elements of each of the symmetric tridiagonal matrices from the eigenvalue decomposition storage portion, computing eigenvalues of the symmetric tridiagonal matrix that is the division origin and matrix elements of the symmetric tridiagonal matrix that is the division origin based on the eigenvalues and the matrix elements, and storing the computed eigenvalues and matrix elements in the eigenvalue decomposition storage portion, repeating the process of computing eigenvalues and matrix elements of the symmetric tridiagonal matrix that is the division origin until at least one eigenvalue of the symmetric tridiagonal matrix T is computed, and storing the at least one eigenvalue of the symmetric tridiagonal matrix T in an eigenvalue storage portion; and an eigenvector computing step of reading the symmetric tridiagonal matrix T from the diagonal matrix storage portion, reading the eigenvalue of the symmetric tridiagonal matrix T from the eigenvalue storage portion, computing at least one eigenvector of the symmetric tridiagonal matrix T based on the symmetric tridiagonal matrix T and the eigenvalue thereof using twisted factorization, and storing the at least one eigenvector in an eigenvector storage portion.

17. The eigenvalue decomposition apparatus according to claim 5, wherein the Cholesky decomposition portion comprises multiple Cholesky decomposition units, and the multiple Cholesky decomposition units perform, in parallel, the process of Cholesky decomposition on the symmetric tridiagonal matrix T.

18. The eigenvalue decomposition apparatus according to claim 5, wherein the vector computing portion comprises multiple vector computing units, and the multiple vector computing units perform, in parallel, the process of computing eigenvectors.

* * * * *